United States Patent
Baer et al.

(10) Patent No.: US 12,194,865 B2
(45) Date of Patent: Jan. 14, 2025

(54) METHODS AND SYSTEMS FOR CONTROLLING ELECTRIC VEHICLES

(71) Applicant: ACCELERATED SYSTEMS INC., Waterloo (CA)

(72) Inventors: Stanley Baer, Kitchener (CA); Tim Lambert, Los Angeles, CA (US); Evin Robert Ballantyne, Kitchener (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 1011 days.

(21) Appl. No.: 17/172,393

(22) Filed: Feb. 10, 2021

(65) Prior Publication Data
US 2021/0245605 A1 Aug. 12, 2021

Related U.S. Application Data

(60) Provisional application No. 62/972,720, filed on Feb. 11, 2020.

(51) Int. Cl.
| | | |
|---|---|---|
| *B60L 3/00* | (2019.01) | |
| *B60L 7/00* | (2006.01) | |
| *B60L 7/24* | (2006.01) | |
| *B60L 7/26* | (2006.01) | |
| *B60L 15/20* | (2006.01) | |

(Continued)

(52) U.S. Cl.
CPC ............. *B60L 3/0076* (2013.01); *B60L 7/003* (2013.01); *B60L 7/24* (2013.01); *B60L 7/26* (2013.01); *B60L 15/2009* (2013.01); *B60T 1/065* (2013.01); *B60T 7/102* (2013.01); *B60T 11/04* (2013.01); *H02P 3/04* (2013.01);

(Continued)

(58) Field of Classification Search
CPC .... B60L 7/003; B60L 7/24; B60L 7/26; B60L 2240/421; B60T 1/065; B60T 7/102; B60T 11/04; H02P 3/04; H02P 3/22
USPC .......................................................... 701/22
See application file for complete search history.

(56) References Cited

U.S. PATENT DOCUMENTS

| | | | | |
|---|---|---|---|---|
| 5,322,352 | A * | 6/1994 | Ohno | ...................... B60L 7/22 303/3 |
| 6,125,983 | A | 10/2000 | Reed, Jr. et al. | |

(Continued)

FOREIGN PATENT DOCUMENTS

| | | |
|---|---|---|
| EP | 0892482 A1 | 1/1999 |
| EP | 1699676 B1 | 9/2006 |
| GB | 2344478 A | 6/2000 |

*Primary Examiner* — Jacob S. Scott
*Assistant Examiner* — Michael E Butler
(74) *Attorney, Agent, or Firm* — Nyssa Inc.

(57) ABSTRACT

There is provided a method of controlling an electric vehicle. The method includes obtaining by a controller of the electric vehicle a first state indicator of a state of the electric vehicle, receiving at the controller a status indicator of an operating status of the electric vehicle, and updating by the controller the state of the electric vehicle based on the status indicator to an updated state. The updated state may be associated with a second state indicator. The method also includes determining by the controller a given braking type of a braking to be applied to the electric vehicle. This determining may be based on one or more of the second state indicator and the status indicator. The method also includes applying to the electric vehicle the braking of the given braking type. Systems for applying such braking are also provided.

18 Claims, 60 Drawing Sheets

(51) Int. Cl.

| | | |
|---|---|---|
| *B60T 1/06* | (2006.01) | |
| *B60T 7/10* | (2006.01) | |
| *B60T 11/04* | (2006.01) | |
| *H02P 3/04* | (2006.01) | |
| *H02P 29/02* | (2016.01) | |
| *H02P 3/22* | (2006.01) | |

(52) U.S. Cl.
CPC ......... *H02P 29/02* (2013.01); *B60L 2240/421* (2013.01); *H02P 3/22* (2013.01)

(56) References Cited

U.S. PATENT DOCUMENTS

| | | |
|---|---|---|
| 10,058,032 B2 | 8/2018 | Gilbert et al. |
| 10,343,530 B2 | 7/2019 | Riedel et al. |
| 2007/0228822 A1* | 10/2007 | Hirata ..................... B60L 50/40 |
| | | 303/151 |
| 2008/0100129 A1* | 5/2008 | Lubbers ................... B60L 7/18 |
| | | 303/113.1 |
| 2008/0217123 A1 | 9/2008 | Fujita |
| 2009/0051304 A1* | 2/2009 | Muta ........................ B60L 7/26 |
| | | 903/947 |
| 2009/0118887 A1* | 5/2009 | Minarcin ............... B60K 6/365 |
| | | 701/22 |
| 2012/0031692 A1* | 2/2012 | Koike ................... B60T 13/586 |
| | | 903/902 |
| 2013/0049945 A1* | 2/2013 | Crombez ............... B60K 35/00 |
| | | 340/453 |
| 2016/0325738 A1* | 11/2016 | Miyazaki ................ B60L 58/20 |

\* cited by examiner

100

```
┌─────────────────────────────────────────────────────────────┐
│ Obtaining by a controller of an electric vehicle a first    │
│ state indicator of a state of the electric vehicle          │
│                          105                                │
└─────────────────────────────────────────────────────────────┘
                              ↓
┌─────────────────────────────────────────────────────────────┐
│ Receiving at the controller a status indicator of an        │
│ operating status of the electric vehicle                    │
│                          110                                │
└─────────────────────────────────────────────────────────────┘
                              ↓
┌─────────────────────────────────────────────────────────────┐
│ Updating by the controller the state of the electric        │
│ vehicle based on the status indicator to an updated state,  │
│ the updated state associated with a second state indicator  │
│                          115                                │
└─────────────────────────────────────────────────────────────┘
                              ↓
┌─────────────────────────────────────────────────────────────┐
│ Determining by the controller a given braking type of a     │
│ braking to be applied to the electric vehicle, the          │
│ determining based on one or more of the second state        │
│ indicator and the status indicator                          │
│                          120                                │
└─────────────────────────────────────────────────────────────┘
                              ↓
┌─────────────────────────────────────────────────────────────┐
│ Applying to the electric vehicle the braking of the given   │
│ braking type                                                │
│                          125                                │
└─────────────────────────────────────────────────────────────┘
```

```
┌─────────────────────────────────────────────────────────────────┐
│  Receiving a status indicator of an operating status of an electric vehicle  │
│                                                                 │
│                              135                                │
└─────────────────────────────────────────────────────────────────┘
                                 │
                                 ▼
┌─────────────────────────────────────────────────────────────────┐
│  Applying an electromagnetic braking to an electric motor of the electric  │
│  vehicle in response to the status indicator, the electromagnetic braking to  │
│  reduce a rotational speed of the electric motor to be equal to or below a  │
│                        threshold speed                          │
│                              140                                │
└─────────────────────────────────────────────────────────────────┘
                                 │
                                 ▼
┌─────────────────────────────────────────────────────────────────┐
│  Applying mechanical braking once the rotational speed is equal to or below  │
│  the threshold speed, the mechanical braking to stop a rotation of a wheel of  │
│  the electric vehicle, the wheel mechanically coupled to the electric motor  │
│                              145                                │
└─────────────────────────────────────────────────────────────────┘
```

Fig. 1B

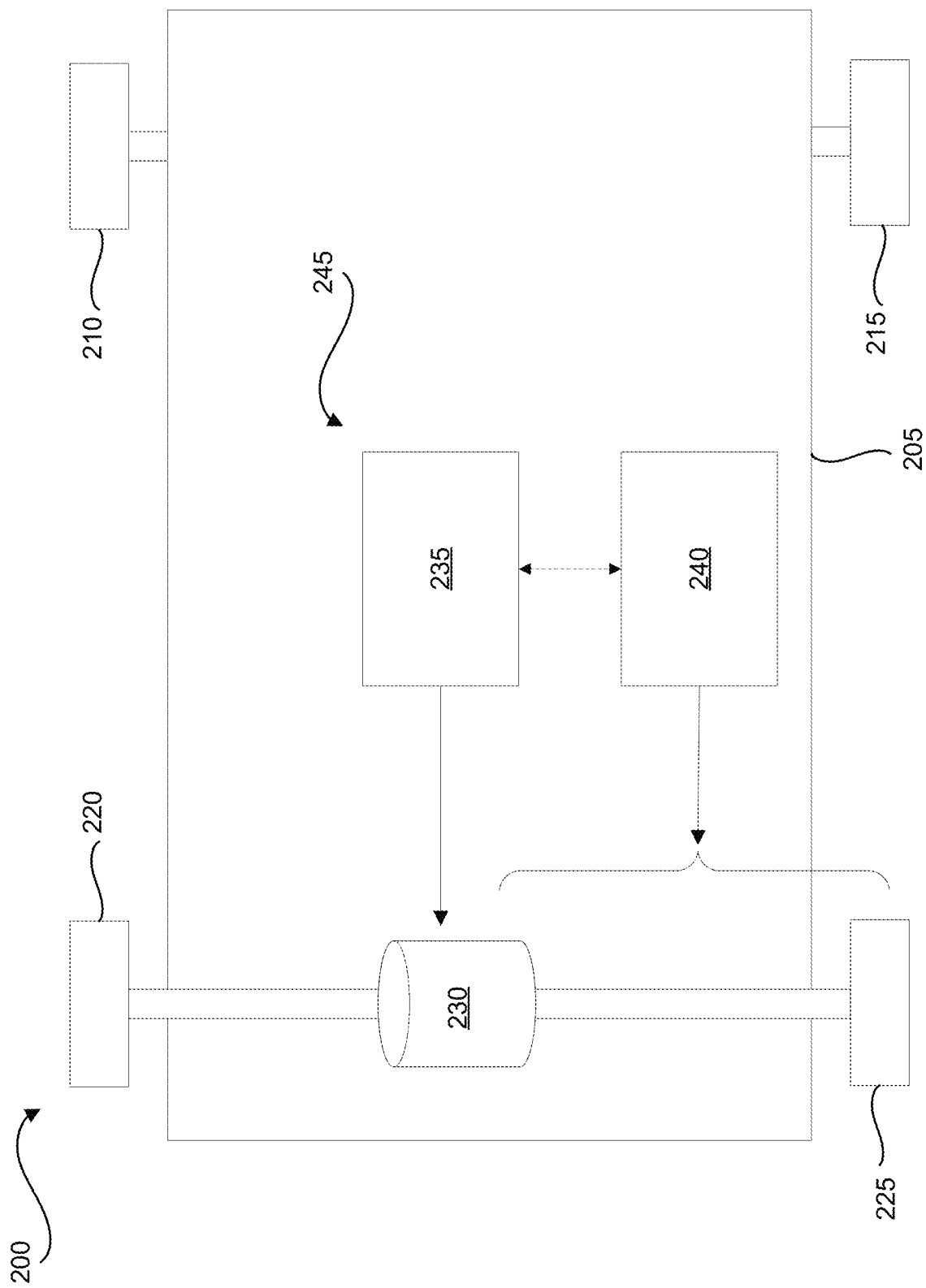

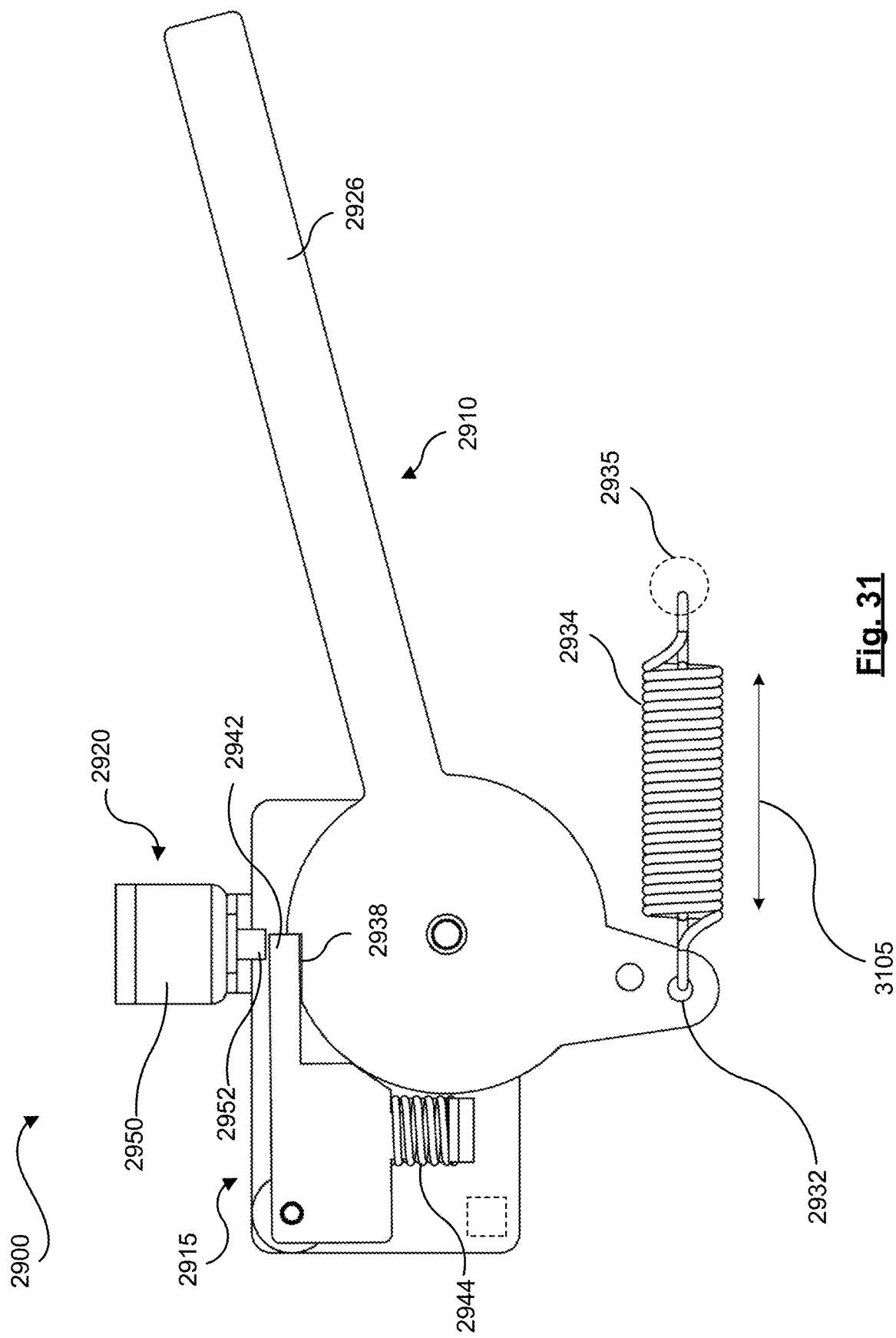

4800

METHODS AND SYSTEMS FOR CONTROLLING ELECTRIC VEHICLES

CROSS-REFERENCE TO RELATED APPLICATION

This application claims priority from U.S. Provisional Patent Application No. 62/972,720, filed on Feb. 11, 2020, which is incorporated herein by reference in its entirety.

FIELD

The present specification relates to methods and systems for controlling electric vehicles, and in particular to methods and systems for applying braking to electric vehicles.

BACKGROUND

Electric vehicles use electric motors to provide the motive force used to move the vehicle. The motive force provided by the electric motor may then be transmitted to a movement means of the vehicle. Some examples of the movement means include wheels, tracks, and the like.

SUMMARY

According to an implementation of the present specification there is provided a method of controlling an electric vehicle, the method comprising: obtaining by a controller of the electric vehicle a first state indicator of a state of the electric vehicle; receiving at the controller a status indicator of an operating status of the electric vehicle; updating by the controller the state of the electric vehicle based on the status indicator to an updated state, the updated state associated with a second state indicator; determining by the controller a given braking type of a braking to be applied to the electric vehicle, the determining based on one or more of the second state indicator and the status indicator; and applying to the electric vehicle the braking of the given braking type.

The updating the state of the electric vehicle may comprise updating the state to the updated state comprising a faulted state; the determining the braking type may comprise determining the braking type to comprise a hybrid braking; and the applying the braking may comprise applying the hybrid braking comprising: applying an electromagnetic braking to one or more electric motors of the electric vehicle using an electromagnetic braking module to reduce a rotational speed of the one or more electric motors; and when the rotational speed is equal to or less than a threshold speed, applying a mechanical braking to the electric vehicle using a mechanical braking applicator.

The receiving the status indicator may comprise receiving an input fault indicator indicating a fault associated with an input received at the controller, the input associated with controlling the one or more electric motors; the updating the state of the electric vehicle may comprise updating the state to the updated state comprising an input-faulted state; the applying the electromagnetic braking may comprise one or more of: applying an active electromagnetic braking comprising one or more of: controlling the one or more electric motors to ramp down their rotational speed; and controlling the one or more electric motors to hold them at a zero speed; and applying a passive electromagnetic braking comprising one or more of: shorting together one or more phases of a first electric motor of the one or more electric motors; and shorting one or more phases of the first electric motor to one or more corresponding phases of a second electric motor of the one or more electric motors; and the applying the mechanical braking may comprise: moving a braking rod of the mechanical braking applicator from a disengaged configuration to an engaged configuration.

The receiving the status indicator may comprise receiving an operational fault indicator indicating a corresponding fault associated with operation of the electric vehicle; the updating the state of the electric vehicle may comprise updating the state to the updated state comprising an operational-faulted state; the applying the electromagnetic braking may comprise: applying a passive electromagnetic braking comprising: shorting together one or more phases of a first electric motor of the one or more electric motors; and shorting one or more phases of the first electric motor to one or more corresponding phases of a second electric motor of the one or more electric motors; and the applying the mechanical braking may comprise: moving a braking rod of the mechanical braking applicator from a disengaged configuration to an engaged configuration; and the method may further comprise cutting driving power to the one or more electric motors.

One or more of: the receiving the operational fault indicator may comprise receiving a traction fault indicator associated with a corresponding fault in controlling the one or more electric motors, and the updating the state of the electric vehicle may comprise updating the state to the updated state comprising a traction-faulted state; the receiving the operational fault indicator may comprise receiving a system fault indicator associated with a corresponding fault in the electric vehicle, and the updating the state of the electric vehicle may comprise updating the state to the updated state comprising a system-faulted state; and the receiving the operational fault indicator may comprise receiving an operator seated fault indicator associated with a seat sensor ceasing to detect an operator of the electric vehicle as being seated in an operator seat of the electric vehicle, and the updating the state of the electric vehicle may comprise updating the state to the updated state comprising the system-faulted state.

The method may further comprise: receiving a third status indicator associated with a resolution of the corresponding fault associated with the operation of the electric vehicle; updating by the controller the state of the electric vehicle based on the third status indicator to a non-faulted state; discontinuing the passive electromagnetic braking; and after the discontinuing the electromagnetic braking and the mechanical braking, restoring the driving power to the one or more electric motors.

The method may further comprise restarting the electric vehicle before the updating the state of the electric vehicle to the non-faulted state.

The applying the passive electromagnetic braking may comprise controlling a contactor comprising an electrical contact movable between an open position and a closed position, the electrical contact resiliently biased towards the closed position by a resilient biasing force, the controlling comprising cutting electrical power to a contactor actuator of the contactor resisting the resilient biasing force to cause the electrical contact to move from the open position to the closed position under the resilient biasing force; and the discontinuing the passive electromagnetic braking may comprise restoring the power to the contactor actuator to move the electrical contact from the closed position to the open position against the resilient biasing force.

The contactor may further comprise an override module having an override active configuration whereby the override module pulls against the resilient biasing force to move the electrical contact towards the open position and an override inactive configuration whereby the override module does not pull against the resilient biasing force; the method may further comprise: before the restoring the power to the contactor actuator, determining whether the override module is in the override active configuration by determining whether the electrical contact is in the open position by checking a voltage across the contactor.

The method may further comprise: after the restoring the power to the contactor actuator, delaying by a predetermined delay before the restoring the driving power to the one or more electric motors.

The method may further comprise: checking that a throttle input received at the electric vehicle is at zero before the restoring the driving power to the one or more electric motors.

The applying the electromagnetic braking may comprise applying a passive electromagnetic braking, the passive electromagnetic braking comprising one or more of: shorting together one or more phases of a first electric motor of the one or more electric motors; and shorting one or more phases of the first electric motor to one or more corresponding phases of a second electric motor of the one or more electric motors.

The applying the passive electromagnetic braking may comprise controlling a phase-shorting module to apply the passive electromagnetic braking, the phase-shorting module comprising a contactor comprising an electrical contact movable between an open position and a closed position, the electrical contact resiliently biased towards the closed position by a resilient biasing force; and the controlling the phase-shorting module may comprise cutting electrical power to a contactor actuator of the contactor resisting the resilient biasing force to cause the electrical contact to move from the open position to the closed position under the resilient biasing force.

The contactor may further comprise an override module having an override active configuration whereby the override module pulls against the resilient biasing force to move the electrical contact towards the open position and an override inactive configuration whereby the override module does not pull against the resilient biasing force; the method may further comprise overriding the passive electromagnetic braking by applying a manual force to the override module to move the override module from the override inactive configuration to the override active configuration.

The applying the electromagnetic braking may further comprise applying an active electromagnetic braking, the active electromagnetic braking comprising one or more of: controlling the one or more electric motors to ramp down their rotational speed; and controlling the one or more electric motors to hold them at a zero speed.

The applying the mechanical braking may comprise moving a braking rod of the mechanical braking applicator from a disengaged configuration to an engaged configuration, the moving the braking rod towards the engaged configuration comprising moving the braking rod towards a braking rotor of the mechanical braking applicator such that a tip of the braking rod contacts the braking rotor.

The mechanical braking applicator may further comprise a brake handle module having a brake handle coupled to the braking rod to move the braking rod between the engaged configuration and the disengaged configuration, the brake handle having a cocked configuration and an uncocked configuration, the brake handle resiliently biased against the cocked configuration by a corresponding resilient biasing force; and the moving the braking rod from the disengaged configuration to the engaged configuration may comprise cutting power to an actuator of the brake handle module resisting the corresponding resilient biasing force to allow the corresponding resilient biasing force to move the brake handle from the cocked configuration to the uncocked configuration to move the braking rod from the disengaged configuration to the engaged configuration.

The method may further comprise one or more of: determining, using a first sensor, whether the braking rod is in the engaged configuration or the disengaged configuration; and determining, using a second sensor, whether the brake handle is in the cocked configuration or the uncocked configuration.

The method may further comprise: before the applying the mechanical braking, applying a manual force to the brake handle module to move the brake handle from the uncocked configuration to the cocked configuration against the corresponding resilient biasing force.

The receiving the status indicator may comprise: receiving at the controller a measured parameter associated with a movable component of the electric vehicle; and determining by the controller the status indicator based on the measured parameter.

According to another implementation of the present specification there is provided a system for applying braking to an electric vehicle, the system comprising: a mechanical braking applicator to apply a mechanical braking to the electric vehicle; an electromagnetic braking module to apply an electromagnetic braking to one or more electric motors of the electric vehicle; and a controller to receive a status indicator of an operating status of the electric vehicle, and in response activate one or more of the mechanical braking applicator and the electromagnetic braking module based on a rotational speed of the one or more electric motors.

The controller may be to activate the electromagnetic braking module when the rotational speed is greater than a threshold speed, and activate the mechanical braking applicator when the rotational speed is less than or equal to the threshold speed.

The mechanical braking applicator may comprise: a braking rotor coupled to a wheel hub of the electric vehicle, the braking rotor comprising engagement features in a surface of the braking rotor; and a braking rod terminating in a tip, the braking rod being movable relative to the braking rotor between an engaged configuration whereby the tip contacts the engagement features of the braking rotor and a disengaged configuration whereby the tip does not contact the engagement features.

The engagement features may comprise one or more of: a plurality of depressions in the surface and disposed radially proximate to an outer perimeter of the braking rotor, one or more of the depressions to receive the tip of the braking rod in the engaged configuration; and a plurality of holes in the surface and disposed radially proximate to the outer perimeter of the braking rotor, one or more of the holes to receive the tip of the braking rod in the engaged configuration.

The braking rod may be movable relative to the braking rotor between the engaged configuration and the disengaged configuration along axial directions defined by a first portion of the braking rod proximate to the tip.

The braking rod may comprise a U-bend in a second portion of the braking rod, the U-bend comprising a first side proximate to the tip and a second side distal from the tip, the U-bend to resiliently compress to push the first side and the second side towards one another when the tip is pushed against the braking rotor in the engaged configuration.

The first side may be disposed at a given distance from the second side when the U-bend is in its undeformed configuration; and the braking rod may further comprise a U-bend supporting member disposed on an outside of the U-bend and extending from the first side to the second side, the U-bend supporting member to resist the U-bend resiliently extending by resisting the first side and the second side from moving away from one another beyond the given distance.

The system may further comprise: a lever movably coupled to the braking rod proximate to an end of the braking rod opposite the tip, the lever pivotable about a pivot point; and an actuator rod movably coupled to the lever; wherein: a pulling force applied along a first force direction running along a length of the actuator rod causes the lever to pivot in a first direction about the pivot point and apply a first force to the braking rod to push the tip towards the braking rotor; and a pushing force applied along a second force direction running along the length of the actuator rod causes the lever to pivot in a second direction about the pivot point and apply a second force to the braking rod to pull the tip away from the braking rotor, the second direction opposite the first direction.

The mechanical braking applicator may further comprise a brake handle module comprising: a support member; a brake handle pivotably secured to the support member, the brake handle coupled to the actuator rod to move the braking rod between the engaged configuration and the disengaged configuration, the brake handle having a cocked configuration and an uncocked configuration, the brake handle resiliently biased against the cocked configuration; a catch module pivotably secured to the support member, the catch module having: a catch engaged configuration whereby the catch module engages the brake handle to keep the brake handle in the cocked configuration; and a catch disengaged configuration whereby the catch module does not engage the brake handle, the catch module being resiliently biased towards the catch disengaged configuration; an actuator secured to the support member, the actuator having: an activated configuration whereby the actuator exerts a force on the catch module against the resilient bias of the catch module to keep the catch module in the catch engaged configuration; and a deactivated configuration whereby the actuator releases the force on the catch module; and the brake handle module having: a loaded configuration, whereby the brake handle is in the cocked configuration, the catch module is in the catch engaged configuration, and the actuator is in the activated configuration; and a released configuration, whereby the actuator is in the deactivated configuration, the catch module is in the catch disengaged configuration, and the brake handle is in the uncocked configuration.

When moving from the loaded configuration to the released configuration: a resilient force resiliently biasing the brake handle may force the brake handle module towards the released configuration; and the brake handle may exert a pulling force on the actuator rod to move the braking rod from the disengaged configuration to the engaged configuration; and when moving from the released configuration to the loaded configuration: an external force applied to the brake handle may move the brake handle against its resilient biasing force from the uncocked configuration to the cocked configuration and may move the brake handle module towards the loaded configuration; and the brake handle may exert a pushing force on the actuator rod to move the braking rod from the engaged configuration to the disengaged configuration.

The brake handle may comprise: a handle body pivotably secured to the support member; and a grip secured to the handle body; the handle body having: a notch proximate to an outer perimeter of the handle body, the notch to interact with the catch module; a first connecting structure for connecting the handle body to a first spring, the first spring further securable to a second securing point, moving the brake handle from the uncocked configuration to the cocked configuration to move the first connecting structure away from the second securing point to stretch the first spring to provide the resilient biasing against the brake handle being moved to the cocked configuration; and a second connecting structure for connecting the handle body to the actuator rod.

The catch module may comprise: a catch body pivotably secured to the support member; a catch extension secured to the catch body, the catch extension to engage the notch; and a second spring abutting the catch body, the second spring to be compressed relative to its undeformed configuration when the catch module is in the catch engaged configuration and to be uncompressed when the catch module moves towards the catch disengaged configuration, to resiliently bias the catch module towards the catch disengaged configuration.

The actuator may comprise a solenoid having a push rod, the push rod having an extended configuration and a retracted configuration, whereby: in the activated configuration the push rod is in the extended configuration to exert the force on the catch extension to push against the resilient force of the second spring to keep the catch extension engaged with the notch; and in the deactivated configuration the resilient force of the second spring pushes the push rod towards its retracted configuration and disengages the catch extension from the notch.

The system may further comprise one or more of: a first sensor to detect whether the brake handle module is in the loaded configuration or the released configuration; and a second sensor to detect whether the braking rod is in the engaged configuration or the disengaged configuration.

The electromagnetic braking module may comprise a phase-shorting module to provide passive electromagnetic braking, the passive electromagnetic braking comprising one or more of: shorting together one or more phases of a first electric motor of the one or more electric motors; and shorting one or more phases of the first electric motor to one or more corresponding phases of a second electric motor of the one or more electric motors.

The phase-shorting module may comprise a contactor, the contactor comprising an electrical contact movable between an open position and a closed position, the contactor providing the passive electromagnetic braking in the closed position.

The contactor may comprise: a contactor spring to resiliently bias the electrical contact towards the closed position; and a contactor actuator to push against a resilient biasing force of the contactor spring to move the electrical contact towards the open position.

The contactor actuator may comprise a corresponding solenoid having a movable member, the member to pull against the resilient biasing force of the contactor spring when the corresponding solenoid is powered.

The contactor may further comprise an override module to push against the resilient biasing force of the contactor spring to move the electrical contact towards the open position.

The override module may comprise: an override handle having a first configuration and a second configuration; and an override pull rod movably coupled to the override handle; the override module having: an override active configuration whereby the override handle is in the first configuration and retracts the override pull rod against the resilient biasing force of the contactor spring to move the electrical contact towards the open position; and an override inactive configuration whereby the override handle is in the second configuration which does not retract the override pull rod against the resilient biasing force of the contactor spring.

BRIEF DESCRIPTION OF THE DRAWINGS

Some example implementations of the present specification will now be described with reference to the attached Figures, wherein:

FIG. 1A shows a flowchart of an example method of controlling an electric vehicle, in accordance with a non-limiting implementation of the present specification.

FIG. 1B shows a flowchart of another example method of controlling an electric vehicle, in accordance with a non-limiting implementation of the present specification.

FIG. 2A shows a schematic representation of an example electric vehicle, in accordance with a non-limiting implementation of the present specification.

FIG. 31 shows a side elevation view of the brake handle module shown in FIG. 29, in a loaded configuration.

DETAILED DESCRIPTION

Figure 2B:
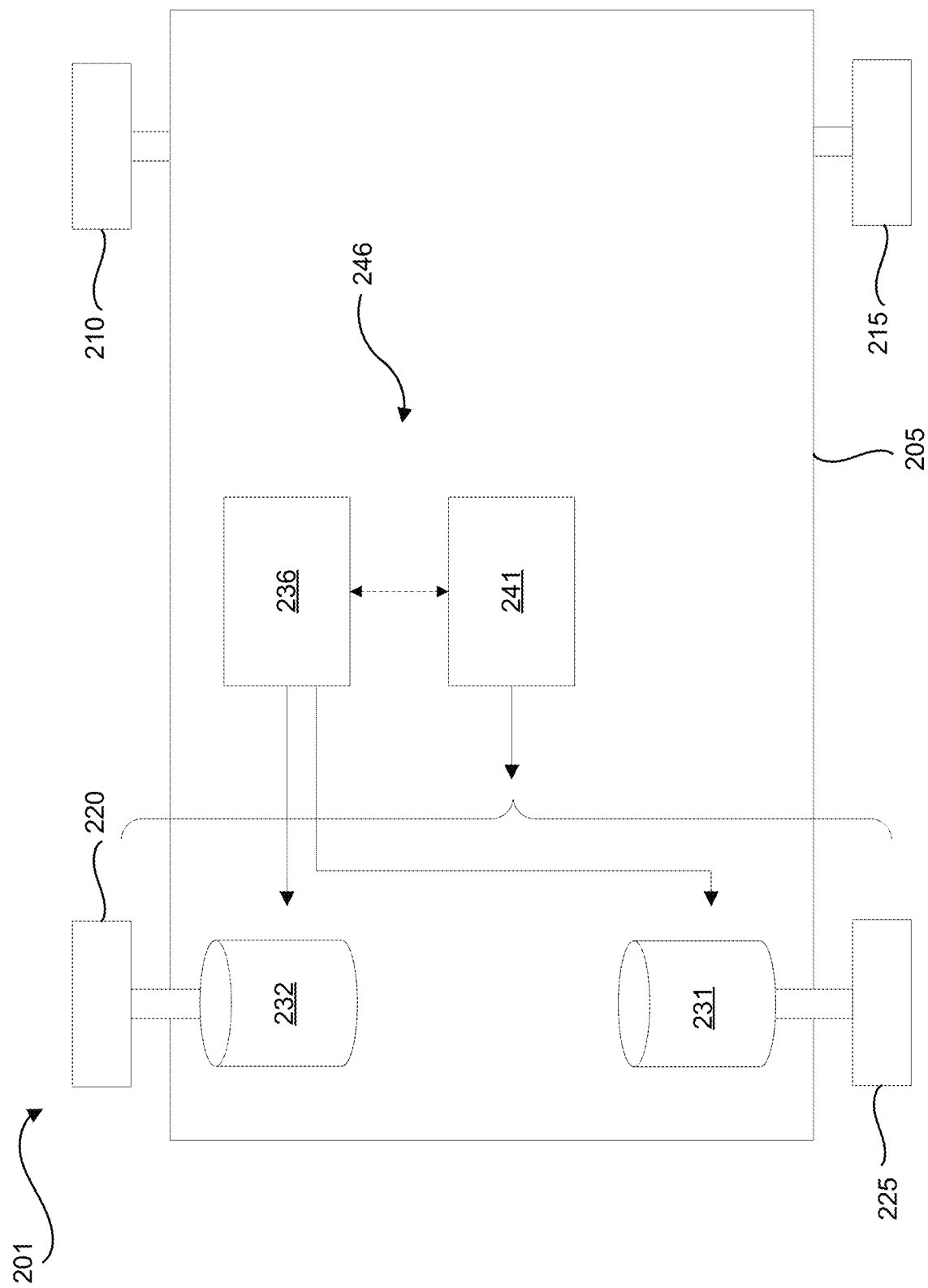
FIG. 2B shows a schematic representation of another example electric vehicle, in accordance with a non-limiting implementation of the present specification.

Unless the context requires otherwise, throughout this specification the word "comprise" and variations thereof, such as, "comprises" and "comprising" are to be construed in an open, inclusive sense, that is as "including, but not limited to."

As used in this specification, the singular forms "a," "an," and "the" include plural referents unless the content clearly dictates otherwise. It should also be noted that the term "or" is generally employed in its broadest sense, that is as meaning "and/or" unless the content clearly dictates otherwise.

In some electric vehicles, the motive force generated by the electric motor may be transmitted to the movement means via a transmission. In some examples, the transmission may comprise gears, a gearbox, and the like. In such vehicles comprising a transmission, the friction provided by the transmission may provide some backup braking to slow down the vehicle should the control systems of the motors and the primary braking systems of the electric vehicle fail.

In addition, the torque multiplying effect provided by a transmission may also reduce the size, complexity, or cost of a brake needed to control an electric vehicle employing such a transmission. In such vehicles, the input provided to the transmission by an electric motor of the electric vehicle may have relatively high rotational speed and relatively low torque. The output provided by the transmission to the movement means of the vehicle may have relatively lower speed and higher torque. In this manner, using a transmission may allow a smaller or lower torque motor to be used to actuate the vehicle. Positioning the brake at the input to the transmission may allow a smaller or less expensive brake to be used to provide effective braking against the actuating force of such a smaller electric motor.

In some example electric vehicles, electric motors may be mechanically coupled to the movement means such as wheels without an intervening transmission. For example, in some electric vehicles the motor may be directly mechanically coupled to the wheels. In such electric vehicles, the backup braking provided by the friction of the transmission may not be available. In addition, in such vehicles, the torque multiplying provided by the transmission will be absent, and relatively larger and higher torque motor(s) may be used to provide sufficient actuation for the vehicle. As such, in such vehicles, relatively larger or more expensive brake(s) may be needed to effectively control the relatively larger or higher torque motor(s).

In addition, in some electric vehicles, controlling the direction or the relative speed of electric motors may be used to steer the vehicle. Examples of such electric vehicles may include zero-turn lawnmowers, and the like. Should the electric motors, or their control systems, fail in such electric vehicles, steering control of the vehicle may also become compromised or may fail entirely. For zero-turn electric vehicles where the electric motor is mechanically coupled to the wheels without the use of a transmission, failure of the electric motors or their control systems may cause a loss of both backup braking and steering control.

To address such failure scenarios, hybrid braking methods and systems may be used to slow down or stop an electric vehicle. Examples of such hybrid braking methods and systems are described herein. In addition, in some examples the hybrid braking described herein may be applied in failure scenarios. As such, such hybrid braking may also act as emergency braking in certain states of an electric vehicle. As such, the state of the electric vehicle may be tracked, and the type of braking to be applied may be determined based on the state of the electric vehicle. FIG. 1 shows a flowchart of an example method 100 for controlling an electric vehicle.

At box 105, a first state indicator of a state of the electric vehicle may be obtained by a controller of the electric vehicle. The first state indicator may comprise digital data, a digital data structure, an electronic signal, and the like. The states of the electric vehicle may be categorized or divided into different states such as a start up state, a standby state, an operational state, a shutdown state, an off state, and the like. It is also contemplated that in some examples, different numbers, types, or categorizations of vehicle states may be used. In addition, in some examples, the states may also be categorized into non-faulted or faulted states. Some example states of an electric vehicle are described in greater detail in relation to FIG. 2C.

The electric vehicle may have a controller to track the states of the electric vehicle, and make determinations of the type of braking to be applied to the electric vehicle. Examples of such controllers are described in greater detail in relation to FIGS. 2A, 2B, and 2D. In some examples, the controller may obtain the first state indicator by receiving it from other components or systems, by retrieving it from a machine-readable storage medium, by sensing or measuring it, by generating or computing it based on other measured parameters, and the like.

At box 110, the controller may receive a status indicator of an operating status of the electric vehicle. Similar to the first state indicator, the status indicator may comprise digital data, a digital data structure, an electronic signal, and the like. The operating status may reflect a parameter or aspect of the operation of the electric vehicle. In some examples, the operating status may also include being off or inactive, or being turned off or inactive. Examples of operating status may include rotor position or speed of one or more electric motors of the electric vehicle, the speed of the electric vehicle, operating or sensor inputs received at the electric vehicle, various fault indicators or alerts received at or generated by the electric vehicle, and the like.

In some examples, receiving the status indicator may comprise receiving at the controller a measured parameter associated with a movable component of the electric vehicle, and determining by the controller the status indicator based on the measured parameter. Examples of the movable components of an electric vehicle may include movement means such as wheels, rotors of electric motors, one or more movable components of a hybrid braking system, brake handles or pedals, on-off key switches, and the like. The controller may determine the status indicator based on such measured parameters. In some examples, the controller may determine the status indicator by calculating the status indicator based on the measured parameter, obtaining the status indicator from a look-up table based on the measured parameter, and the like. It is also contemplated that in some examples, the controller may use a trained machine learning model to obtain or determine the status indicator based on one or more measured parameters associated with a movable component of the electric vehicle.

At box 115, the controller may update the state of the electric vehicle based on the status indicator to an updated state. This updated state may be associated with a second state indicator. Similar to the first state indicator, the second state indicator may comprise digital data, a digital data structure, an electronic signal, and the like. In some examples, the controller may update the state by changing digital data or a digital data structure stored in a machine-readable storage medium (MRSM) associated with or in communication with the controller. In some examples, updating the state may comprise replacing the first state indicator with the second state indicator in a MRSM.

In some examples, based on the status indicator the controller may update the state from a non-faulted state or a faulted state. Further examples of updating the state of an electric vehicle are described in greater detail in relation to FIG. 2C. At box 120, the controller may determine a given braking type of braking to be applied to the electric vehicle. The controller may make this determination based on one or more of the second state indicator and the status indicator. In some examples, the different types of braking may include hybrid or emergency braking, non-emergency mechanical braking, non-emergency electromagnetic braking, and the like.

An example of non-emergency mechanical braking may include mechanical braking using a braking pad coming into contact with a braking rotor to slow down the vehicle. This type of non-emergency braking may be applied during non-faulted operation of the electric vehicle, such as when an operator of the electric vehicle depresses a brake pedal during typical, non-faulted operation of the vehicle. Similarly, an example of non-emergency electromagnetic braking may comprise regenerative braking. This type of non-emergency braking may also be applied during non-faulted operation of the electric vehicle, such as when an operator of the electric vehicle releases the throttle or depresses a brake pedal.

In some examples, the controller may determine whether emergency or non-emergency braking is to be applied based on one or more of the state of the vehicle and the operating status of the vehicle, as reflected by the second state indicator and the status indicator respectively. For example, if the state of the vehicle is a faulted state, the controller may apply emergency braking such as the examples of hybrid braking described herein. Moreover, in some examples the status indicator alone may form the basis for the controller's determination of the type of braking to be applied. In addition, in some examples, a combination of the status indicator and the second state indicator may be used by the controller to determine the type of braking to be applied.

At box 125, braking of the given braking type determined at box 120 may be applied to the electric vehicle. Braking may be applied using one, or a combination of, mechanical and electromagnetic braking. Examples of hybrid emergency braking are described in greater detail in relation to FIGS. 3 to 56B. In some examples, the controller may generate and send wired or wireless signals to other components of the electric vehicle to control or apply one or more of mechanical braking and electromagnetic braking. Moreover, in some examples, the controller may directly control the electromagnetic braking, and generate alerts or prompts for an operator of the electric vehicle to activate or apply the mechanical braking.

In some examples, the updated state may comprise a faulted state, and updating the state of the vehicle may correspondingly comprise updating the state to the faulted state. In some such examples, the controller may determine the braking type to comprise a hybrid braking type. As discussed in greater detail in relation to FIGS. 3 to 56B, hybrid braking may comprise utilizing a combination of electromagnetic braking and mechanical braking. Such a hybrid braking may then be applied to the electric vehicle. In some examples, applying the hybrid braking may comprise applying an electromagnetic braking to one or more electric motors of the electric vehicle using an electromagnetic braking module to reduce a rotational speed of the one or more electric motors. When the rotational speed is equal to or less than a threshold speed, applying the hybrid braking may also comprise applying a mechanical braking to the electric vehicle using a mechanical braking applicator.

Example mechanical braking applicators are described in relation to FIGS. 3-46. Moreover, example electromagnetic braking modules are described in relation to FIGS. 47-56B. In some examples, electromagnetic braking may be more effective at higher speeds, and may become increasingly less effective as the rotational speed of the electric motors decreases. In addition, mechanical braking may be more safely applied at lower speeds. As such, in some examples, electromagnetic braking may be applied initially to reduce the rotational speed to the threshold speed, and once the threshold speed is reached, mechanical braking may be applied to further slow down or stop the rotation of the electric motor.

FIG. 1B shows a flowchart of an example method 130 of applying hybrid braking to an electric vehicle. Method 130 may be used to slow down or stop an electric vehicle that is in a faulted state or otherwise in need of hybrid braking. Examples of such faulted states may include states where the electric motor, or its control system, may have become compromised or may have failed. At box 135, a status indicator of an operating status of the electric vehicle may be received. This operating status may be similar to the operating status described herein in relation to method 100. In some examples, the operating status may include operating parameters of the electric vehicle such as its ground speed, wheel rotation speed, motor rotation speed, motor or motor controller status, battery charge status, and the like. Moreover, in some examples, the operating status may include rates of change in the said operating parameters. In addition, in some examples, the operating parameters may also include the weight of the vehicle, the slope or incline of the terrain being traversed by the vehicle, the wetness or dryness of the terrain being traversed, the ambient temperature, and the like.

The status indicator may reflect one or more of the operating parameters describing the operating status of the electric vehicle. In some examples, the operating status may be monitored by the vehicle itself, and the status indicator may be generated based on the operating status of the vehicle. Moreover, in some examples, the operating status may be monitored by sensors and systems external to the electric vehicle, and the status indicator may be generated based on the operating status by the vehicle itself or by one or more components or systems external to the vehicle.

In some examples, the operating status may comprise the status of a controller used to power and control an electric motor driving one or more wheels or other movement means of the electric vehicle. Moreover, in some examples, the operating status may comprise an error message received at or from such a controller. Furthermore, in some examples, such an error message may be received via a control channel of a CAN-BUS connecting the controller to the motor or other components connected to the electrical circuits of the electric vehicle. In addition, in some examples, upon receipt or generation of such an error message or error signal, the controller may stop powering its corresponding electric motor.

Turning now to box 140 of method 130, an electromagnetic braking may be applied to the electric motor of the electric vehicle in response to the status indicator. It is also contemplated that in some examples, the braking may be applied in response a change in the state of the vehicle, or in response to a combination of the status indicator and the change in the state of the vehicle. The electromagnetic braking may reduce a rotational speed of the electric motor to be equal to or below a threshold speed. In some examples, electromagnetic braking may comprise modifying the electromagnetic operation of the electric motor such that the motor acts to reduce its own rotational speed. In some examples, applying electromagnetic braking may comprise shorting the phases of the electric motor. For example, a sprung bar may be released by a solenoid to short the posts of the motor controller controlling the electric motor. It is contemplated that in some examples other means of shorting the phases of the motor may also be used. Moreover, it is also contemplated that in some examples other methods of applying electromagnetic braking to the electric motor may also be used. Examples of electromagnetic braking are described in greater detail in relation to FIGS. 47-56B.

In addition, it is contemplated that in some examples, a controller may perform the shorting function to initiate braking. In some examples, the motor, controller, or other devices may be used to produce braking forces by converting mechanical energy from vehicular motion into heat in various elements of the vehicle, or into stored energy. The braking may be initiated by mechanical, electrical, or another means.

In some types of electromagnetic braking the strength of electromagnetic braking may be proportional to the rotational speed of the electric motor. In other words, as the rotational speed decreases in response to the application of electromagnetic braking, the strength of the braking force may also decline. As a result, electromagnetic braking becomes less effective as the rotational speed decreases, and the braking force may become relatively weak at low speeds. As such, electromagnetic braking may become less effective or ineffective at slowing down the vehicle to very low speeds, or at stopping the vehicle completely.

To supplement the electromagnetic braking once the rotational speed reaches or drops below the threshold speed, mechanical braking may be applied to further slow or stop the rotation of the electric motor or the movement means such as wheels coupled to that electric motor. At box 145 of method 130, mechanical braking may be applied once the rotational speed is equal to or below the threshold speed. Mechanical braking may act to stop the rotation of the wheel of the electric vehicle, which wheel is coupled to the electric motor. In some examples, the mechanical braking may be applied to the motor, to the movement means such as a wheel mechanically coupled to the motor, or to another component mechanically coupling the motor to the movement means. Mechanical braking in described in greater detail in relation to FIGS. 3-46.

Using a hybrid system in which mechanical braking is used to supplement electromagnetic braking at low speeds may provide the ability to slow down or stop the rotation at low speeds where electromagnetic braking becomes less effective or ineffective. Such a hybrid system may provide the added ability to apply the mechanical braking at rotational speeds low enough (e.g. at or below the threshold speed) such that the application of the mechanical braking is less likely to excessively wear or damage the mechanical braking system or other components or systems of the electric vehicle.

In some examples, such a hybrid braking system may provide the ability to replace large, high-performance braking systems with smaller, simpler mechanical braking systems. Mechanical braking systems may be developed to stop electric vehicles with or without the assistance of the vehicle motor. Mechanical braking systems that are designed to stop the vehicle without the assistance of the vehicle motor must function at high speed and act under high rotational loads. Moreover, most motor-based braking systems for electric vehicles which are able to fully stop the vehicle are not sufficiently robust, reliable, or fault-tolerant. Thus, most mechanical braking systems are designed to function at high speed without the assistance of the electric motor. A hybrid braking system having a motor-based braking system which is robust and reliable may allow the mechanical brake to be designed to function below the threshold speed. Thus, the size, complexity, or cost of the mechanical brake may be reduced in a hybrid braking system. Example systems and components for applying mechanical braking as part of a hybrid braking system are discussed in greater detail in relation to FIGS. 3-46.

In addition, in some examples, electromagnetic braking may continue to be applied when the rotational speed of the electric motor reaches or drops below the threshold speed and the mechanical braking is being applied. It is also contemplated that in some examples, the electromagnetic braking may be turned off when the rotational speed of the electric motor reaches or drops below the threshold speed and the mechanical braking starts to be applied. Moreover, in some examples, once the rotational speed drops below the threshold speed and the mechanical braking starts to be applied, both electromagnetic braking and the mechanical braking may be applied within a transitional range of rotational speeds below the threshold speed. Once the rotational speed drops below the lower end of this transitional range, then the electromagnetic braking may be turned off and the mechanical braking may continue to be applied. In some examples, the mechanical braking may continue to be applied until the rotational speed of a wheel or other movement means coupled to the electric motor reaches zero.

In some examples, neither the electromagnet nor the mechanical braking may alone be sufficient to slow down and stop the vehicle moving at operating speeds. At the initial, higher operating speeds, application of mechanical braking may cause excessive wear or damage to the mechanical braking system or to other components of the electric vehicle. As such, as these higher speeds, electromagnetic braking may be used to slow down the rotational speed of the electric motor. Once the rotational speed becomes sufficiently low, the electromagnetic braking may become weak or ineffective, and the mechanical braking may then be used safely to further slow and stop the rotation of the wheel(s) coupled to the electric motor.

Moreover, in some examples, a hybrid braking controller may monitor the rotational speed of the electric motor, and may activate mechanical braking when the rotational speed of the motor reaches or drops below the threshold speed. This hybrid braking controller may also be described as a "controller" in short. In some examples, such a controller may comprise a processor which receives rotational speed data from a rotational speed sensor, and controls the application of one or more of the electromagnetic braking and the mechanical braking based on the rotational speed data. An example of such a controller is described in greater detail in relation to FIGS. 2A, 2B, and 2D. In addition, in some examples, the hybrid braking controller may include the rotational speed sensor.

Furthermore, in some examples, the controller may monitor the rotational speed of the electric motor, and may generate a notification indicating to an operator of the electric vehicle to activate the mechanical braking. In some examples, the controller may monitor the rotational speed using the rotational speed sensor, which may be part of the controller or may be separate from the controller and in communication with the controller. Furthermore, in some examples, such a notification may comprise a visual notification, an audible notification, a haptic or touch notification, and the like. In addition, in some examples the notification may be sent to a mobile device of the operator. Examples of such a mobile device may include a smart phone, a wearable device, and the like. Furthermore, in some examples where such a notification is generated, the controller need not itself activate the mechanical braking.

Furthermore, in some examples, the hybrid mechanical braking system need not comprise a controller to monitor the rotational speed of the electric motor for purposes of triggering the mechanical braking or generating a notification related to the mechanical braking. In such examples, an operator of the electric vehicle may sense the reduction in the speed of the vehicle (and the corresponding reduction in the rotational speed of the electric motor) caused by the electromagnetic braking, and the operator may then trigger or apply the mechanical braking.

It is contemplated that in some examples, the threshold speed may comprise a speed at which the electromagnetic braking becomes weak or ineffective, and may then be supplemented by the application of the mechanical braking. Moreover, in some examples, the threshold speed may comprise a speed at which the mechanical braking may be safely applied with a reduced risk of the application of the mechanical braking causing excessive wear or damage to the mechanical braking system or other components of the electric vehicle. Furthermore, in some examples, the threshold speed may comprise a speed at which mechanical braking may be safely applied with a reduced risk of the application of the mechanical braking causing the diminution or loss of control of the electric vehicle.

Moreover, in some examples, the mechanical braking may be applied using a mechanical braking actuator. In some examples, this actuator may comprise an electrical actuator, a hydraulic actuator, a pneumatic actuator, a mechanical actuator, and the like. Examples of such an electrical actuator may include an electric motor, a servo, a solenoid, and the like. An example of such an actuator is described in relation to FIGS. 29-32B.

Referring back to method 100, in some examples, the status indicator may comprise an input fault indicator indicating a fault associated with an input received at the controller. Such an input may be associated with controlling one or more electric motors of the electric vehicle. Examples of such an input fault may include a fault in a throttle input received by the controller, and the like. In other words, an input fault may arise in a situation where the controller remains in control of the electric motors and the other components of the electric vehicle, but ascribes one or more faults to the received input (e.g. throttle input, and the like) associated with controlling the electric motors or the other components of the electric vehicle.

It is also contemplated that in some examples, receiving the input fault indicator may include the controller receiving other parameters or inputs, and generating the input fault indicator based on those other parameters or inputs. Furthermore, in some examples, the controller may receive the input fault indicator by retrieving it from a MRSM, and the like. Upon receiving the input fault indicator, the state of the vehicle may be updated to an input-faulted state. In such a faulted state, hybrid braking may be applied. In some examples, the electromagnetic component of this hybrid braking may include one or more of an active electromagnetic braking and a passive electromagnetic braking.

In some examples, the active electromagnetic braking may comprise one or both of controlling the electric motors to ramp down their rotational speed, and controlling the electric motors to hold them at zero speed. This type of electromagnetic braking is described as active because the controller sends control signals to the electric motors to actively reduce their speed or to applies power to the electric motors to keep their speed at zero.

Moreover, in some examples, the passive electromagnetic braking may comprise one or both of shorting together one or more phases of a first of the electric motors of the electric vehicle, and shorting one or more phases of the first electric motor to one or more corresponding phases of a second electric motor of the electric vehicle. Examples of such phase shorting schemes are described in greater detail in relation to FIGS. 47-56B. In some examples, shorting two or more phases of one motor may convert some of the rotational energy of that motor into heat, thereby slowing down the electric motor. Shorting one or more phases of one motor to phase(s) of a second motor may cause one motor to oppose the rotational motion of the second motor to slow the second motor, and vice versa.

In addition, in some examples, in such input-faulted states applying the mechanical braking may comprise moving a braking rod of the mechanical braking applicator from a disengaged configuration to an engaged configuration. Braking rods and their configurations are described in greater detail in relation to FIGS. 3-46.

Furthermore, in some examples, the status indicator may comprise an operational fault indicator indicating a fault associated with the operation of the electric vehicle. In some examples, an operational fault may comprise a fault in controlling the motors, system faults, or other types of faults. Moreover, in some examples, operational faults may comprise faults other than input faults. In some such examples where the status indicator comprises an operational fault indicator, the state of the electric vehicle may then be updated to an operational-faulted state. In addition, in some such examples, applying the electromagnetic braking may comprise applying passive electromagnetic braking, as described above. Mechanical braking may also be applied by moving a braking rod of the mechanical braking applicator from a disengaged configuration to an engaged configuration. In some operational-faulted states, driving power may also be cut to the electric motors of the vehicle.

In some example operational-faulted states, the controller may no longer have reliable or functional control of the electric motors. In some such examples, driving power may be cut to the electric motors due to the controller's lack of reliable control over the motors. Driving power may comprise the higher currents or voltages used to actuate the motors. It is contemplated that in some examples, relatively lower-current or lower-voltage control signals may still be communicated between the controller and the motors after the driving power is cut to the motors. In addition, in some examples, in operational-faulted states active electromagnetic braking may not be applied because the controller may no longer have reliable or functioning control over the motors.

Turning now to FIG. 2A, a schematic representation is shown of an example electric vehicle 200. Electric vehicle 200 comprises a chassis 205 and four wheels 210, 215, 220, and 225. Wheels 220 and 225 are mechanically coupled to, and driven by, an electric motor 230. Vehicle 200 also comprises a hybrid braking system 245. Hybrid braking system 245 comprises braking controller 235 which may be used to apply electromagnetic braking to motor 230. Moreover, in some examples, controller 235 may control an electromagnetic braking module, which module in turn may apply electromagnetic braking to motor 230. Examples of such electromagnetic braking modules are described in greater detail in relation to FIGS. 47-56B. In some examples, controller 235 may be a functionality, a module, or a component of a motor controller used to drive and control electric motor 230. Moreover, in some examples, controller 235 may be separate from the motor controller used to drive or control motor 230 during the typical operation of electric vehicle 200.

In order to apply electromagnetic braking, controller 235 may cause the phases of motor 230 to be shorted. This shorting, in turn, may cause electric motor 230 to provide a resistance against the rotational speed of electric motor 230. In some examples, controller 235 may also monitor the rotational speed of electric motor 230. If upon the application of the electromagnetic braking the rotational speed of electric motor 230 drops to or below a speed threshold, controller 235 may cause a mechanical braking applicator 240 to apply mechanical braking to stop the rotation of wheel 225 which is mechanically coupled to electric motor 230.

In some examples, mechanical braking applicator 240 may also be a part of hybrid braking system 245. Moreover, in some examples, mechanical braking applicator 240 may apply a mechanical braking force to one or more of the moving components in the powertrain starting from electric motor 230 and extending to wheel 225. Moreover, in some examples, mechanical braking applicator 240 may be similar to, or may comprise one or more of, the braking systems shown in FIGS. 3-46.

In FIG. 2A, the connection between controller 235 and mechanical braking applicator 240 is shown in dashed lines to indicate that in some example hybrid braking systems the controller need not directly cause or control the mechanical braking applicator to apply the mechanical braking. It is contemplated that in some examples, the mechanical braking applicator may be triggered by an operator of vehicle 200. In such examples, the operator may turn on or power an actuator which, in turn, supplies the mechanical force used to actuate the mechanical braking applicator. Moreover, in some examples, the operator may exert a mechanical force on the mechanical braking applicator to actuate the applicator.

Furthermore, in some examples, controller 235 may generate a notification when, upon the application of the electromagnetic braking, the rotational speed of motor 230 reaches or drops below a threshold speed. This notification may be perceptible by the operator of vehicle 200. In some examples, the notification may be received by an output interface which renders the notification perceptible by the operator. Examples of such an output interface may include a light, a display screen, a speaker, a haptic engine, and the like.

Upon perceiving this notification, the operator may then activate or trigger mechanical braking applicator 240. In addition, in some examples, the operator of vehicle 200 may sense the changes in the speed of vehicle 200 upon the application of the electromagnetic braking, and may decide when to trigger the mechanical braking. In such examples, controller 235 need not generate a notification based on the speed of motor 230 reaching the threshold speed, and the operator of vehicle 200 need not rely on such a notification in order to trigger the mechanical braking.

Turning now to FIG. 2B, a schematic representation is shown of an example electric vehicle 201. Vehicle 201 may be similar to vehicle 200, with a difference being that vehicle 201 comprises two electric motors 231 and 232. Motor 231 is coupled to wheel 225 to drive wheel 225, and motor 232 is coupled to wheel 220 to drive wheel 220. Motors 231 and 232 may each be similar to motor 230 of vehicle 200. Vehicle 201 also comprises a controller 236 to control motors 231 and 232. In some examples, controller 236 may have features and functions similar to the features and functions of controller 235.

Vehicle 201 comprises a hybrid braking system 246, which comprises a mechanical braking applicator 241 and an electromagnetic braking module. Mechanical braking applicator 241 may apply mechanical braking to one or more components of the powertrain connecting motor 231 to wheel 225 and connecting motor 232 to wheel 220. Some example mechanical braking applicators are described in greater detail in relation to FIGS. 3-46.

While FIG. 2B shows vehicle 201 as having two motors coupled to wheels at the same end of vehicle 201 (e.g. front end or rear end), it is contemplated that in some examples, motor 231 may be coupled to wheels 220 and 225, and motor 232 may be coupled to wheels 210 and 215. The hybrid braking systems described herein may also be applicable to electric vehicles of such a configuration.

In some examples, the electromagnetic braking module may comprise controller 236. Moreover, in some examples, the electromagnetic braking module may comprise, in addition or instead of controller 236, the electromagnetic braking components described herein in relation to FIGS. 47-56B. To apply electromagnetic braking, the electromagnetic braking module may apply passive electromagnetic braking by shorting together one or more phases of one or more of motors 231 and 232. In addition, the electromagnetic braking module may also short one or more phases of motor 231 to one or more phases of motor 232, to provide additional electromagnetic braking.

In vehicle states where controller 236 retains functional and reliable control of motors 231 and 232, controller 236 may also apply active electromagnetic braking to one or more of motors 231 and 232, to actively reduce or ramp down their speed, or to hold their speed at a given speed or at zero speed.

As discussed in relation to FIGS. 2A and 2B, systems for applying braking to an electric vehicle are disclosed herein. Such a system may comprise a mechanical braking applicator to apply mechanical braking to the electric vehicle. The system may also comprise an electromagnetic braking module to apply an electromagnetic braking to one or more electric motors of the electric vehicle. In addition, the system may comprise a controller to receive a status indicator of an operating status of the electric vehicle. In response to the status indicator, the controller may activate one or more of the mechanical braking applicator and the electromagnetic braking module based on a rotational speed of the one or more electric motors.

In some examples, the controller may activate the electromagnetic braking module when the rotational speed is greater than a threshold speed, and may activate the mechanical braking applicator when the rotational speed is less than or equal to the threshold speed. Moreover, in some examples, the controller may track the state of the vehicle or changes to the state of the vehicle. The controller may activate one or more of the mechanical braking applicator and the electromagnetic braking module based on a state indicator associated with the state or a change in the state of the vehicle, or based on a combination of the status indicator and the state indicator.

Figure 2C:
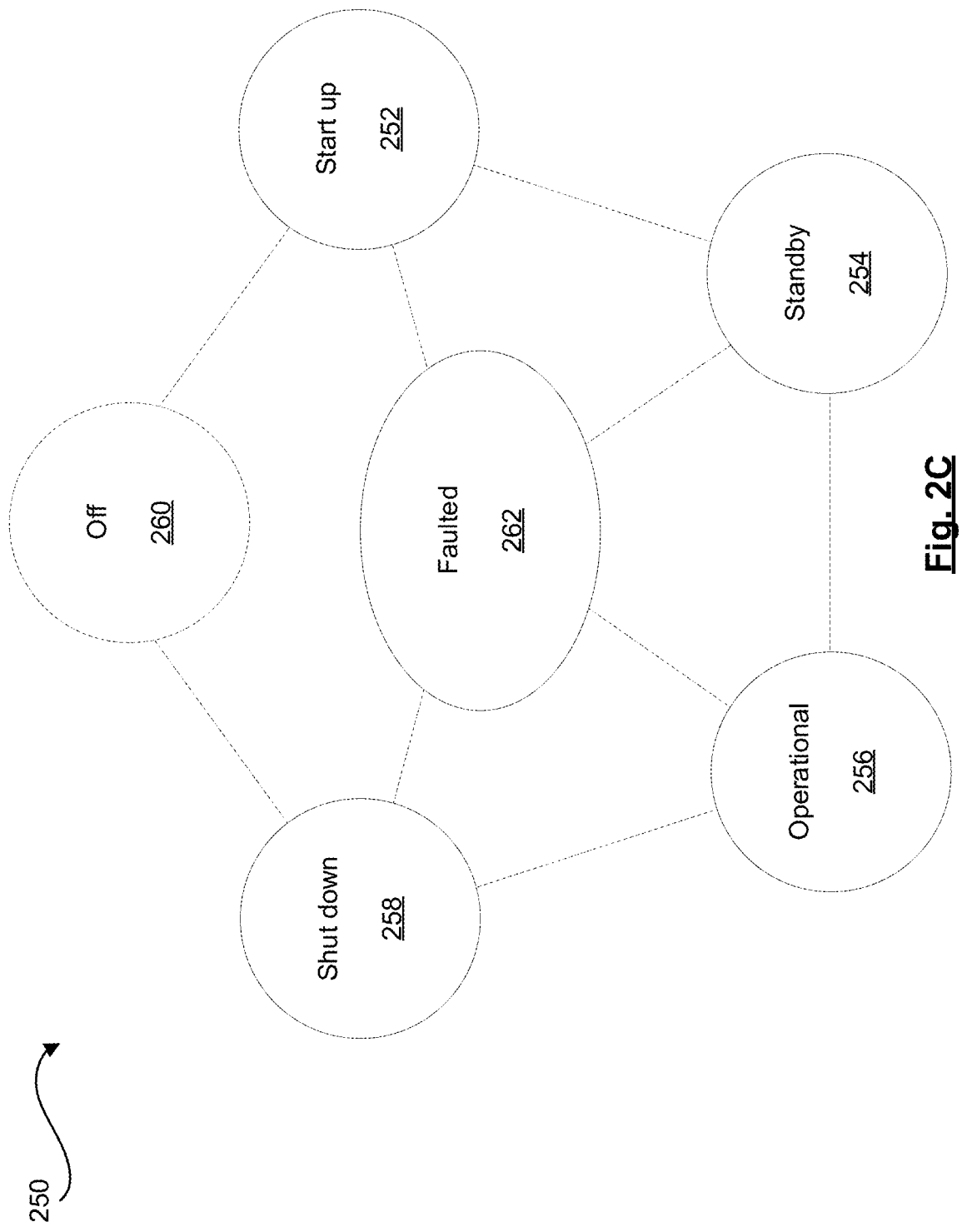
FIG. 2C shows a schematic representation of an example set of states of an example electric vehicle, in accordance with a non-limiting implementation of the present specification.

Turning now to FIG. 2C, a schematic representation 250 is shown of an example set of states of an electric vehicle. These example states include start up 252, standby 254, operational 256, shut down 258, off 260, and faulted 262 states. It is contemplated that in some examples, other numbers, types, or arrangements of states may also be used to describe or categorize the states of an electric vehicle. In addition, while FIG. 2C shows in dotted lines some connections or possible transitions between different states, it is contemplated that in some examples transitions other than those shown in FIG. 2C may also be possible.

The startup state may represent a state in which the vehicle is preparing to come out of the off state and into the standby state. Hybrid or emergency braking may be active in the start up state. The start up state may include certain checks of the different subsystems of the electric vehicle to assess whether the vehicle is in working order and ready for operation. Some examples of such checks may include assessing whether the mechanical braking applicator is activated, whether the electromagnetic braking module is activated, and the like. An error or fault detected in the start up state may trigger a transition to the faulted state.

Once the startup checks are successfully completed, the vehicle may transition into the standby state. In this state, the vehicle may be ready to receive control inputs by an operator and send driving power to the motors to transition to the operational state. As part of the transition from the start up 252 to the stand by 254 states, one or both of the mechanical braking applicator and the electromagnetic braking module may be controlled to discontinue the application of hybrid braking to the vehicle. A fault occurring during the standby state may trigger the state to transition to faulted 262 state.

As control inputs are received from the operator and driving power is sent to the motors, the vehicle my transition from standby 254 state to operational 256 state. A fault occurring during the operation of the vehicle may trigger a transition to faulted 262 state and the activation and application of the hybrid braking.

If in operational 256 state or another one the non-faulted states the operator provides an input to shut down the vehicle, then the vehicle may transition to shut down 258 state. In shut down 258 state hybrid braking may be applied to keep the vehicle immobile once the vehicle is shut down or inactive. A fault occurring during shut down 258 state may also trigger a transition to faulted 262 state.

In some examples, the vehicle may also have an off 260 state. The off state may comprise an inactive state, a power off state, a storage stage, and the like. In some examples, during the off state the controller may receive at least some power, to allow the controller to monitor the state of the vehicle and to wake up or reactivate the vehicle on demand. In such examples, the controller may be able to maintain or track a separate off 260 state. It is also contemplated that in some examples, power may be cut off to the components of the electric vehicle, including the controller, in the off state. In such examples where power is cut off during the off state, the controller may not maintain or track a separate state corresponding to when the vehicle is off with all power cut off. In FIG. 2C the off 260 state is depicted in dashed lines to signify that in some examples power may be cut off when the vehicle is off, and the controller need not track a separate or dedicated off state in such examples. Furthermore, in some examples, hybrid braking may be applied or in effect in the off 260 state.

Moreover, in some examples, faulted 262 state may comprise substates such as a traction-faulted state, a system-faulted state, and the like. As such, in some examples receiving the operational fault indicator may comprise receiving a traction fault indicator associated with a corresponding fault in controlling one or more electric motors of the electric vehicle. In such examples, updating the state of the electric vehicle based on the status indicator may comprise updating the state to the updated state comprising a traction-faulted state.

Furthermore, in some examples, receiving the operational fault indicator may comprise receiving a system fault indicator associated with a corresponding fault in the electric vehicle. In such examples, updating the state of the electric vehicle based on the status indicator may comprise updating the state to the updated state comprising a system-faulted state. System faults may comprise several different faults including faults in the various hardware and software components of the electric vehicle which may trigger a transition to the system-faulted state. In some examples, system faults may comprise some or all faults that are other than input faults and traction faults. Moreover, in some examples, one or more of traction faults and system faults may be latching faults. Latching faults may comprise faults that require a system reboot, i.e. a restart of the electric vehicle, to clear the fault. In some examples, clearing the fault may comprise transition from the faulted state to a non-faulted state.

In addition, in some examples, receiving the operational fault indicator may comprise receiving an operator seated fault indicator associated with a seat sensor ceasing to detect an operator of the electric vehicle as being seated in an operator seat of the electric vehicle. In such examples, updating the state of the electric vehicle based on the status indicator may comprise updating the state to the updated state comprising the system-faulted state. In other words, a fault associated with the operator no longer being detected as being seated in the operator seat may also trigger a system fault.

Figure 2D:
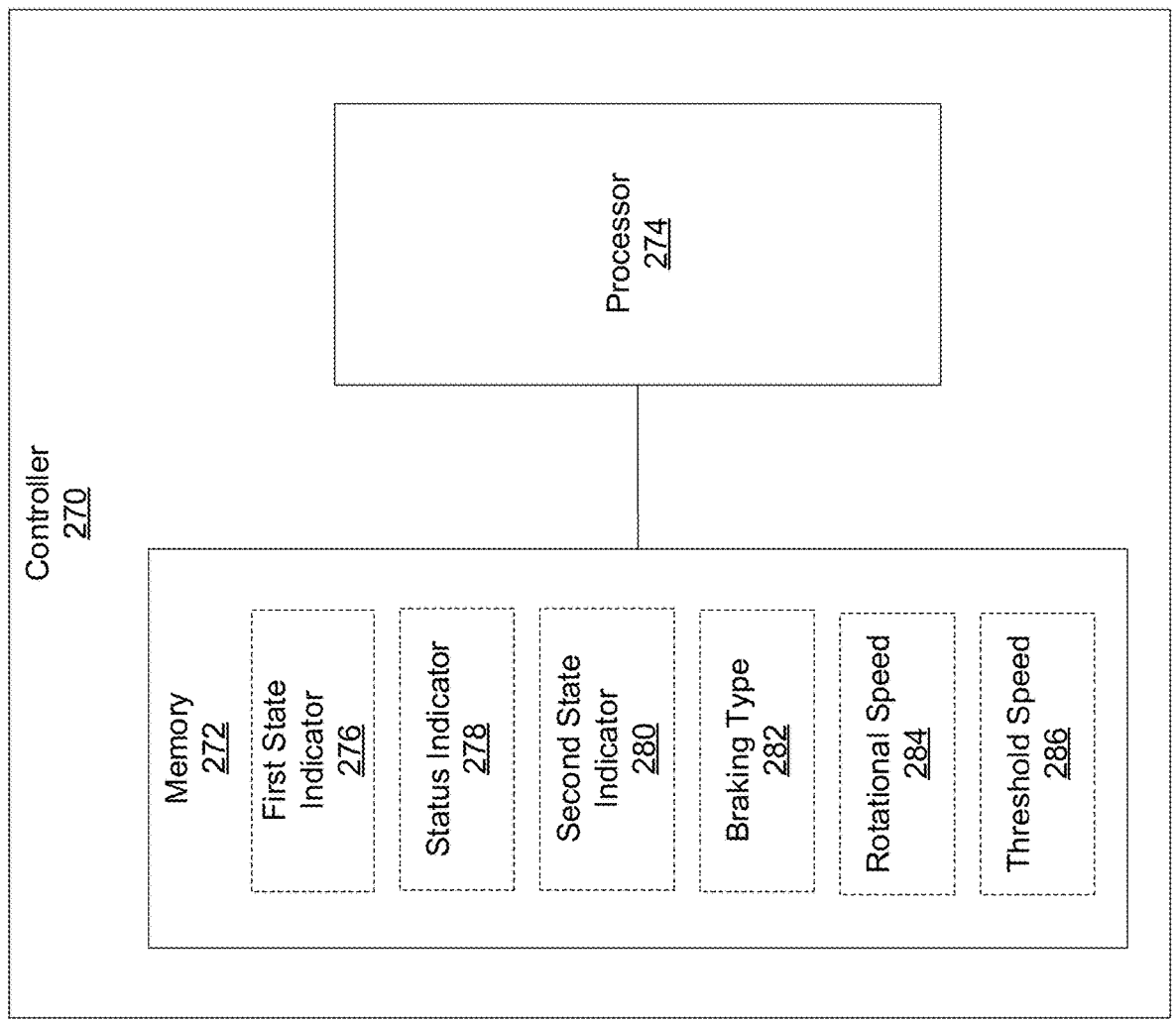
FIG. 2D shows a schematic representation of an example controller for controlling an electric vehicle, in accordance with a non-limiting implementation of the present specification.

Turning now to FIG. 2D, a schematic representation is shown of an example controller 270 for controlling an electric vehicle. Controller 270 comprises a memory 272 to store instructions executable by a processor. Controller 270 also comprises a processor 274 in communication with memory 272. Controller 270 may have the features and perform the functions described in relation to methods 100, 130 and the other methods described herein.

Processor 274 may comprise a central processing unit (CPU), a graphics processing unit (GPU), a microcontroller, a microprocessor, a processing core, a field-programmable gate array (FPGA), or similar device capable of executing instructions. Processor 274 may cooperate with memory 272 to execute instructions.

Memory 272 may comprise a non-transitory machine-readable storage medium which may comprise an electronic, magnetic, optical, or other physical storage device that stores executable instructions. The machine-readable storage medium may include, for example, random access memory (RAM), read-only memory (ROM), electrically-erasable programmable read-only memory (EEPROM), flash memory, a storage drive, an optical disc, and the like. The machine-readable storage medium may be encoded with executable instructions.

In some examples, controller 270 may obtain a first state indicator 276 of a state of an electric vehicle. Controller 270 may then receive a status indicator 278 of an operating status of the vehicle. Controller 270 may update the state of the vehicle based on status indicator 278 to an updated state. The updated state may be associated with a second state indicator 280. In addition, controller 270 may determine a given braking type 282 of a braking to be applied to the vehicle. This determination may be based on one or more of status indicator 278 and second state indicator 280. Moreover, in some examples, controller 270 may cause braking of given braking type 282 to be applied to the vehicle. Furthermore, in some examples, some or all of the actions or functions attributed herein to controller 270 may be performed with the assistance of, or performed by, processor 274 of controller 270.

In addition, in some examples, controller 270 may update the state to an updated state comprising a faulted state and may determine the given braking type to comprise a hybrid braking. Controller 270 may then apply, directly or indirectly, such a hybrid braking by applying an electromagnetic braking to one or more electric motors of the elected vehicle using an electromagnetic braking module to reduce a rotational speed 284 of the motors. When the rotational speed is equal to or less than a threshold speed 286, controller 270 may also apply, directly or indirectly, mechanical braking to the electric vehicle using a mechanical braking applicator.

Furthermore, in some examples, controller 270 may receive status indicator 278 of an operating status of the electric vehicle, and in response may activate one or more of a mechanical braking applicator and an electromagnetic braking module based on rotational speed 284 of one or more of the electric motors. Moreover, in some examples, controller 270 may activate the electromagnetic braking module when rotational speed 284 is greater than threshold speed 286, and may activate the mechanical braking applicator when rotational speed 284 is less than or equal to threshold speed 286.

In addition, it is contemplated that in some examples, controller 270 may have the features or perform the functions associated with the methods, functions, and controllers described herein. It is also contemplated that in some examples, controller 270 may have features or perform functions other than those associated with the methods, functions, and controllers described herein. Moreover, in FIG. 2D dashed lines are used to depict first state indicator 276, status indicator 278, second state indicator 280, braking type 282, rotational speed 284, and threshold speed 286. The use of dashed lines is intended to indicate that in some examples one or more of the entities shown in dashed lines may be stored in controller 270 outside of memory 272, or stored outside of controller 270.

Figure 3:
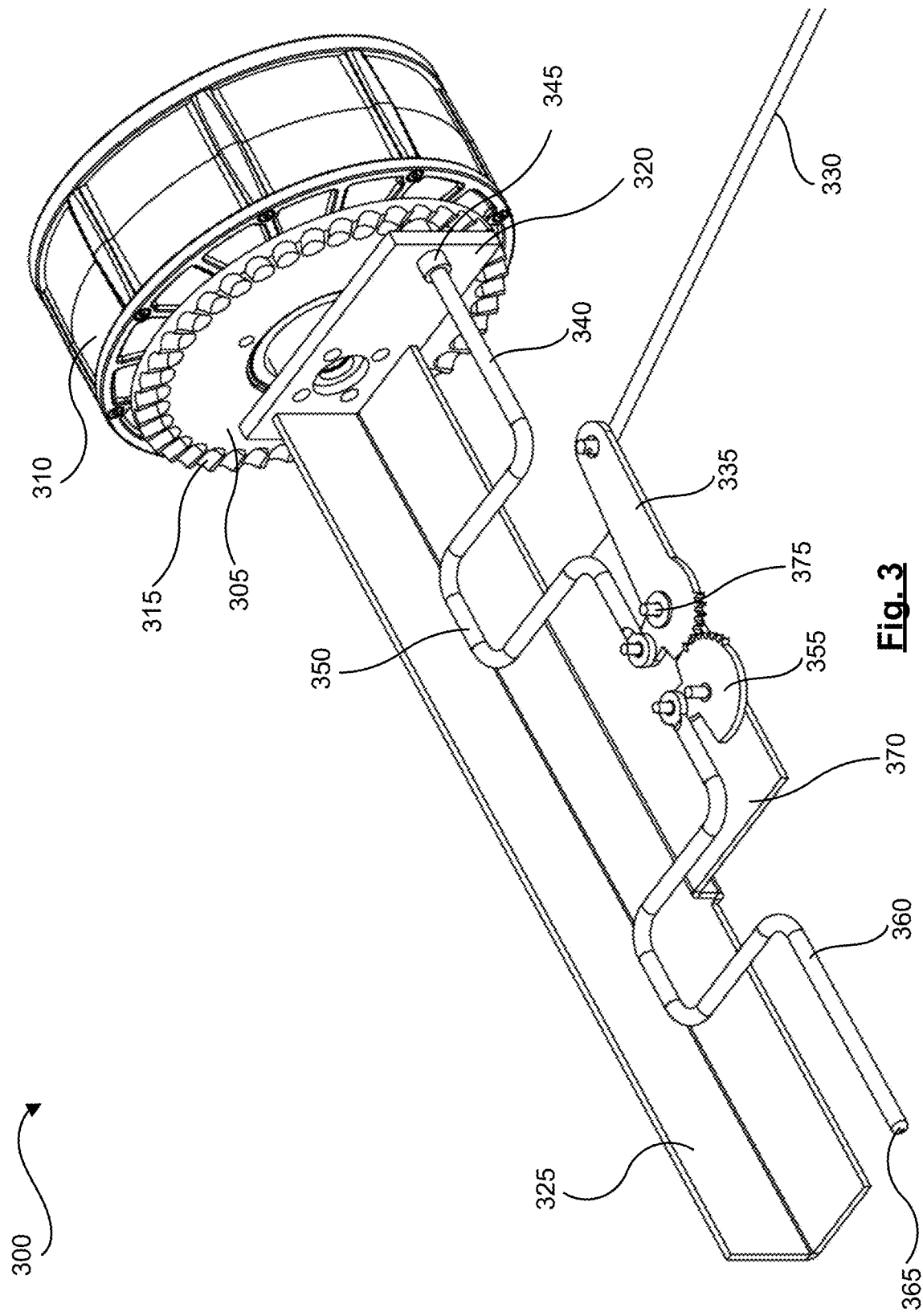
FIG. 3 shows a partial perspective view of an example mechanical braking applicator in a disengaged configuration, in accordance with a non-limiting implementation of the present specification.

Turning now to FIG. 3, a partial perspective view is shown of an example mechanical braking applicator 300. Mechanical braking applicator 300 comprises a braking rotor 305 coupled to a hub 310 of the electric vehicle within which vehicle mechanical braking applicator 300 is implemented. In some examples, hub 310 may be coupled to a wheel of the electric vehicle. In such examples, hub 310 may also be described as a wheel hub. Moreover, in some examples, hub 310 may comprise an in-hub electric motor, or a primary or an additional braking system. It is also contemplated that in some examples, the electric motor may be disposed outside of hub 310 and may be mechanically coupled to hub 310 to drive the wheel that is coupled to hub 310.

Rotor 305 comprises engagement features in a surface of rotor 305. In FIG. 3 these engagement features comprise a plurality of scallop-shaped depressions 315 in the surface of rotor 305 and disposed radially proximate to an outer perimeter of rotor 305. In other words, the depressions 315 may be disposed along and proximate to an outer perimeter of rotor 305. Moreover, depressions 315 may be disposed on a surface of rotor 305 facing away from hub 310. Hub 310 is rotatably coupled to a supporting frame comprising a supporting plate 320 connected to a crossmember 325. It is contemplated that in some examples the shape, number, orientation, or arrangement of the depressions on the rotor may be different than those shown in FIG. 3.

Mechanical braking applicator 300 may also comprise an actuator rod 330, a lever 335, and a braking rod 340. Actuator rod 330 may be movably coupled to lever 335. Actuator rod 330 may receive an actuating force, and may transmit the actuating force to lever 335. In some examples, this actuating force may comprise a pulling or pushing force in a direction running along the length of actuator rod 330. Lever 335 in turn may be pivotably coupled to an extension 370 of crossmember 325 at a pivot point 375. Lever 335 may also be movably coupled to braking rod 340 proximate to an end of the braking rod opposite the tip. Lever 335 may receive a pulling force exerted by actuator rod 330 in a direction away from lever 335, and may transtate this force into a pushing force exerted along braking rod 340 to push braking rod 340 towards rotor 305.

Figure 4:
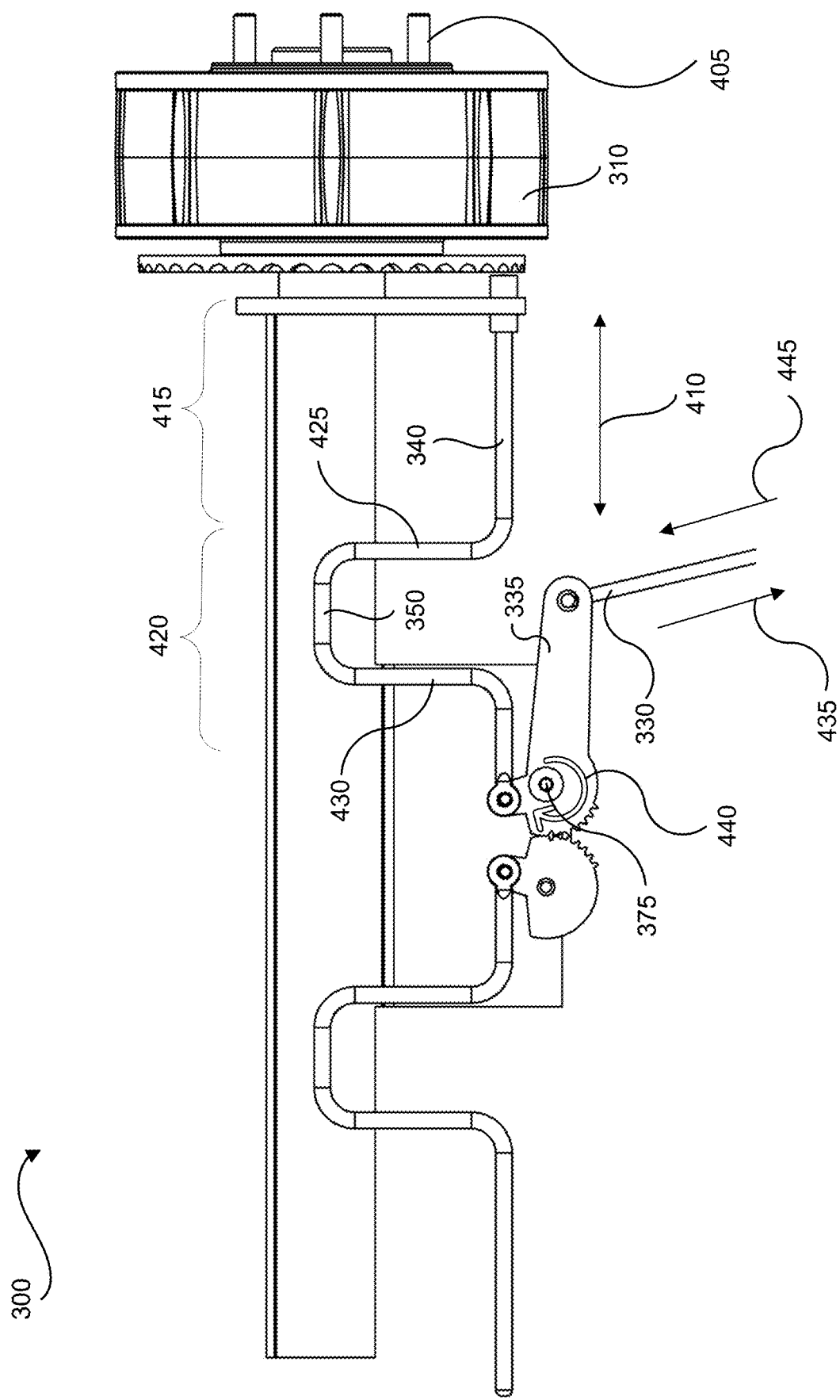
FIG. 4 shows a top plan view of the mechanical braking applicator shown in FIG. 3.

In other words, as shown in FIG. 4, a pulling force applied along a first force direction 435 running along a length of actuator rod 330 causes lever 335 to pivot in a first direction 440 about pivot point 375 and apply a first force to braking rod 340 to push the tip towards braking rotor 305. Similarly, a pushing force applied along a second force direction 445 running along the length of actuator rod 330 causes lever 335 to pivot in a second direction about pivot point 375 and apply a second force to braking rod 340 to pull the tip away from braking rotor 305. The second direction is opposite first direction 440.

Referring back to FIG. 3, braking rod 340 comprises a rod tip which is received inside a guide bushing 345 secured to supporting plate 320. As such, this rod tip is not visible in FIG. 3. This rod tip may be similar to a rod tip 365 of braking rod 360. The pushing force exerted by lever 335 on braking rod 340 may push the rod tip of braking rod 340 out of bushing guide 345 and towards and into depressions 315 of rotor 305. Engagement of the rod tip of braking rod 340 with depressions 315 may slow down or stop the rotation of rotor 305. As rotor 305 is mechanically coupled to hub 310 and a wheel supported thereto (the wheel is not shown in FIG. 3), slowing down the rotation of rotor 305 also causes the rotation of the hub, and any electric motor or wheel coupled thereto, to slow down or stop as well.

Braking rod 340 comprises a U-bend 350 in braking rod 340, which U-bend 350 is disposed between the coupling point of braking rod 340 with lever 335 and the rod tip of braking rod 340. When lever 335 pushes braking rod 340 towards rotor 305, U-bend 350 may deform resiliently, thereby providing a resilient force pushing the rod tip of braking rod 340 towards rotor 305. In operation, once actuator rod 330 is pulled and the rod tip of braking rod 340 is consequently pushed towards rotor 305 and into depressions 315, the movement and the rotational energy of hub 310 and the wheel attached thereto may force the rod tip out of the first one or more depressions 315 into which the rod tip initially enters. In the event the rod tip is pushed out of the first one or more depressions 315, the resilient pushing force provided by the resilient deformation of U-bend 350 may continue to push the rod tip towards rotor 305 and its depressions 315. Eventually the physical interaction of the rod tip with rotor 305 slows down the rotation of rotor 305 sufficiently to allow the rod tip to enter and remain in a given depression 315. At this point mechanical braking applicator 300 will have stopped the rotational motion of hub 310 and the wheel attached thereto.

In order to bring the rotation of hub 310 to a stop more quickly, the pulling force exerted on actuator rod 330 may be increased, which in turn, increases the pushing force pushing the rod tip towards and into depressions 315 of rotor 305. This increased force of the interaction of the rod tip with depressions 315 of rotor 305 may, in turn, bring the rotation of rotor 305 to a stop more quickly.

While FIG. 3 shows braking rod 340 comprising U-bend 350 to provide a resilient pushing force, it is contemplated that in some examples braking rod 340 may comprise a different mechanism for providing a pushing force. Examples of such a mechanism may include a coil spring, a pneumatic piston, a brake handle module, and the like. It is also contemplated that in some examples, braking rod 340 need not comprise a U-bend or a dedicated mechanism for providing a pushing force.

While FIG. 3 shows one rotor 305 connected to one hub 310, it is contemplated that mechanical braking applicator 300 may comprise a second rotor connected to a second hub both rotatably coupled to a second supporting plate connected to crossmember 325. The second supporting plate, second rotor, and second hub may be similar to supporting plate 320, rotor 305, and hub 310. The second hub may support a second wheel. In some examples, the two wheels supported by hub 310 and the second hub may be similar to wheels 220 and 225 shown in FIGS. 2A and 2B. As shown in FIG. 3, lever 335 may comprise gears that mate and cooperate with complementary gears of a pivot component 355.

Component 355 may be pivotably coupled to extension 370 of crossmember 325. Component 355 may also be movably coupled to a second braking rod 360 which terminates in a corresponding rod tip 365. While not shown in FIG. 3, rod tip 365 may be movably received inside a second guide bushing (not shown in FIG. 3) secured to the second supporting plate (not shown in FIG. 3). When actuator rod 330 is pulled, actuator rod 330 in turn pulls lever 335. The resulting pivoting movement of lever 335 about pivot point 375 is transmitted to component 355 by the gears of lever 335 cooperating with the corresponding gears of component 355. The transmission of the pivoting movement of lever 335 to component 355 causes component 355 to pivot about its corresponding pivot point.

This pivoting movement of component 355 is then transmitted to braking rod 360 to push braking rod 360 in a direction away from rotor 305. In other words, the pivoting movement of component 355 caused by the exertion of the pulling force on actuator rod 330 causes rod tip 365 of braking rod 360 to be pushed closer to its corresponding rotor (not shown in FIG. 3). In this manner, the pulling of a single actuator rod 330 may be used to move two braking rods 340 and 360 to exert a braking force on two corresponding rotors, namely rotor 305 and the second rotor which is not shown in FIG. 3.

While FIG. 3 shows mechanical braking applicator 300 comprising component 355 and second braking rod 360, it is contemplated that in some examples the mechanical braking applicator need not comprise component 355 and braking rod 360. In other words, in some examples the mechanical braking applicator may apply the mechanical braking force to one rotor coupled to one hub, and need not apply mechanical braking force to two rotors and to two corresponding hubs simultaneously. Moreover, it is contemplated that in some examples, the mechanical braking applicator may have a support structure different than supporting plate 320 and crossmember 325. Furthermore, it is contemplated that in some examples the design, geometry, or components of the mechanical braking applicator may be different than those shown in FIG. 3.

FIG. 3 shows the mechanical braking applicator in a disengaged configuration whereby the rod tips of braking rods 340 and 360 are retracted away from, and not in contact with, the engagement features of their corresponding rotors. In other words, the braking rod is movable relative to the braking rotor between an engaged configuration whereby the tip contacts the engagement features of the braking rotor and a disengaged configuration whereby the tip does not contact the engagement features.

FIG. 4 shows a top plan view of the mechanical braking applicator shown in FIG. 3. FIG. 4 also shows bolts 405 which may be used to attach a wheel to hub 310. As shown in FIGS. 3 and 4, the braking rod is movable relative to the braking rotor between the engaged configuration and the disengaged configuration along axial directions 410 defined by a first portion 415 of braking rod 340 proximate to the tip. Braking rod 340 comprises a second portion 420, which second portion comprises U-bend 350.

U-bend 350 comprises a first side 425 proximate to the tip of braking rod 340 and a second side 430 distal from the tip. U-bend 350 resiliently compresses, i.e. first side 425 and second side 430 are pushed towards one another, when the tip is pushed against braking rotor 305 in the engaged configuration. At least a portion of the resilience of U-bend 350 may be provided by the resilience of the material of braking rod 340. In some examples, braking rod 340 may be made of a metal, an alloy, and the like.

Figure 5:
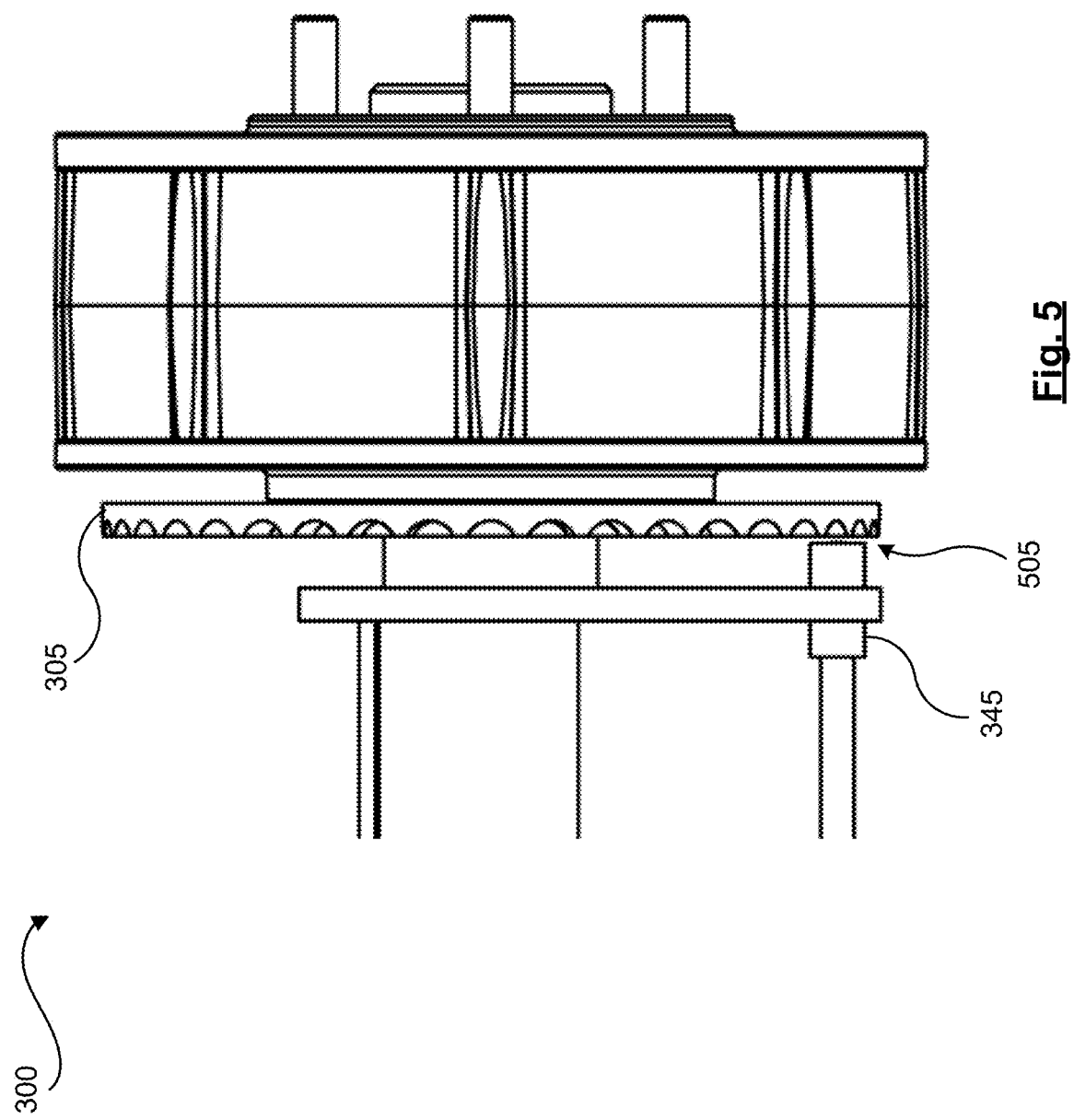
FIG. 5 shows a magnified portion of the mechanical braking applicator shown in FIG. 4.

FIG. 5 shows a magnified portion of the mechanical braking applicator shown in FIG. 4. FIG. 5 shows that in the disengaged configuration there is a gap 505 which separates rotor 305 from the rod tip of braking rod 340 as well as from the end of guide bushing 345. This gap may allow rotor 305 to rotate freely without interference by the rod tip of braking rod 340 or by guide bushing 345.

Figure 6:
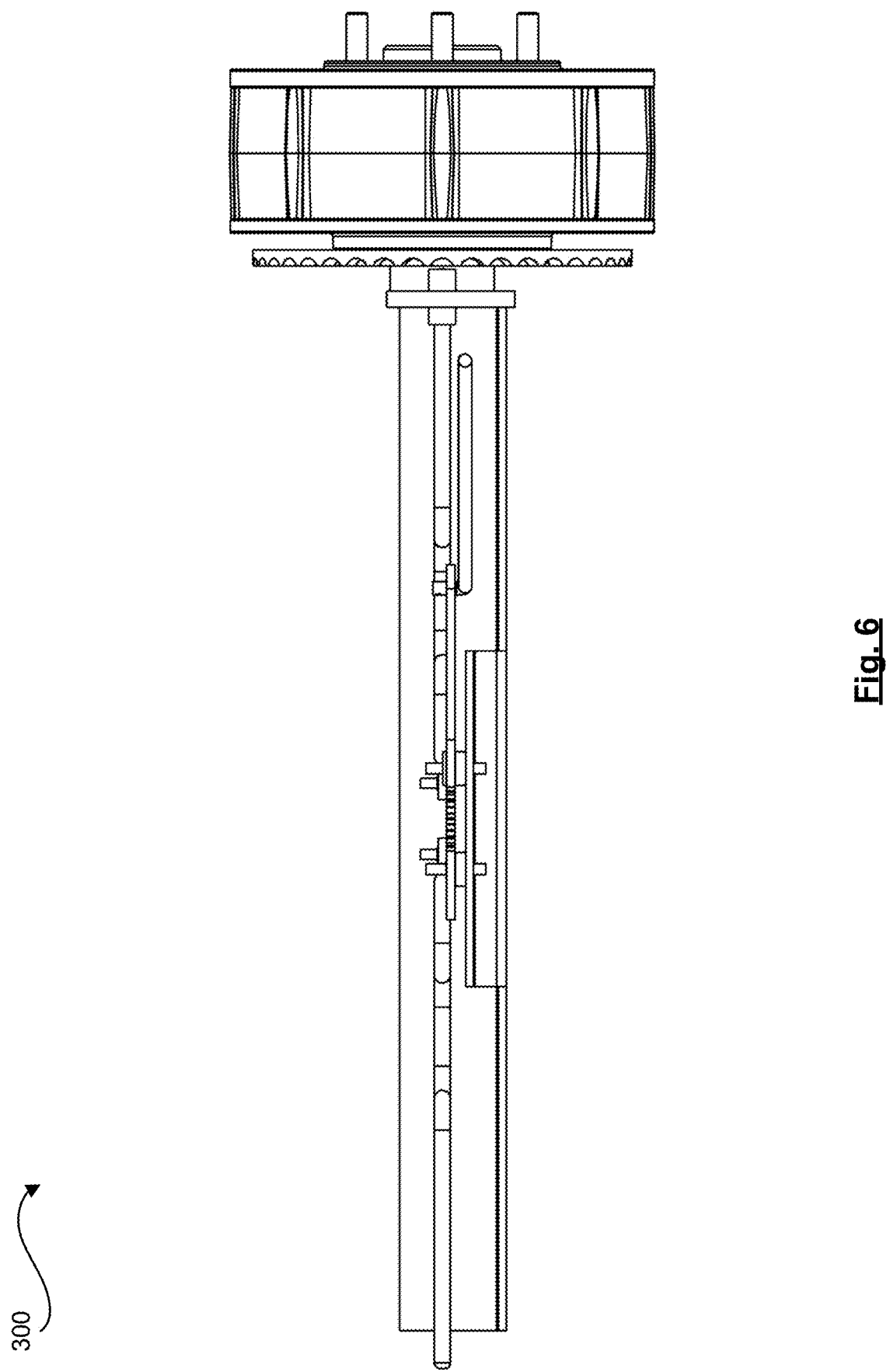
FIG. 6 shows a front side elevation view of the mechanical braking applicator shown in FIG. 3.
Figure 7:
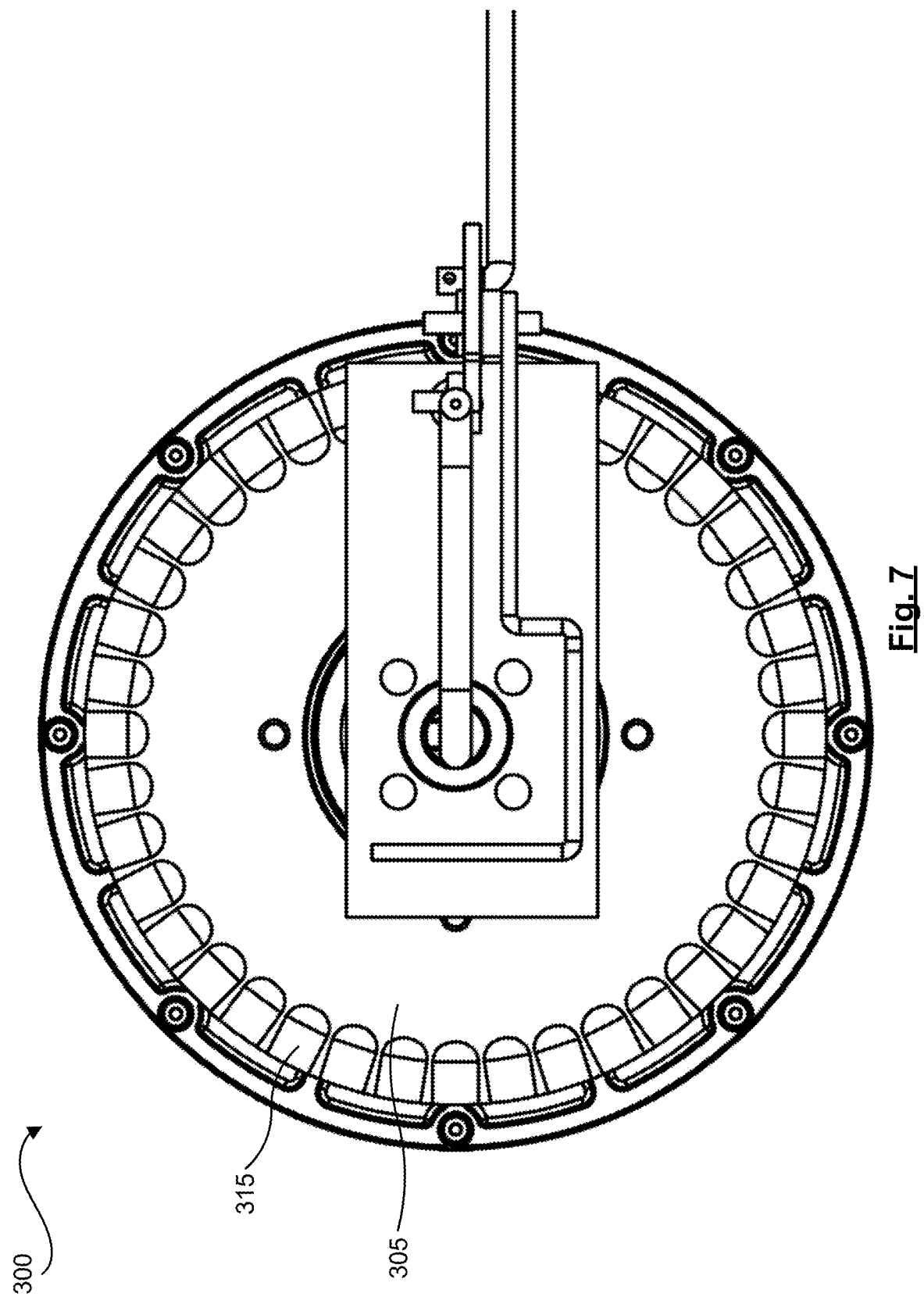
FIG. 7 shows a left side elevation view of the mechanical braking applicator shown in FIG. 3.
Figure 8:
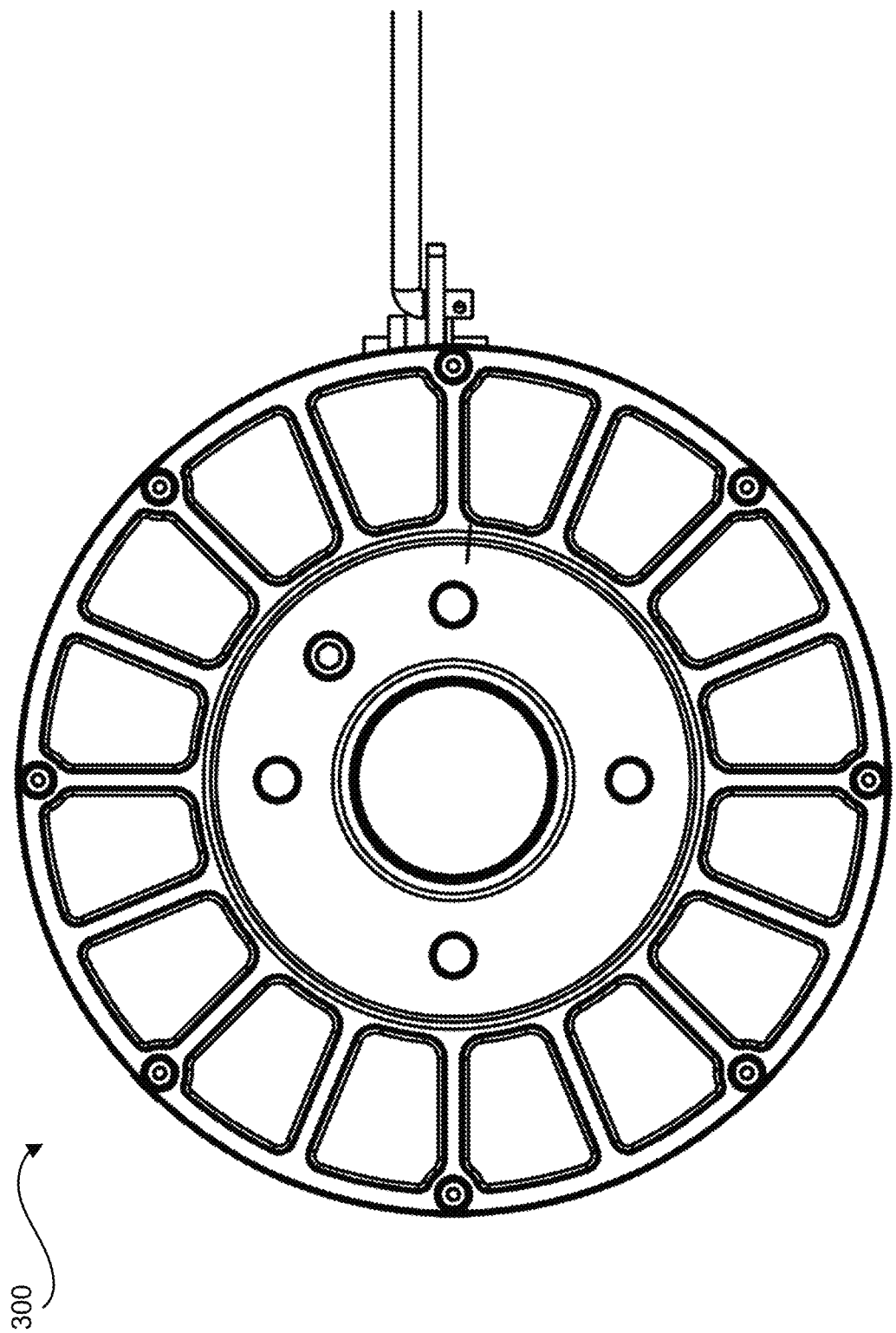
FIG. 8 shows a right side elevation view of the mechanical braking applicator shown in FIG. 3.

FIG. 6 in turn shows a front elevation view of the mechanical braking applicator shown in FIG. 3. FIG. 7 shows a left side elevation view of the mechanical braking applicator shown in FIG. 3. FIG. 7 shows rotor 305 comprising a plurality of depressions 315 disposed radially proximate the outer perimeter of rotor 305. FIG. 8, in turn, shows a right side elevation view of the mechanical braking applicator shown in FIG. 3.

Figure 9:
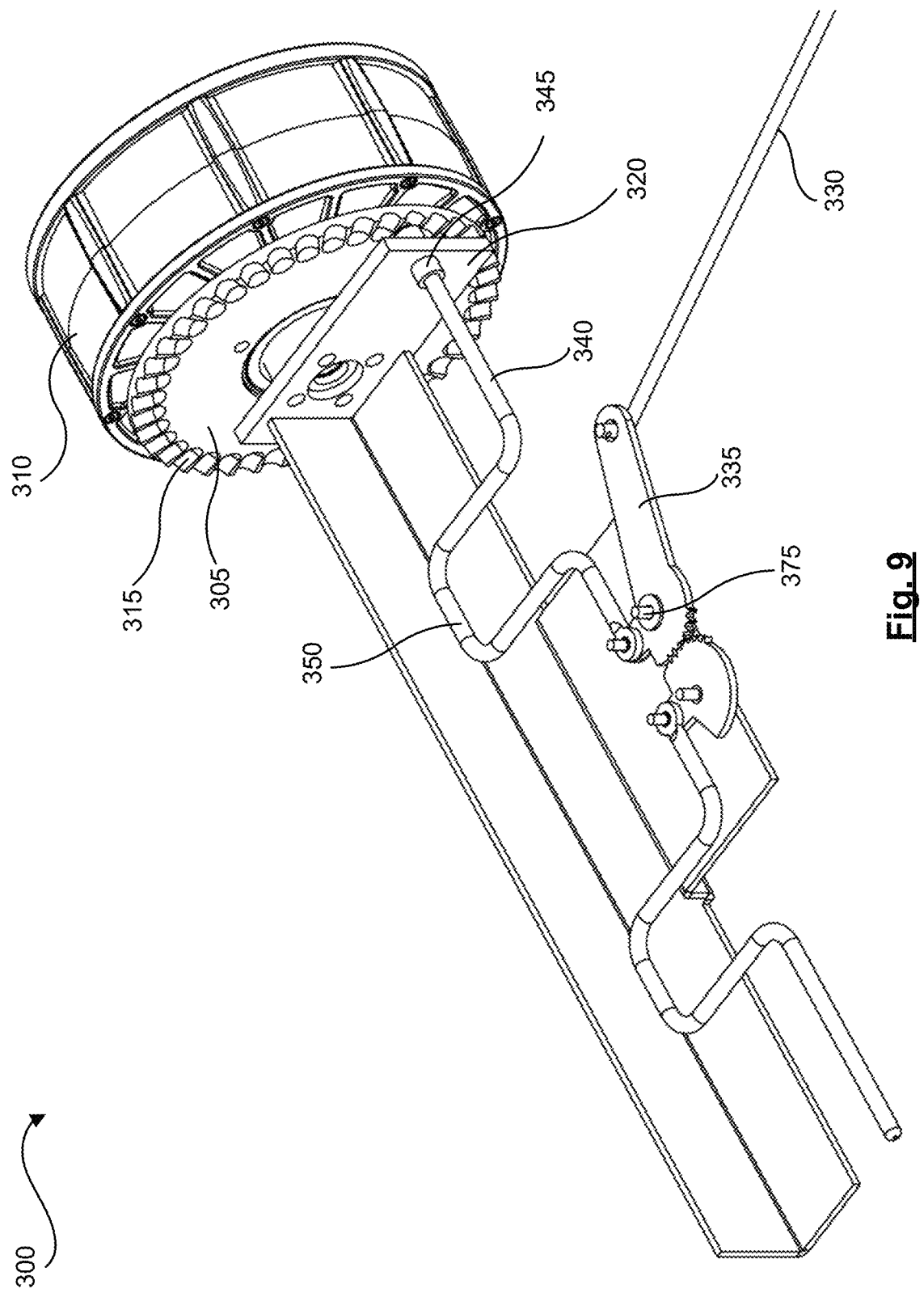
FIG. 9 shows the mechanical braking applicator of FIG. 3 in an engaged configuration.
Figure 10:
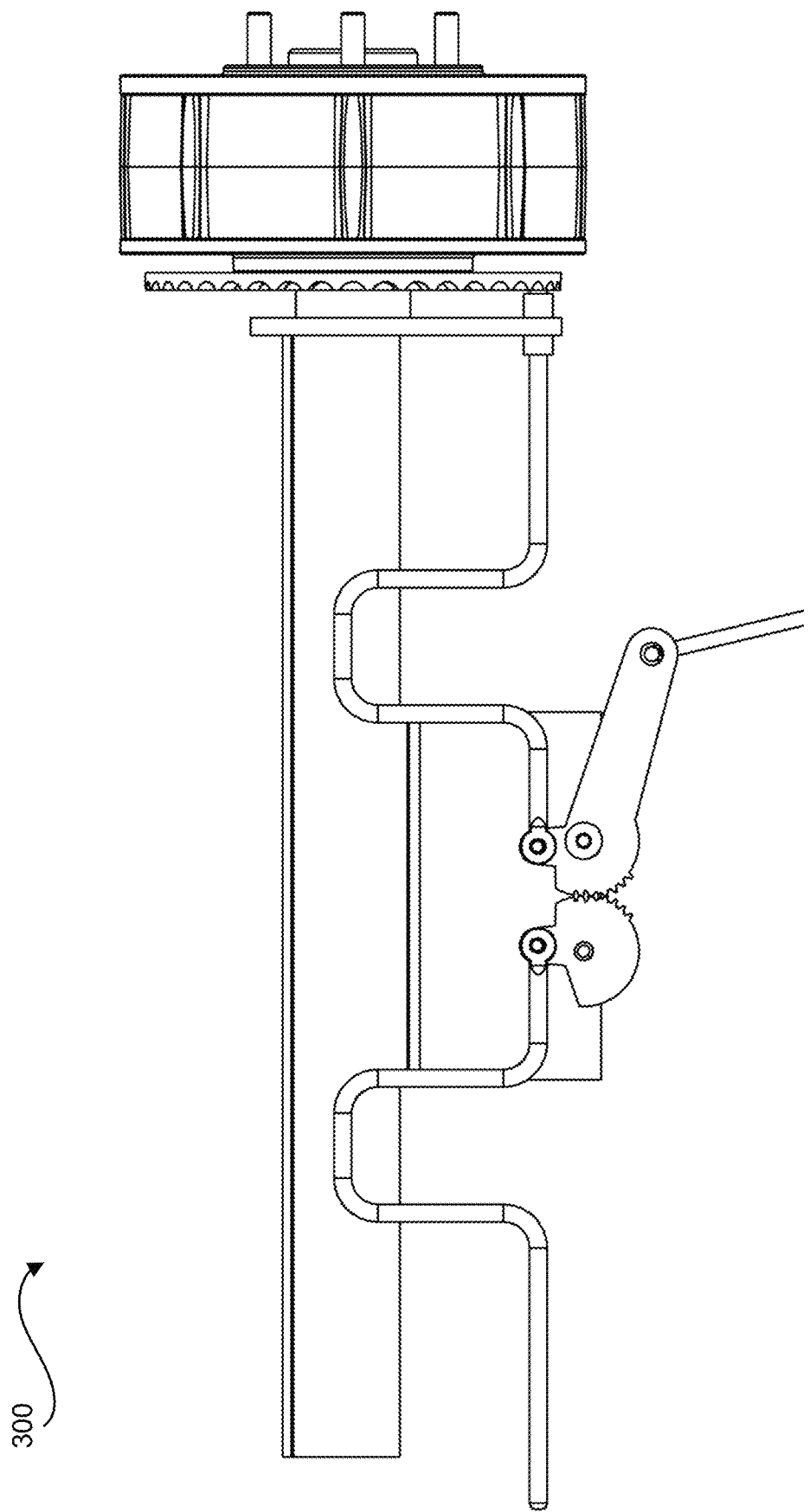
FIG. 10 shows a top plan view of the mechanical braking applicator shown in FIG. 9.

Turning now to FIG. 9, mechanical braking applicator 300 is shown in an engaged configuration. In this engaged configuration actuator rod 330 is pulled, which in turn pulls lever 335 and pivots lever 335 about pivot point 375. Lever 335, in turn, pushes braking rod 340 towards rotor 305 to cause the rod tip of braking rod 340 to come into contact with rotor 305 and in depressions 315. FIG. 10 shows a top plan view of the mechanical braking applicator shown in FIG. 9. In addition, FIG. 11 shows a front elevation view of the mechanical braking applicator shown in FIG. 9.

Figure 11:
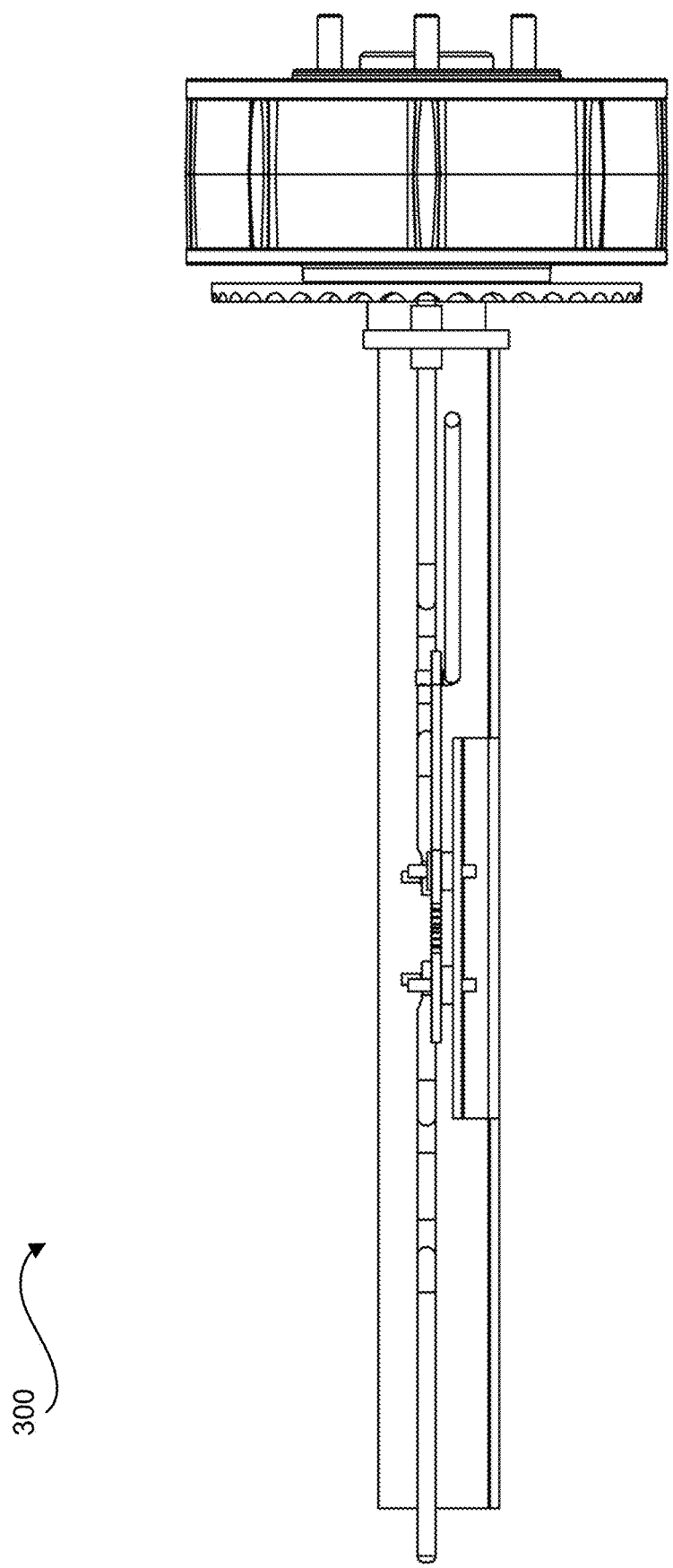
FIG. 11 shows a front side elevation view of the mechanical braking applicator shown in FIG. 9.
Figure 12:
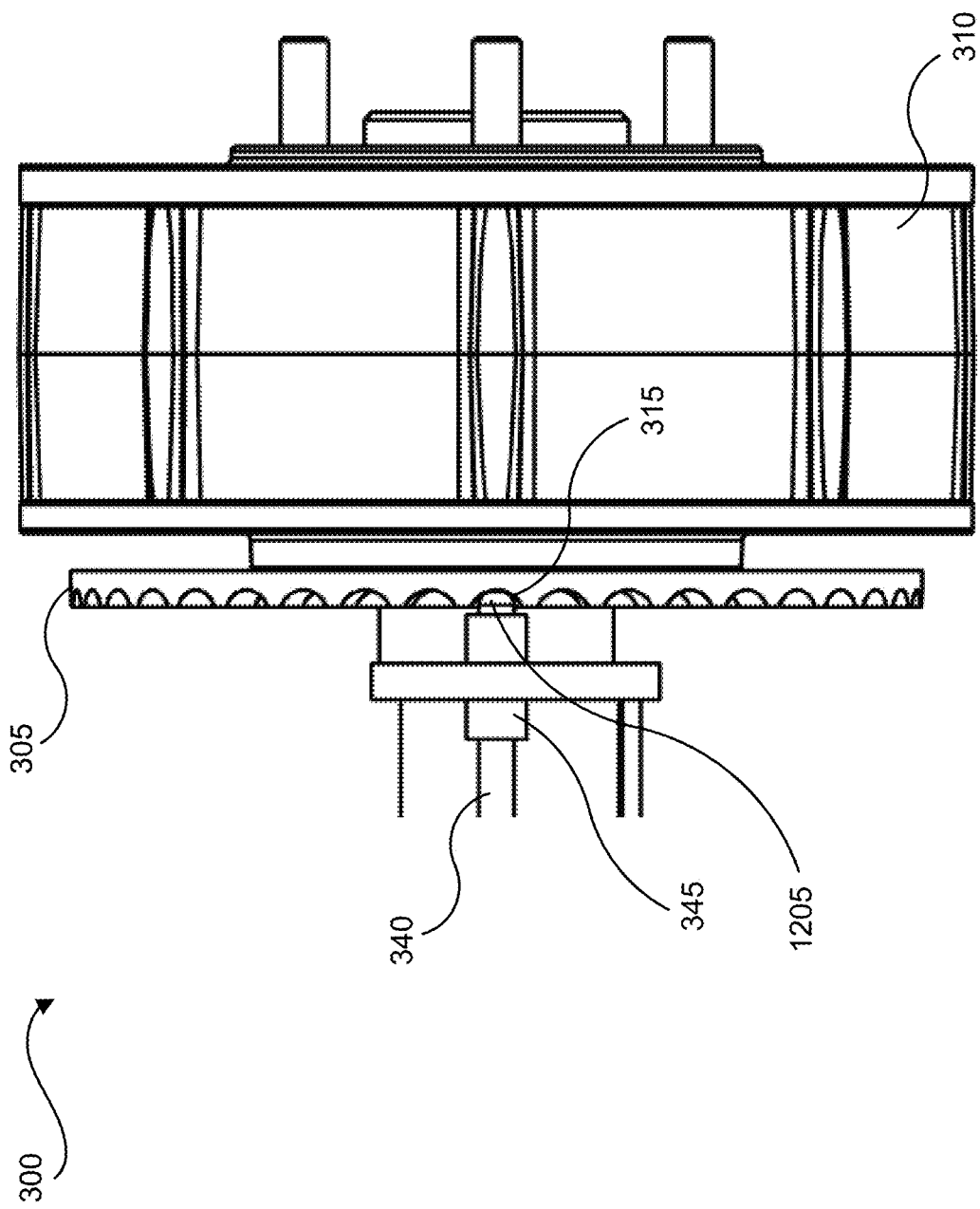
FIG. 12 shows a magnified portion of the mechanical braking applicator shown in FIG. 11.

FIG. 12, in turn, shows a magnified portion of the mechanical braking applicator shown in FIG. 11. FIG. 12 shows that a rod tip 1205 of braking rod 340 has been pushed into a given depression 315 of rotor 305. In this manner, rod tip 1205 comes into contact and engages rotor 305, thereby slowing down and eventually stopping the rotation of rotor 305 and that of hub 310 coupled to rotor 305. As discussed above, it is also contemplated that in some examples where the rotational speed of rotor 305 is high enough, the initial rotational energy of rotor 305 may force rod tip 1205 out of one or more of depressions 315 that rod tip 1205 initially enters. As the engagement of rod tip 1205 with rotor 305 slows down the rotational speed of rotor 305, eventually rod tip 1205 will enter and remain in a given depression 315 of rotor 305, thereby stopping the rotation of rotor 305.

Figure 13:
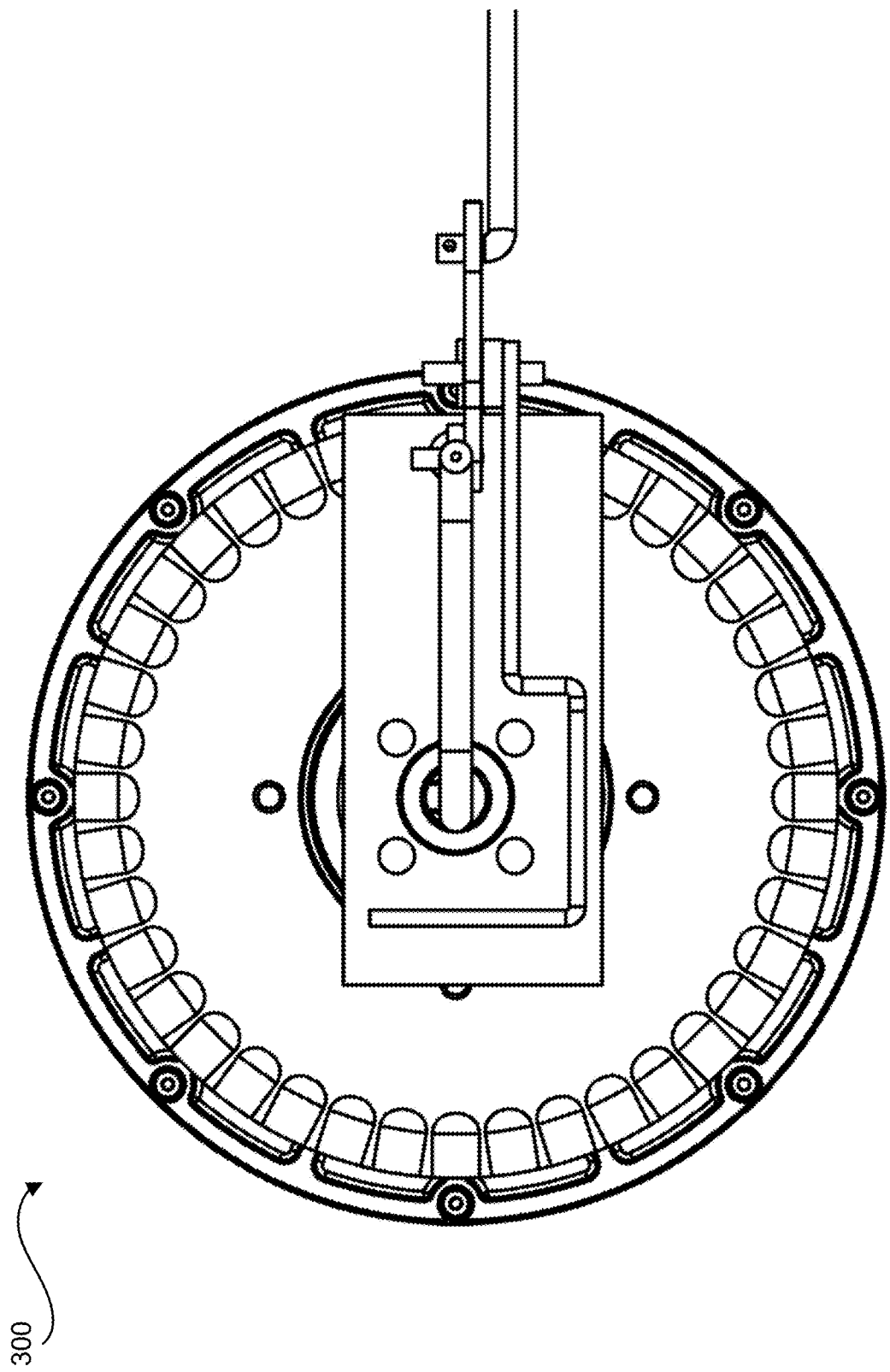
FIG. 13 shows a left side elevation view of the mechanical braking applicator shown in FIG. 9.
Figure 14:
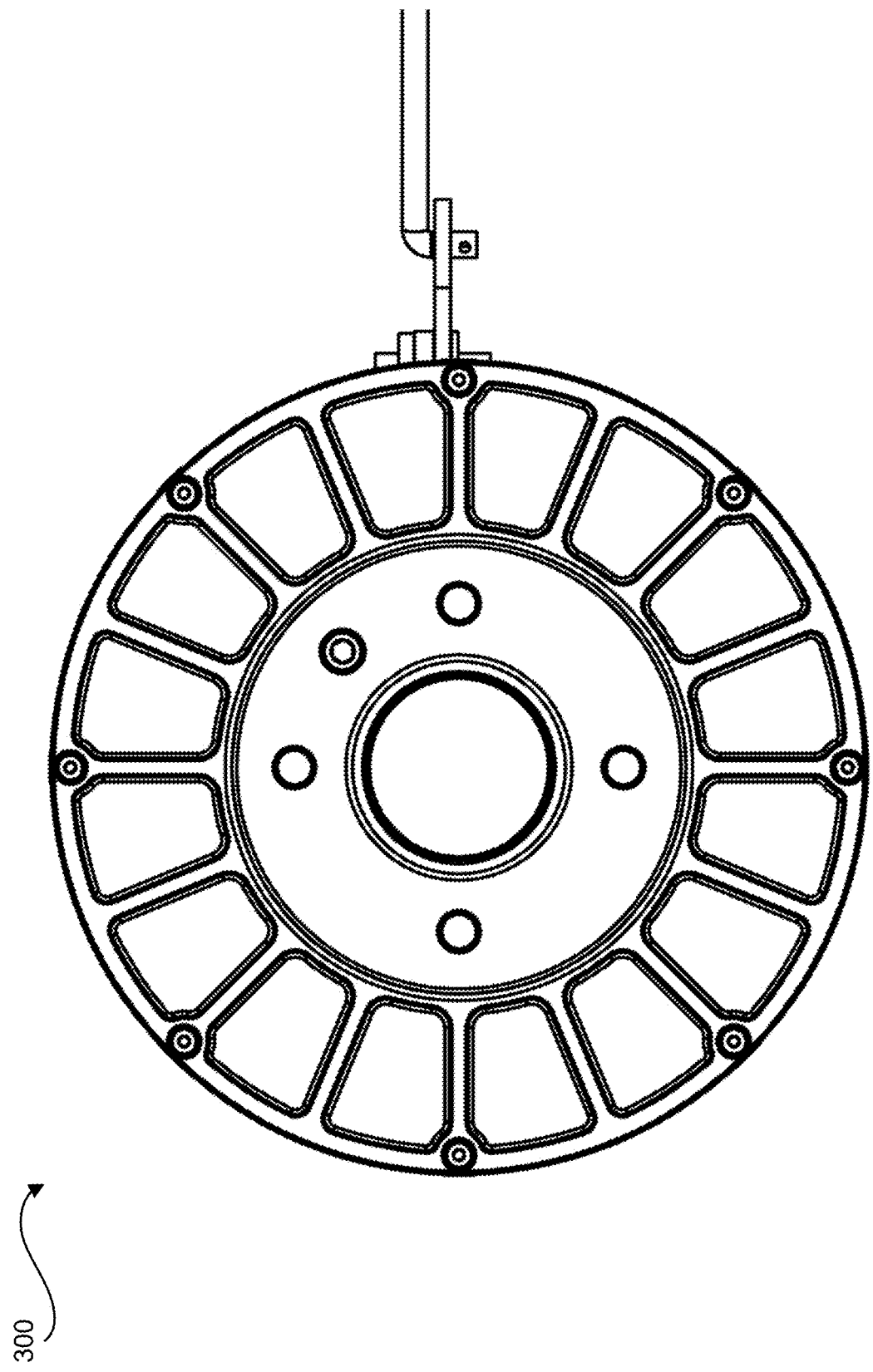
FIG. 14 shows a right side elevation view of the mechanical braking applicator shown in FIG. 9.

FIG. 13 shows a left side elevation view of the mechanical braking applicator shown in FIG. 9. FIG. 14, in turn, shows a right side elevation view of the mechanical braking applicator shown in FIG. 9.

Figure 15:
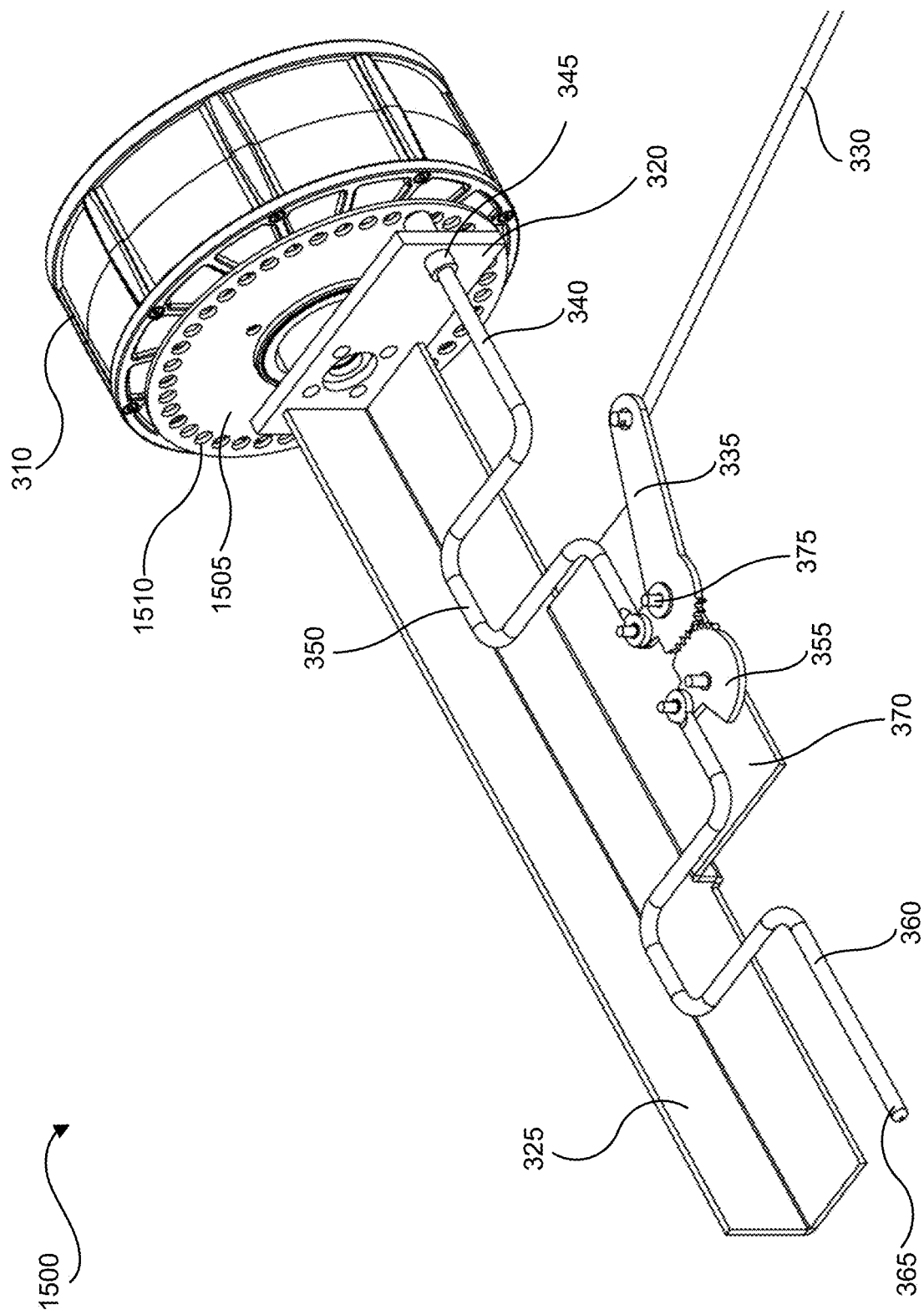
FIG. 15 shows a partial perspective view of another example mechanical braking applicator in an disengaged configuration, in accordance with a non-limiting implementation of the present specification.

Turning now to FIG. 15, a partial perspective view is shown of an example mechanical braking applicator 1500. Mechanical braking applicator 1500 may be similar in structure and function to mechanical braking applicator 300. A difference between mechanical braking applicators 1500 and 300 is that mechanical braking applicator 1500 comprises a rotor 1505 having a plurality of holes 1510 in the surface of rotor 1505. Holes 1510 are disposed circumferentially proximate and along an outer perimeter of rotor 1505. In other words, holes 1510 are disposed radially proximate to the outer perimeter of braking rotor 1505. One or more of holes 1510 may receive the tip of braking rod 340 in the engaged configuration. FIG. 15 shows mechanical braking applicator 1500 in a disengaged configuration where the rod tip of braking rod 340 is retracted and not in contact with rotor 1505 to allow rotor 1505 to rotate freely without interference from the rod tip.

In operation, when actuator rod 330 is pulled to move mechanical braking applicator 1500 into its engaged configuration, the rod tip of braking rod 340 may partially or fully enter one of the holes 1510 of rotor 1505. It is also contemplated that in some examples, if the starting rotational speed of rotor 1505 is sufficiently high, the rod tip may be pushed out of the first one or more holes 1510 that it enters. As the contact between the rod tip and rotor 1505 slows down the rotational speed of rotor 1505, eventually the rod tip will enter and remain in a given hole 1510, at which point the rotation of rotor 1505 will have been stopped by braking rod 340.

Figure 16:
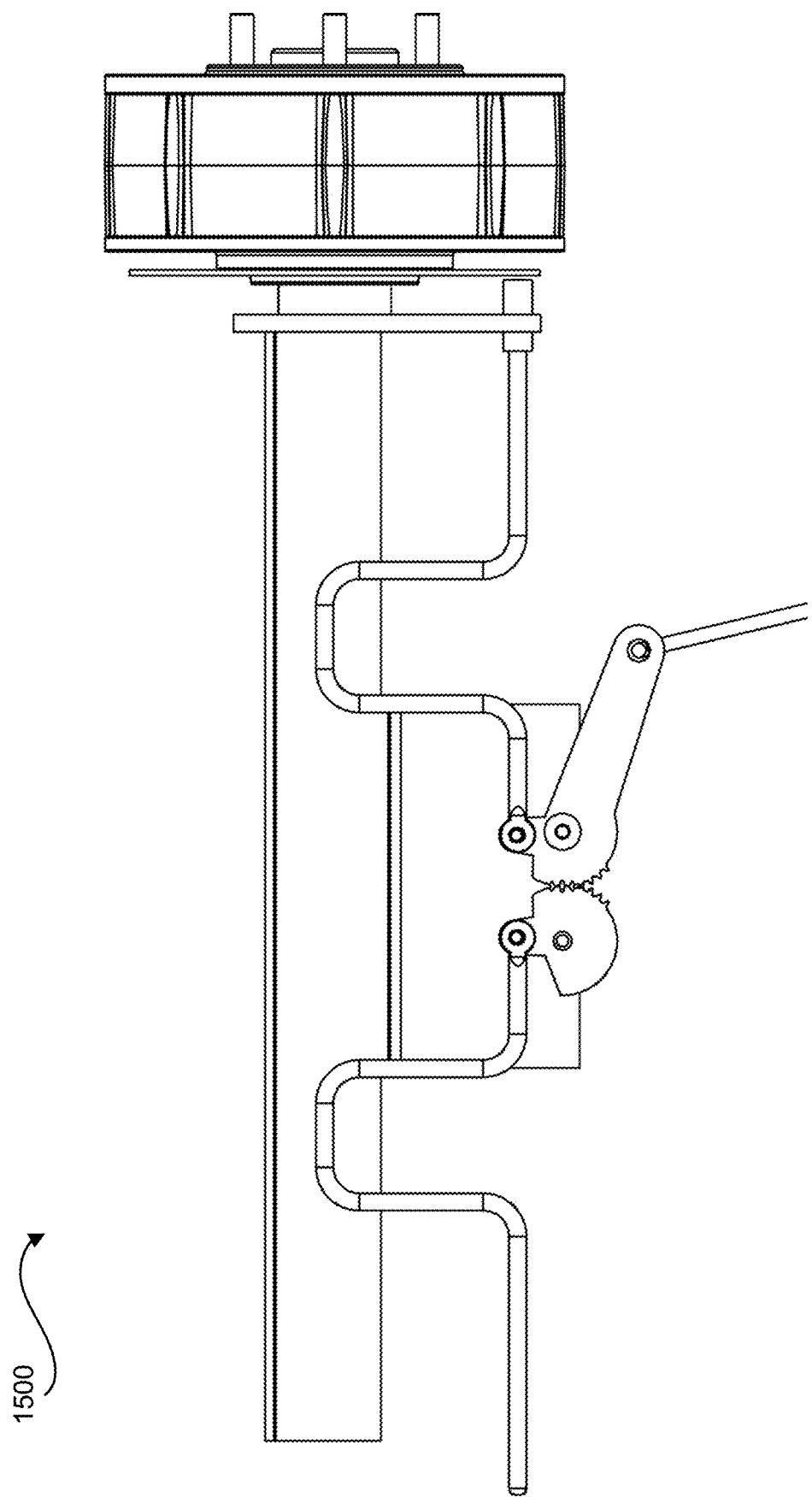
FIG. 16 shows a top plan view of the mechanical braking applicator shown in FIG. 15.
Figure 17:
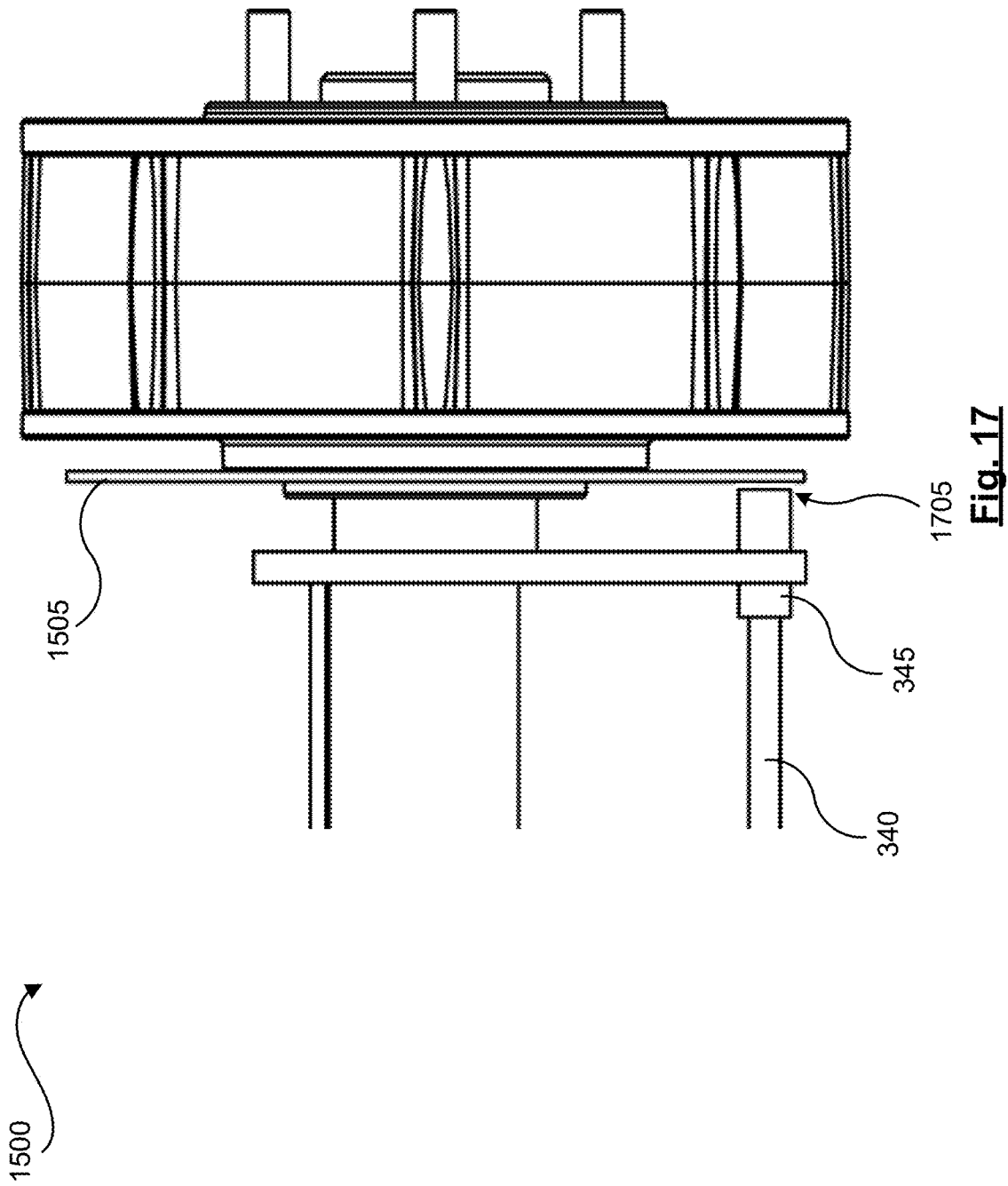
FIG. 17 shows a magnified portion of the mechanical braking applicator shown in FIG. 16.

FIG. 16 shows a top plan view of the mechanical braking applicator shown in FIG. 15. FIG. 17, in turn, shows a magnified portion of the mechanical braking applicator shown in FIG. 16. As shown in FIG. 17, when mechanical braking applicator 1500 is in a disengaged configuration, a gap 1705 may exist between an end of guide bushing 345 and rotor 1505. Moreover, in the disengaged configuration, the rod tip of braking rod 340 may be retracted partially or fully inside of guide bushing 345. Gap 1705 may allow rotor 1505 to rotate freely without hindrance from bushing 345 or the rod tip of braking rod 340.

Figure 18:
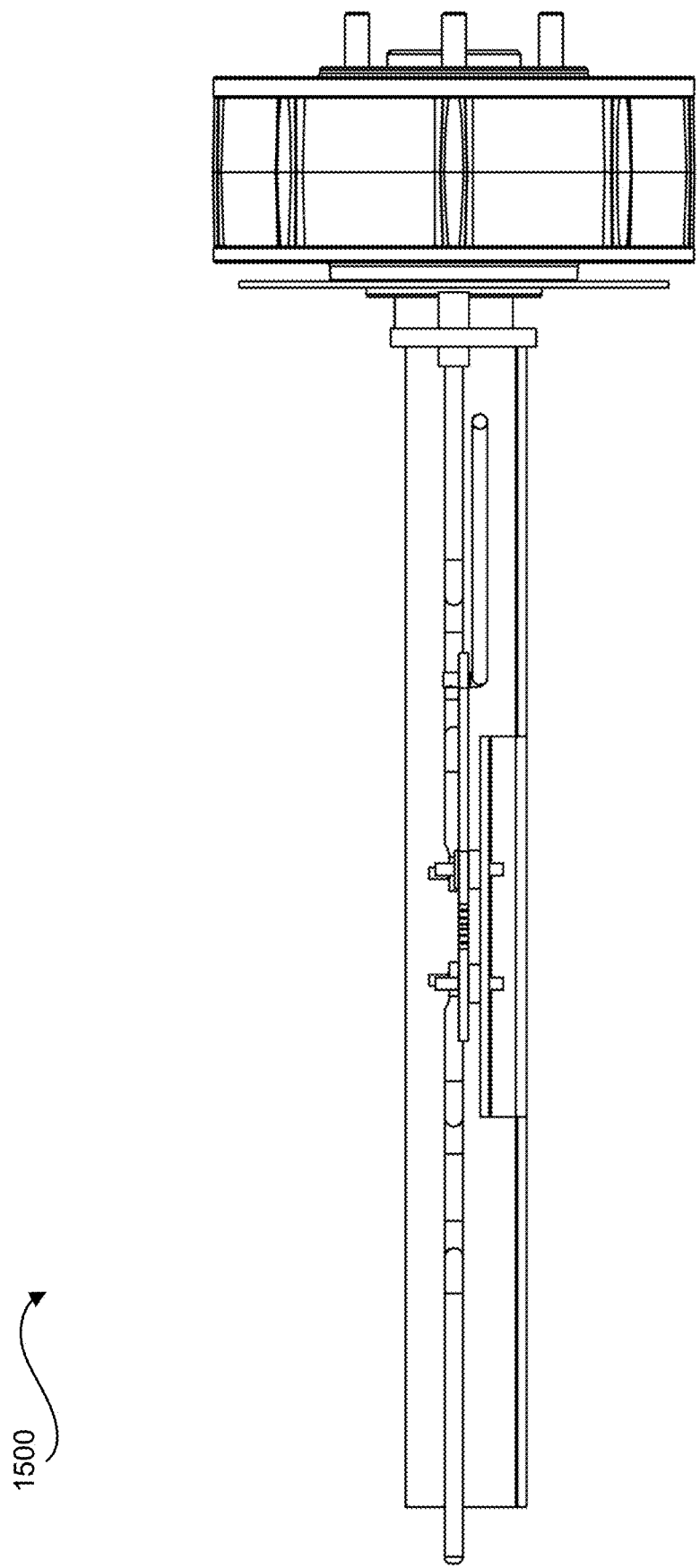
FIG. 18 shows a front side elevation view of the mechanical braking applicator shown in FIG. 15.
Figure 19:
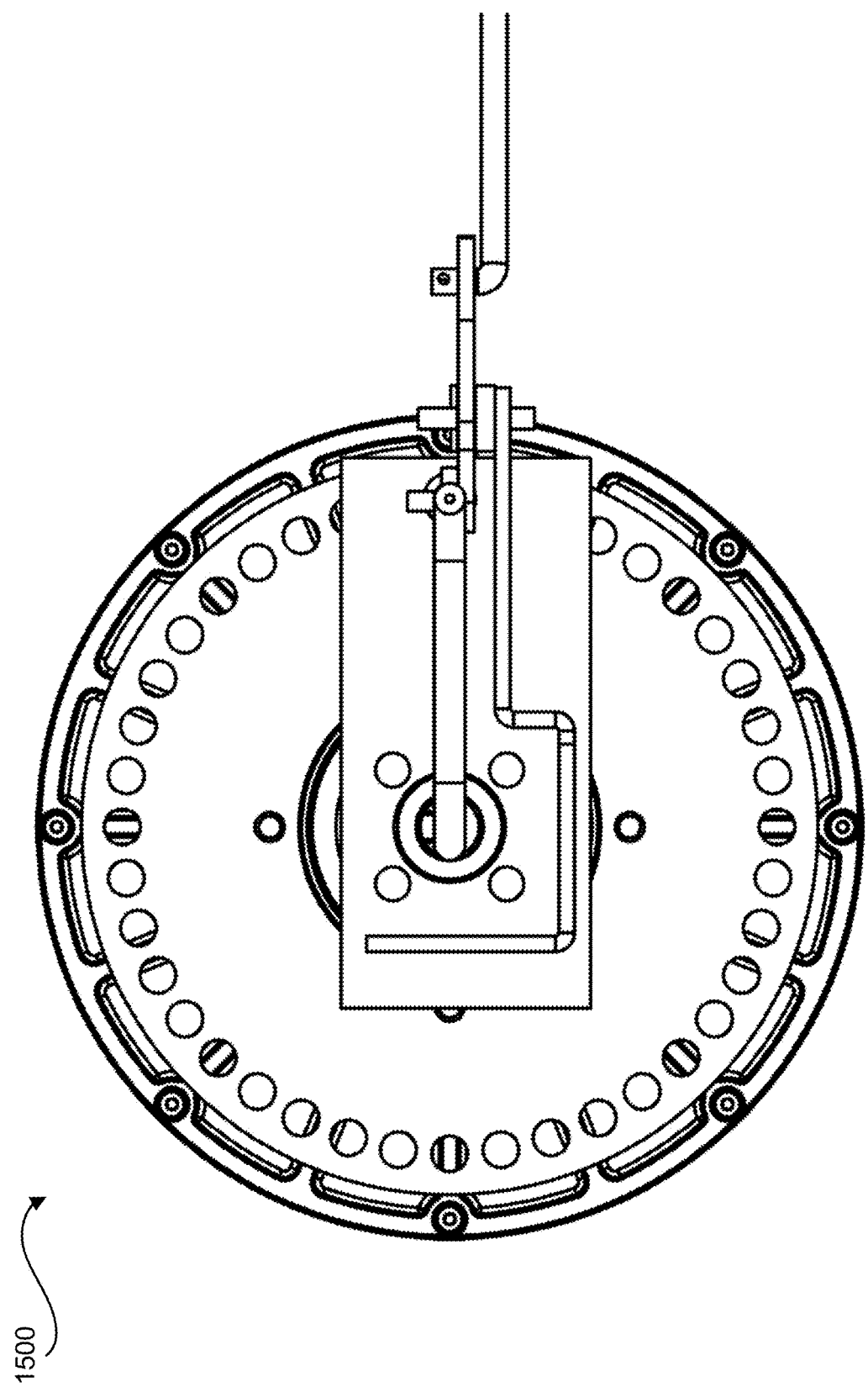
FIG. 19 shows a left side elevation view of the mechanical braking applicator shown in FIG. 15.
Figure 20:
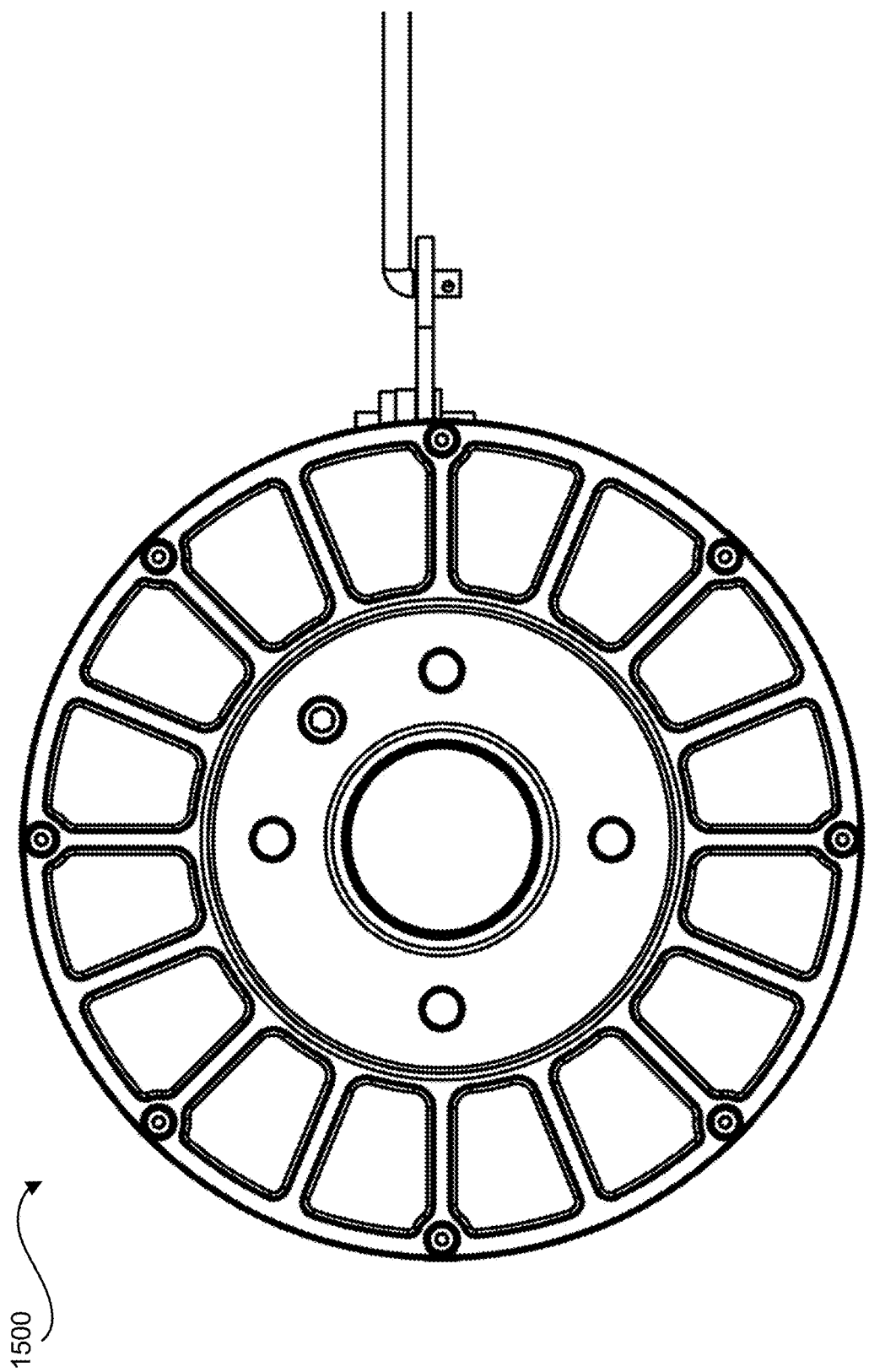
FIG. 20 shows a right side elevation view of the mechanical braking applicator shown in FIG. 15.

Turning now to FIG. 18, a front side elevation view is shown of the mechanical braking applicator shown in FIG. 15. FIG. 19 shows a left side elevation view of the mechanical braking applicator shown in FIG. 15. FIG. 20, in turn, shows a right side elevation view of the mechanical braking applicator shown in FIG. 15.

Figure 21:
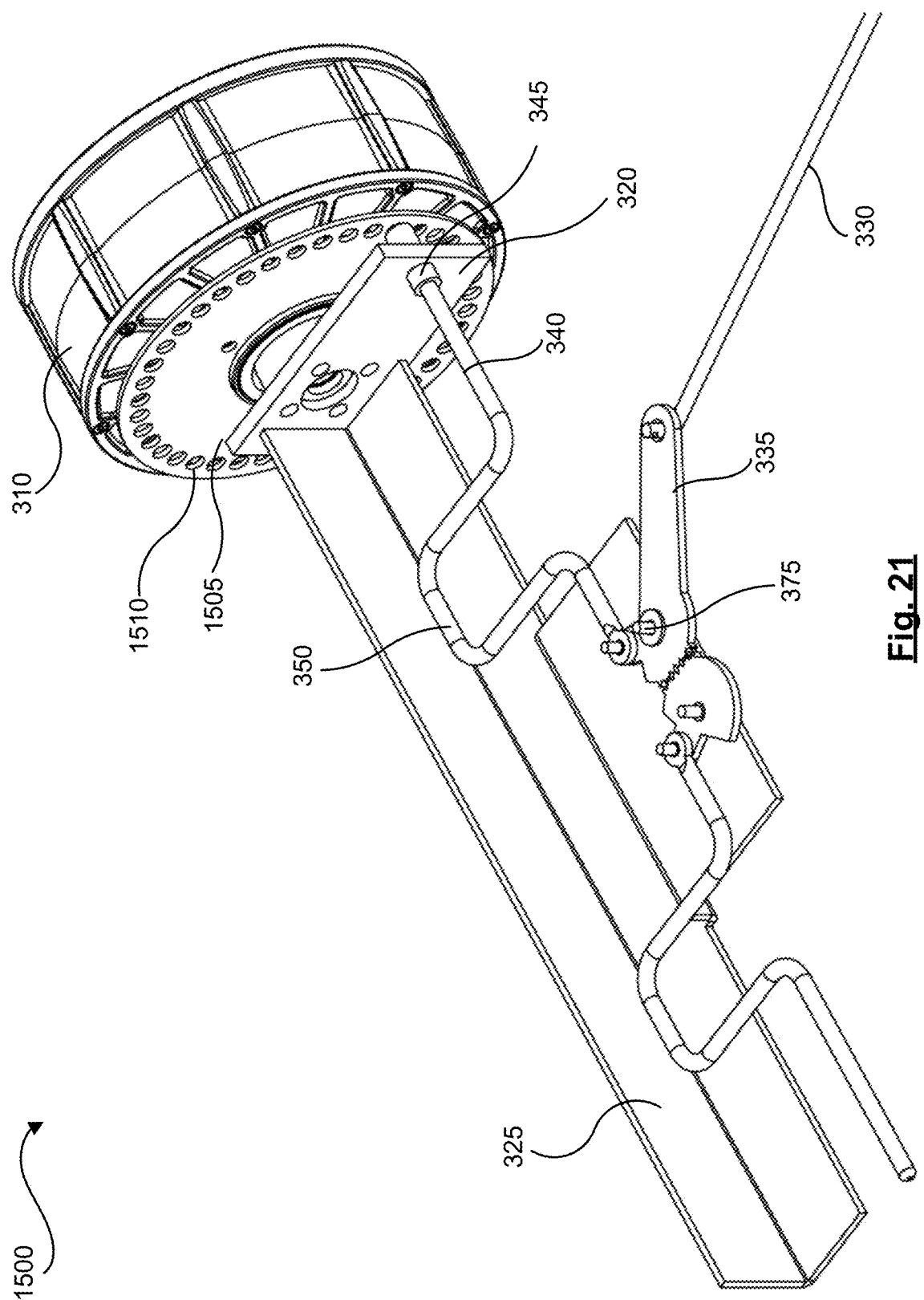
FIG. 21 shows the mechanical braking applicator of FIG. 15 in an engaged configuration.
Figure 22:
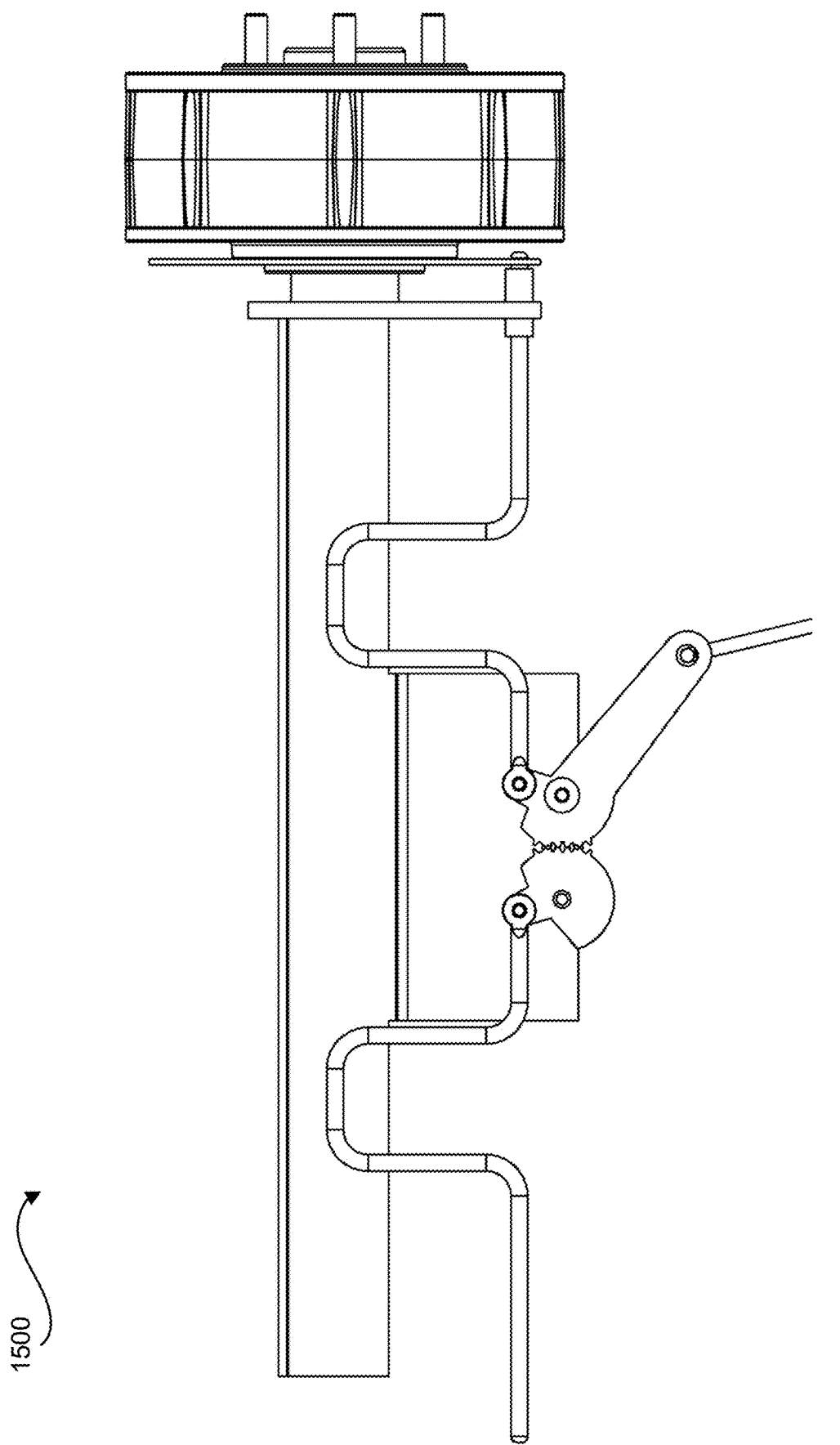
FIG. 22 shows a top plan view of mechanical braking applicator shown in FIG. 21.

Turning now to FIG. 21, mechanical braking applicator 1500 is shown in an engaged configuration. In this engaged configuration actuator rod 330 is pulled, which in turn pulls and pivots lever 335 about pivot point 375. Lever 335, in turn, pushes braking rod 340 towards rotor 1505 to cause the rod tip of braking rod 340 to come into contact with rotor 1505 and its holes 1510. FIG. 22 shows a top plan view of the mechanical braking applicator shown in FIG. 21.

Figure 23:
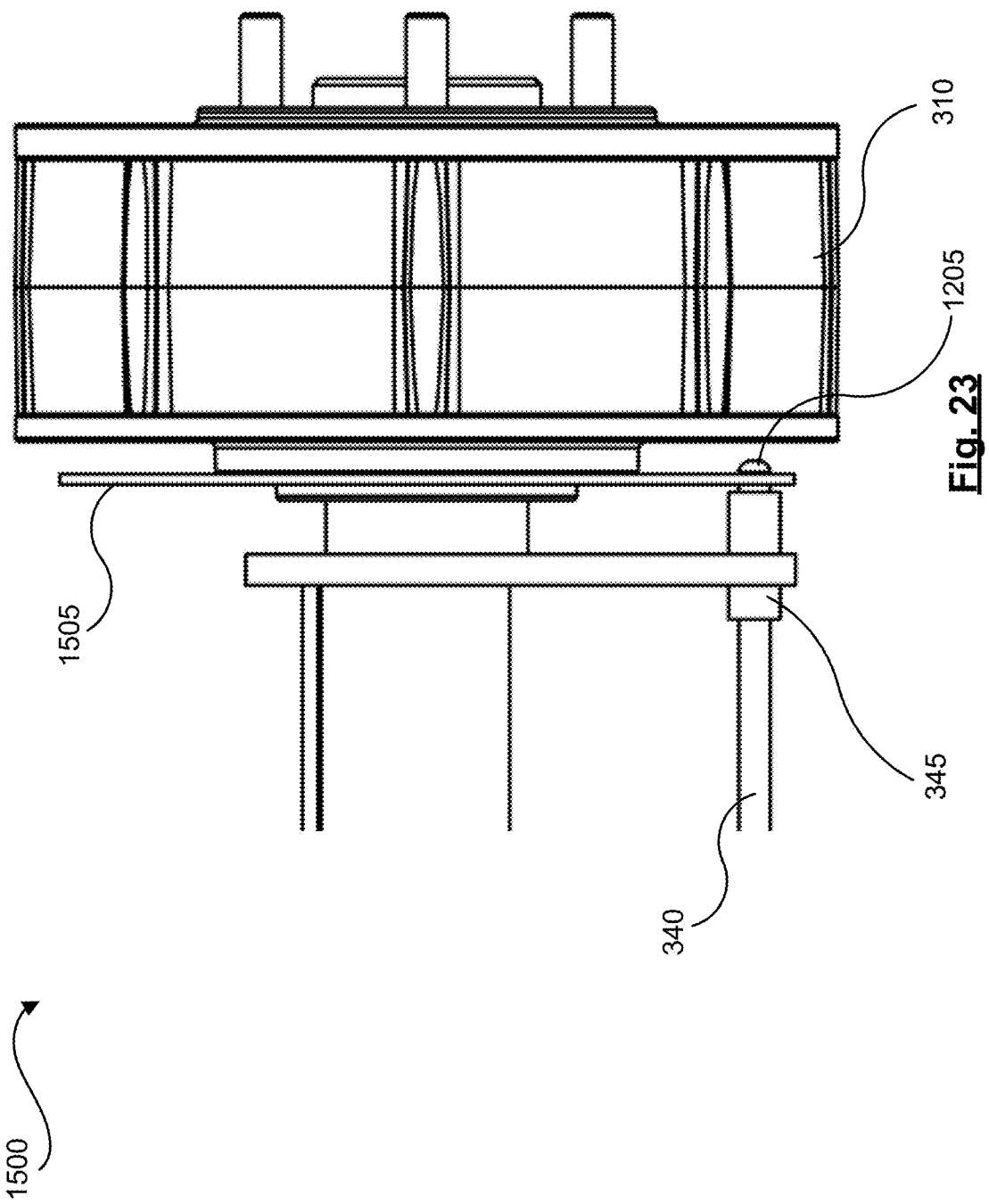
FIG. 23 shows a magnified portion of the mechanical braking applicator shown in FIG. 22.

FIG. 23, in turn, shows a magnified portion of the mechanical braking applicator shown in FIG. 22. FIG. 23 shows that the rod tip 1205 of braking rod 340 has been pushed into and through a hole of rotor 1505. In this manner, rod tip 1205 comes into contact and engages rotor 1505, thereby slowing down and eventually stopping the rotation of rotor 1505 and that of hub 310 coupled to rotor 1505. As discussed above, it is also contemplated that in some examples where the rotational speed of rotor 1505 is high enough when rod tip 1205 initially engages with rotor 1505, the initial rotational energy of rotor 1505 may force rod tip 1205 out of one or more of holes 1510 (not visible in FIG. 23, but shown in FIG. 15) which rod tip 1205 initially enters. As the engagement of rod tip 1205 with rotor 1505 slows down the rotational speed of rotor 1505, eventually rod tip 1205 will enter and remain in a given hole 1510 of the rotor 1505, thereby stopping the rotation of rotor 1505.

Figure 24:
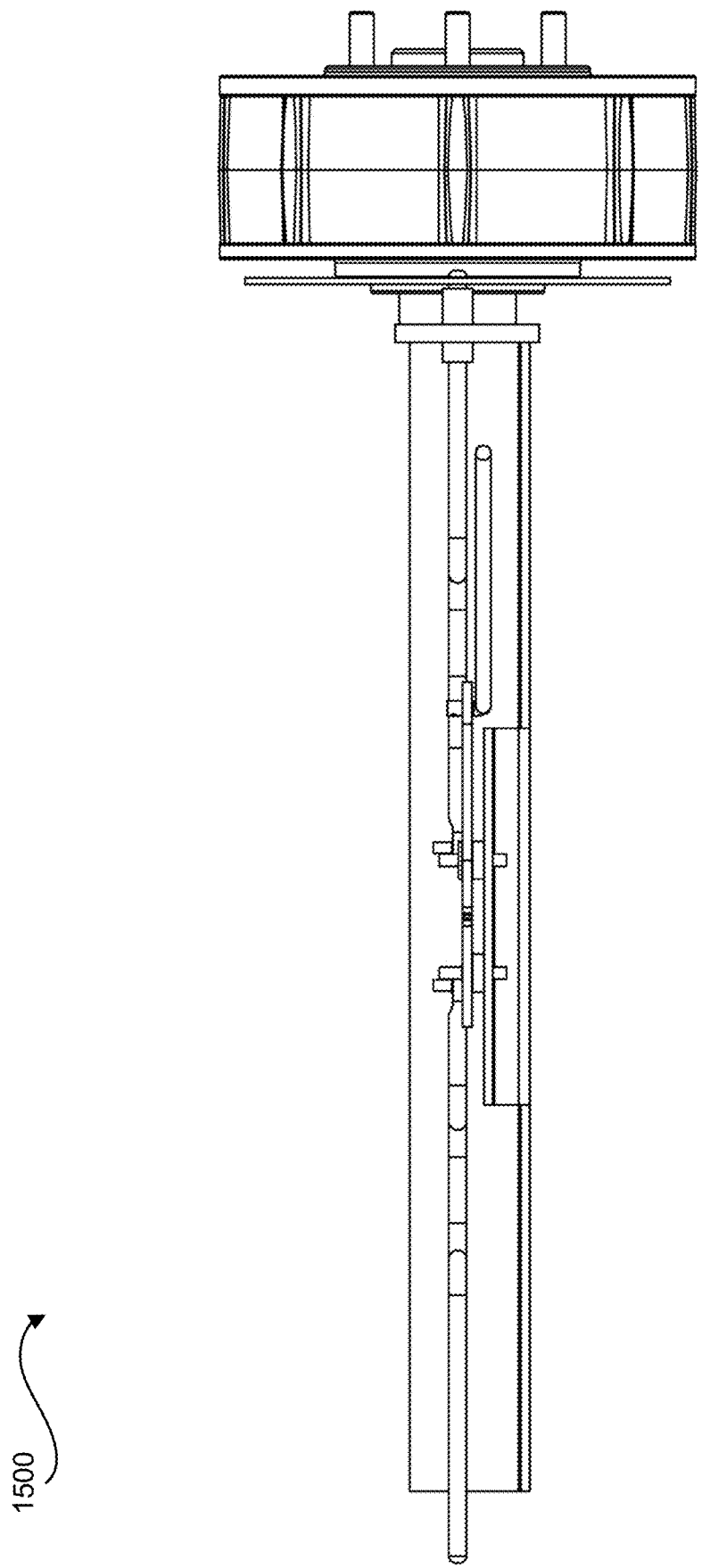
FIG. 24 shows a front side elevation view of the mechanical braking applicator shown in FIG. 21.
Figure 25:
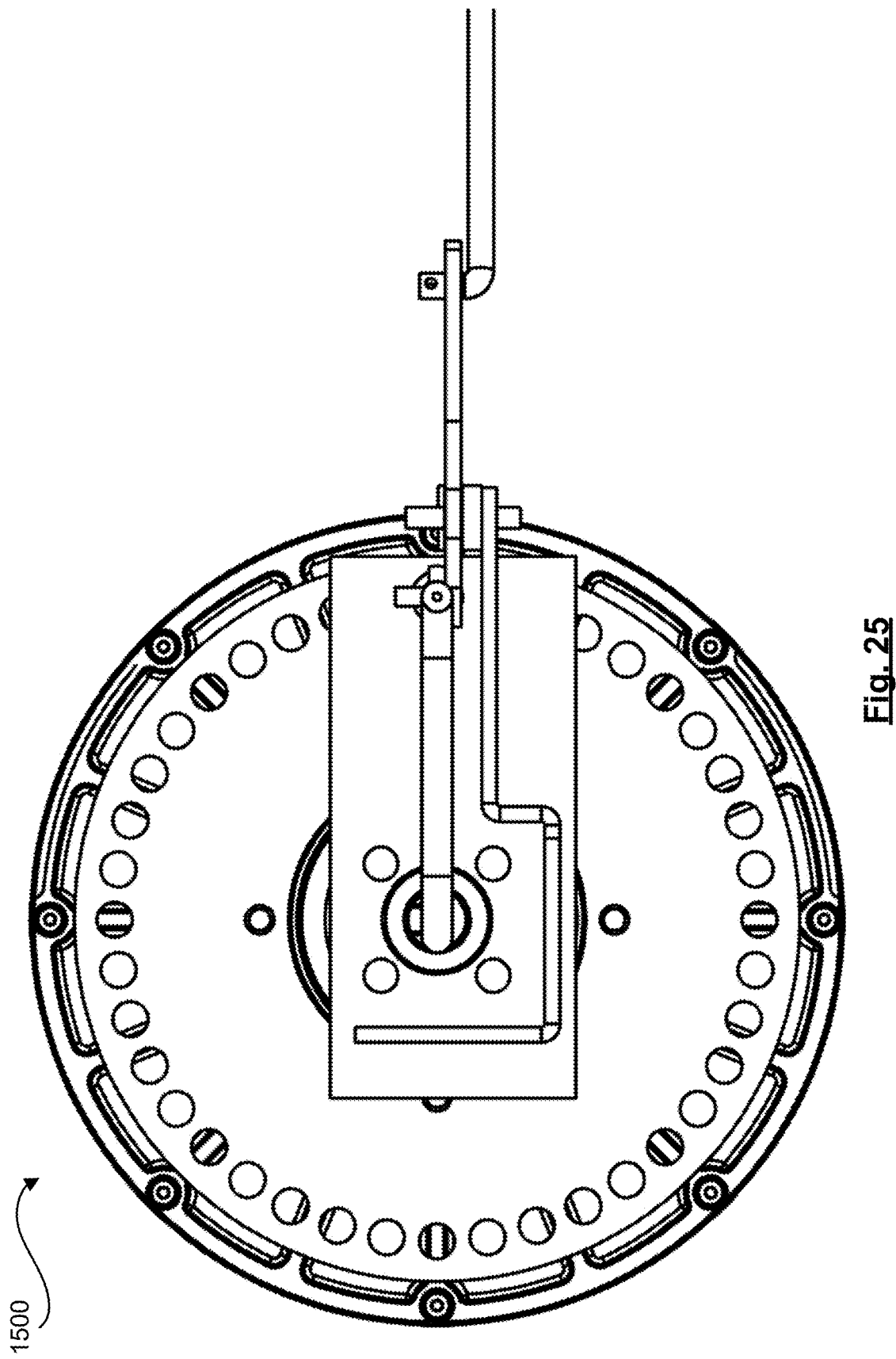
FIG. 25 shows a left side elevation view of the mechanical braking applicator shown in FIG. 21.
Figure 26:
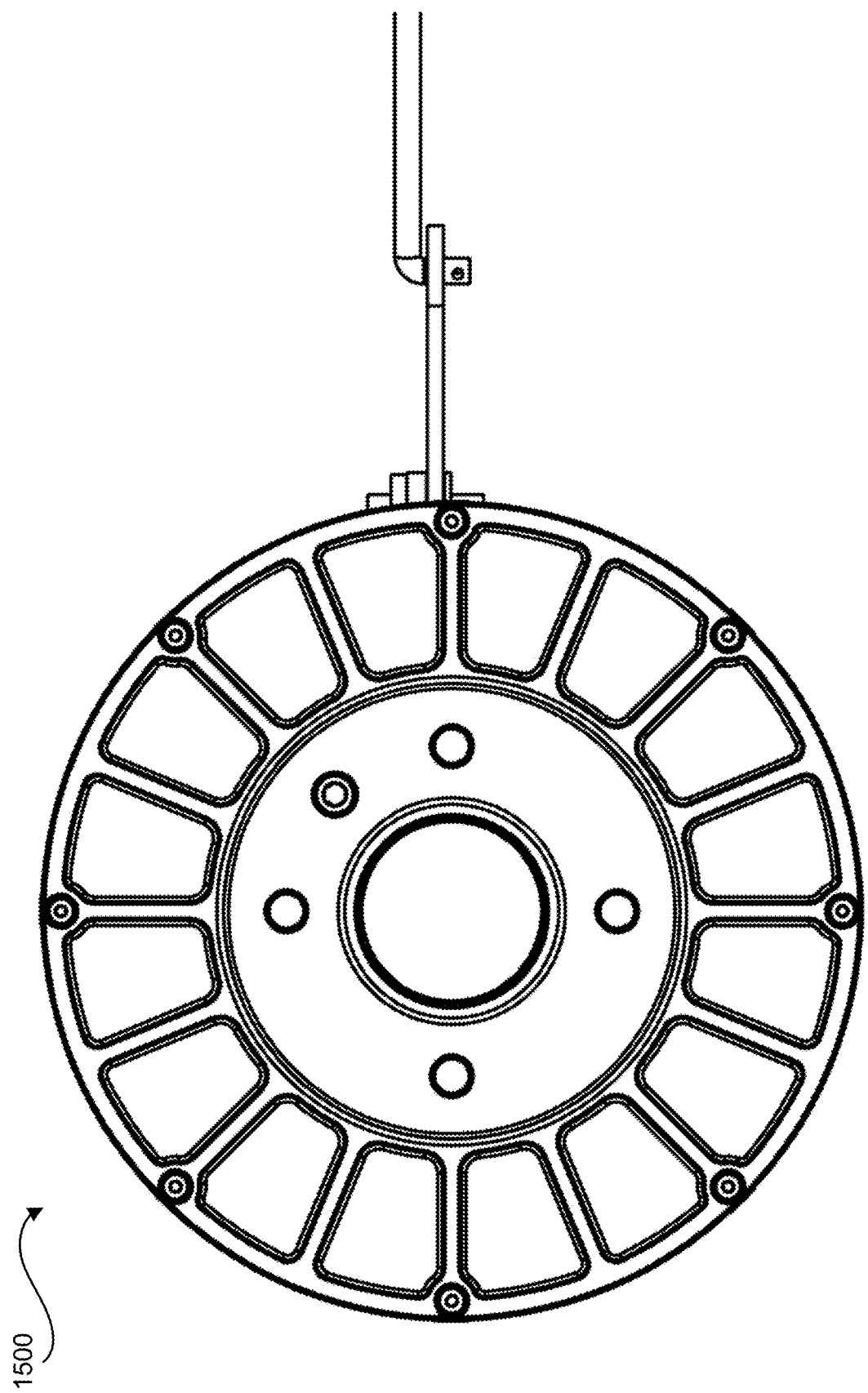
FIG. 26 shows a right side elevation view of the mechanical braking applicator shown in FIG. 21.

In addition, FIG. 24 shows a front side elevation view of the mechanical braking applicator shown in FIG. 21. FIG. 25 shows a left side elevation view of the mechanical braking applicator shown in FIG. 21. FIG. 26, in turn, shows a right side elevation view of the mechanical braking applicator shown in FIG. 21.

Figure 27:
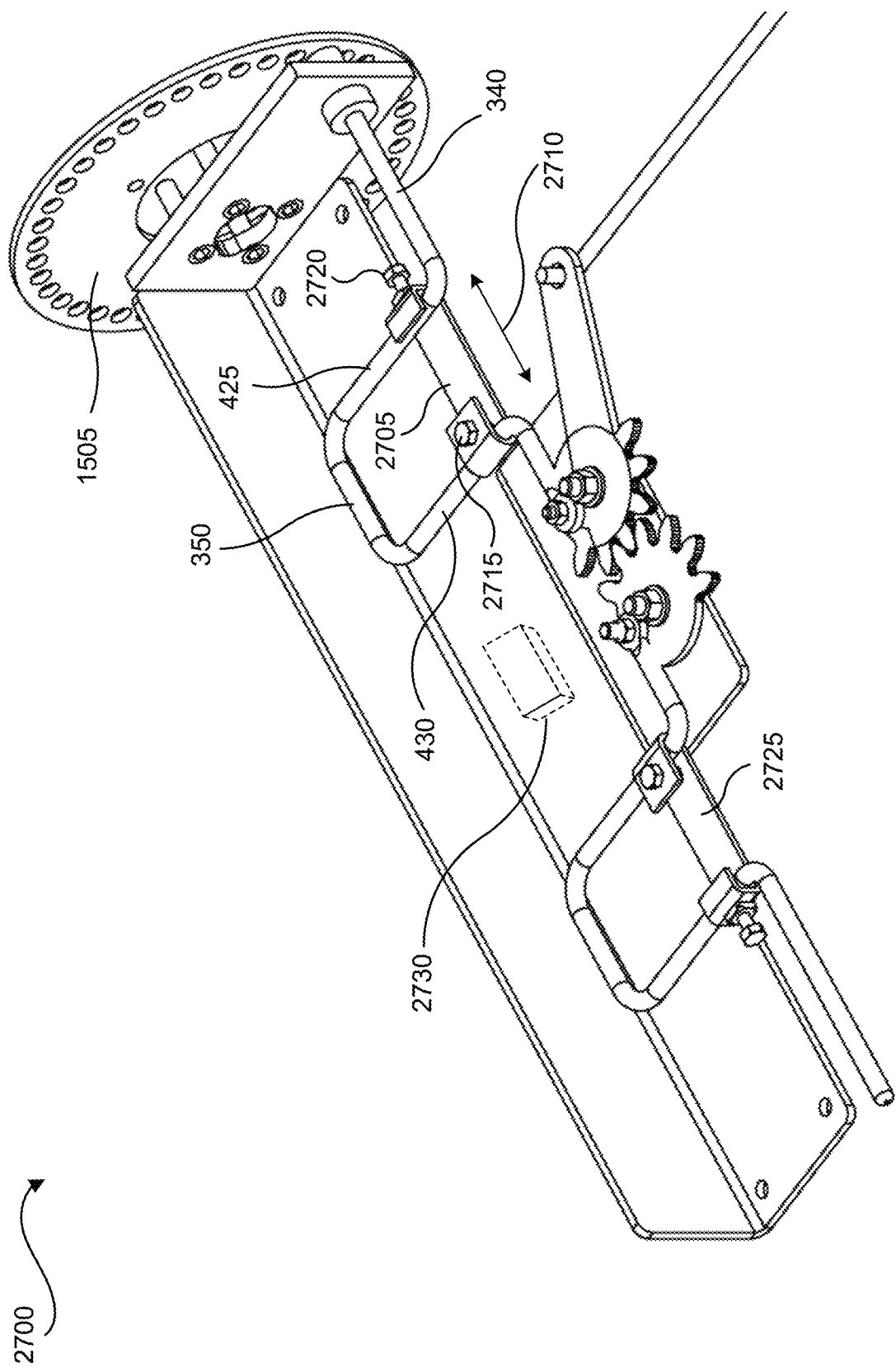
FIG. 27 shows a partial perspective view of another example mechanical braking applicator in an engaged configuration, in accordance with a non-limiting implementation of the present specification.

Turning now to FIG. 27, a partial top perspective view is shown of an example mechanical braking applicator 2700. Mechanical braking applicator 2700 may be similar in structure and function to mechanical braking applicator 1500. A difference between mechanical braking applicators 2700 and 1500 is that in mechanical braking applicator 2700 braking rod 340 comprises a U-bend supporting member 2705 disposed on an outside of U-bend 350 and extending from first side 425 to second side 430. U-bend supporting member 2705 may also be referred to as member 2705.

When U-bend 350 is in its undeformed configuration, first side 425 is at a given distance 2710 from second side 430. Member 2705 resists U-bend 350 resiliently extending by resisting first side 425 and second side 430 from moving away from one another beyond distance 2710. In other words, member 2705 acts as a partial sleeve disposed on the outside of first and second sides of U-bend 350 to prevent those sides from moving away from one another beyond distance 2710. Because member 2705 is disposed on the outside of the first and second sides of the U-bend, member 2705 does not resist the two sides of the U-bend moving towards one another so that their distance becomes less than distance 2710.

In this manner, member 2705 reduces the resilient deformability of braking rod 340 when the rod is being retracted away from rotor 1505 as mechanical braking applicator 2700 is transitioning from the engaged to the disengaged configuration. This reduction in the resilient deformability of braking rod 340 in the retraction direction away from rotor 1505 may allow for faster or easier disengagement of braking rod 340 from rotor 1505. Member 2705 allows the sides of U-bend 350 to move towards one another when braking rod 240 is pushed towards and against rotor 1505. As discussed above, this resilient deformation of U-bend 350 during the process of engagement of braking rod 340 with rotor 1505 may provide a resilient force to push the tip of braking rod 340 against rotor 1505 to slow down the rotation of rotor 1505 and to allow the tip of rod 340 to engage with the engagement features of rotor 1505.

In FIG. 27, member 2705 comprises a band or strip shaped as a C or a partial sleeve, to fit around the outside of the two sides of U-bend 350. A fastener 2715 secures one end of the strip or band to second side 430, while a second fastener 2720 tightens the second end of the strip against first side 425. In some examples, member 2705 may comprise a metal, an alloy, and the like. It is also contemplated that in some examples, the mechanical braking applicator may comprise a U-bend supporting member that may have a different shape or composition that member 2705.

Figure 28:
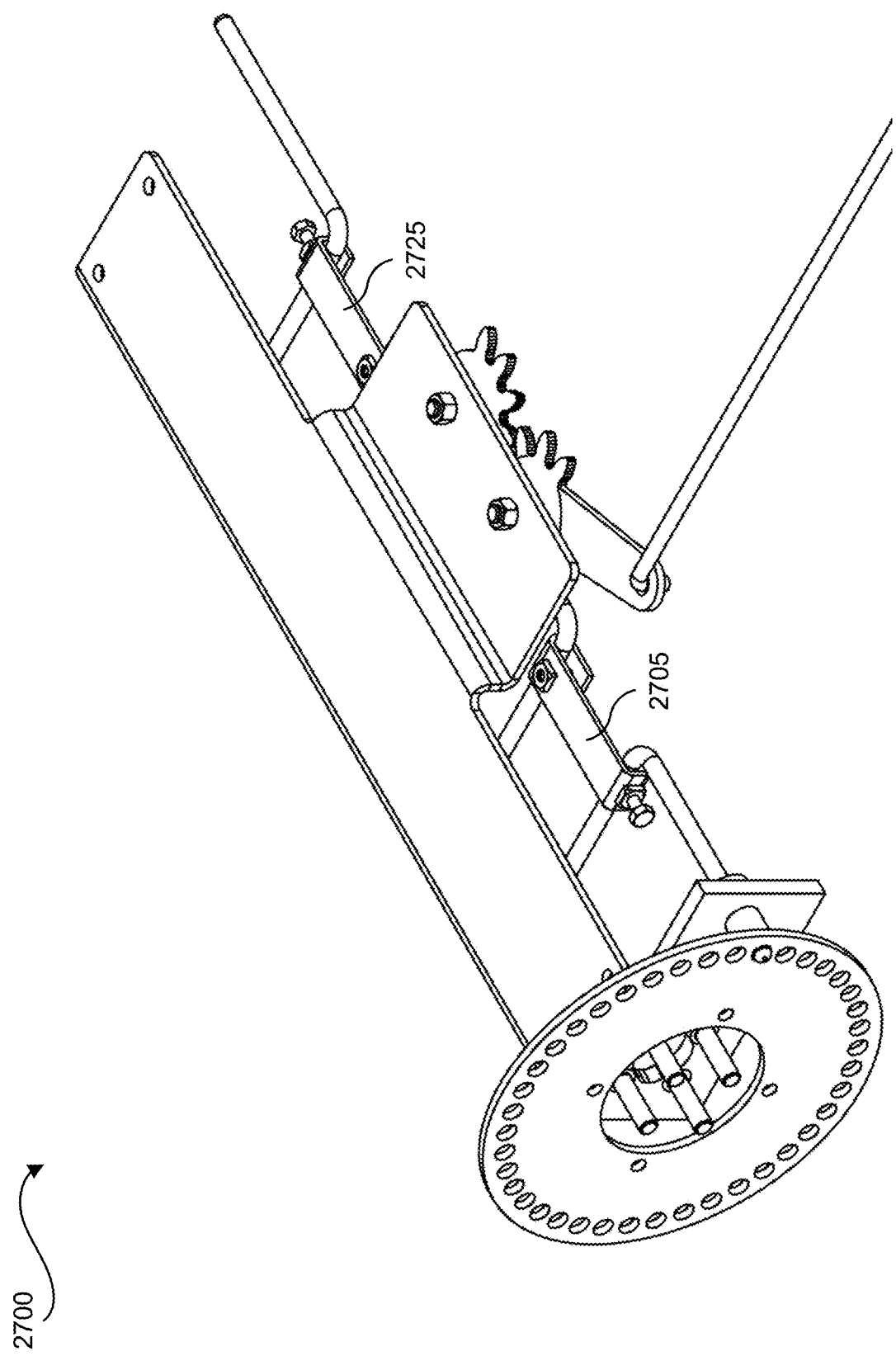
FIG. 28 shows another partial perspective view of the mechanical braking applicator shown in FIG. 27.

Mechanical braking applicator 2700 also comprises a second U-bend supporting member 2725, which may have a structure and function similar to those of member 2705. FIG. 28 shows a partial bottom perspective view of mechanical braking applicator 2700. Members 2705 and 2725 are also shown in FIG. 28.

Referring back to FIG. 27, in some examples, mechanical braking applicator 2700 may also comprise a sensor 2730 to detect whether braking rod 340 is in the engaged configuration or the disengaged configuration. FIG. 27 shows sensor 2730 schematically for illustrative purposes. Moreover, in some examples, sensor 2730 may comprise a mechanical sensor, a magnetic sensor, an electrical sensor, an optical sensor, and the like. In some examples where sensor 2730 comprises a mechanical sensor, sensor 2730 may comprise a limit switch, and the like. Furthermore, it is contemplated that in some examples the sensor may have a shape, size, or position that is different than those of sensor 2730 shown in FIG. 27. Furthermore, it is contemplated that in some examples, the sensor may be external to the mechanical braking applicator, or that the mechanical braking applicator need not comprise such a sensor. The data generated by sensor 2730 may be sent directly or indirectly to a controller of the electric vehicle incorporating mechanical braking applicator 2700.

Figure 29:
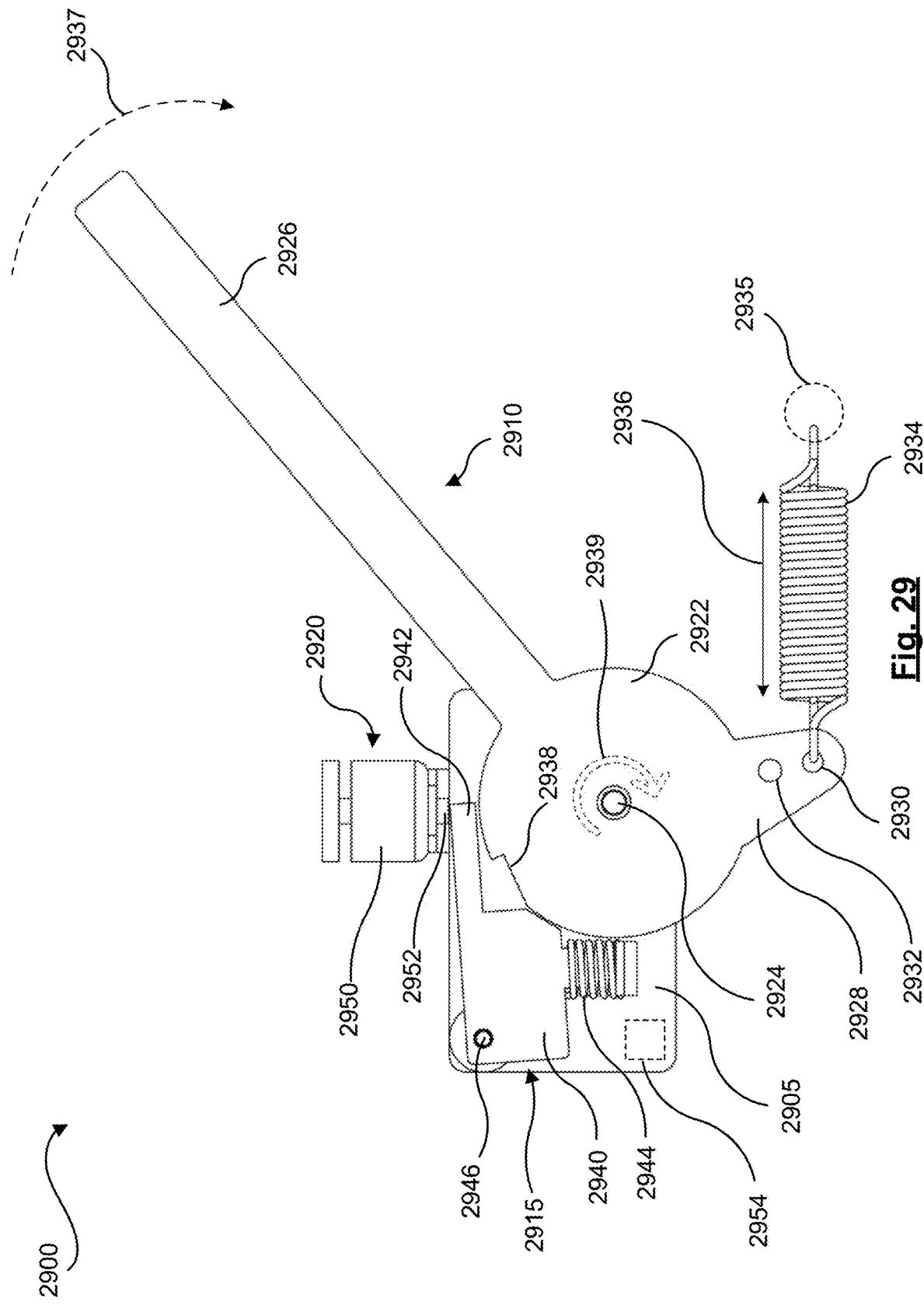
FIG. 29 shows a side elevation view of an example brake handle module in a released configuration, in accordance with a non-limiting implementation of the present specification.

In some examples, the mechanical braking applicator may further comprise a brake handle module. In some examples, such a brake handle module may be used to activate or actuate the braking rod between the engaged and the disengaged configurations. Moreover, in some examples, the brake handle module may allow an operator of the electric vehicle to activate or actuate the mechanical braking applicator. Furthermore, in some examples, the brake handle module may allow a controller of the vehicle to control, activate, or actuate the mechanical braking applicator. FIG. 29 shows a side elevation view of an example brake handle module 2900.

Figure 32B:
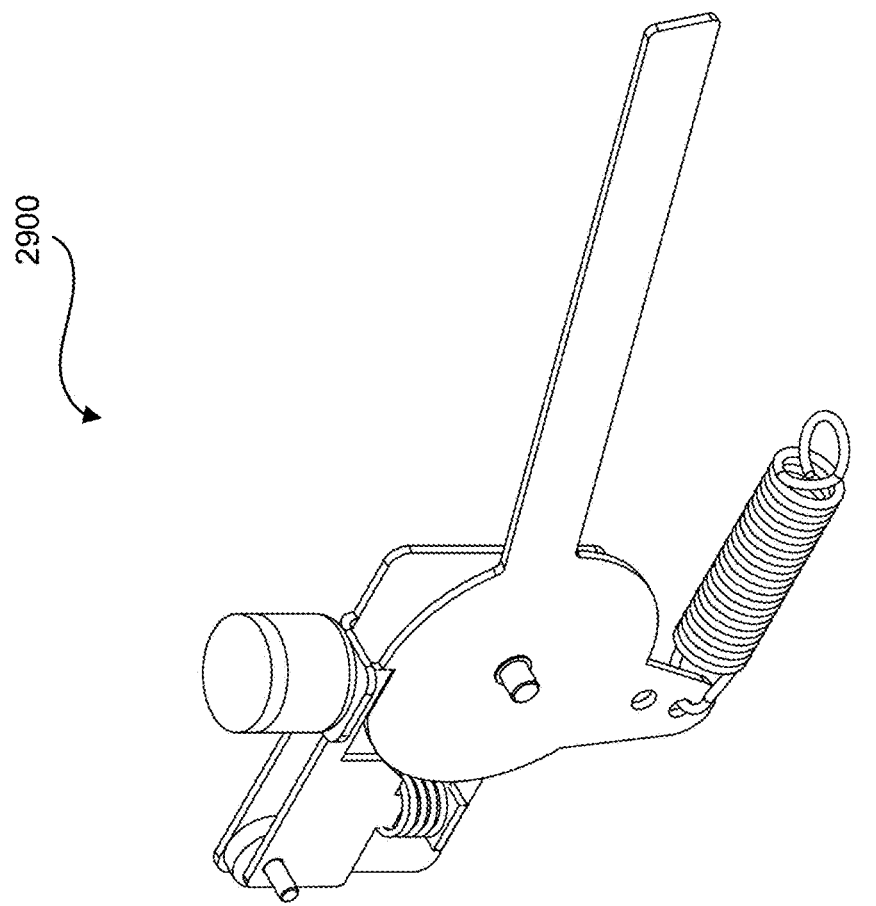
FIGS. 32A and 32B show two different perspective views of the brake handle module shown in FIG. 31.
Figure 32A:
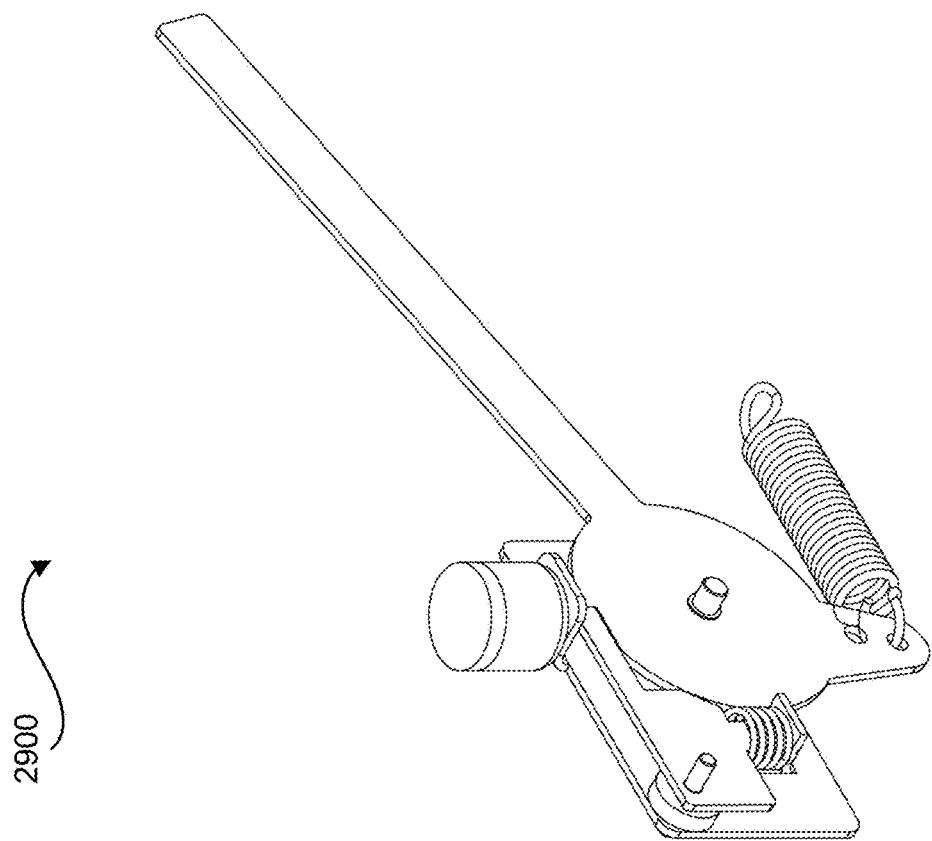

Brake handle module 2900 comprises a support member 2905 and a brake handle 2910 pivotably secured to support member 2905. Brake handle 2910 may be coupled to the actuator rod to move the braking rod between the engaged configuration and the disengaged configurations. Examples of the coupling between the brake handle module and the braking rod are described in greater detail in relation to FIGS. 33-46. Brake handle 2910 has a cocked configuration and an uncocked configuration. FIG. 29 shows brake handle 2910 in the uncocked configuration. The cocked configuration of brake handle 2910 is shown in FIGS. 31, 32A, and 32B. Brake handle 2910 is resiliently biased against the cocked configuration.

Brake handle module 2900 also comprises a catch module 2915 pivotably secured to support member 2905. Catch module 2915 has a catch engaged configuration whereby catch module 2915 engages brake handle 2910 to keep brake handle 2910 in the cocked configuration. Catch module 2915 also has a catch disengaged configuration whereby catch module 2915 does not engage brake handle 2910. FIG. 29 shows catch module 2915 in its catch disengaged configuration, and FIGS. 31, 32A, and 32B show catch module in its catch engaged configuration. Catch module 2915 is resiliently biased towards the catch disengaged configuration.

In addition, brake handle module 2900 comprises an actuator 2920 secured to support member 2905. Actuator 2920 has an activated configuration whereby actuator 2920 exerts a force on catch module 2915 against the resilient bias of catch module 2915, to keep catch module 2915 in the catch engaged configuration. Actuator 2920 also has a deactivated configuration whereby actuator 2920 releases the force on the catch module. FIG. 29 shows actuator 2920 in the deactivated configuration, and FIGS. 31, 32A, and 32B show actuator 2920 in its activated configuration.

Brake handle module 2900 has a loaded configuration and a released configuration. FIG. 29 shows brake handle module 2900 in its released configuration, and FIGS. 31, 32A, and 32B show brake handle module 2900 in its loaded configuration. In the loaded configuration brake handle 2910 is in the cocked configuration, catch module 2915 is in the catch engaged configuration, and actuator 2920 is in the activated configuration. Moreover, in the released configuration actuator 2920 is in the deactivated configuration, catch module 2915 is in the catch disengaged configuration, and brake handle 2910 is in the uncocked configuration.

As shown in FIG. 29, brake handle 2910 comprises a handle body 2922 pivotably secured to support member 2905. Brake handle 2910 also comprises a grip 2926 secured to handle body 2922. In some examples, grip 2926 may have an elongated shape or other suitable shape, to allow grip 2926 to be gripped by a hand of a human operator of the electric vehicle. Brake handle 2910 is pivotable relative to support member 2905 about a pivot point 2924.

Handle body 2922 comprises a notch 2938 proximate to an outer perimeter of handle body 2922. The notch may be shaped and sized to interact with catch module 2915. Handle body 2922 may also comprise a first connecting structure 2930 and a second connecting structure 2932. In FIG. 29, handle body 2922 comprises an extension 2928 extending about radially from handle body 2922 relative to pivot point 2924. The first and second connecting structures 2930 and 2932 comprise through holes in extension 2928.

First connecting structure 2930 is connected to a first spring 2934. Spring 2934 is further securable to a second securing point 2935. In FIG. 29, second securing point 2935 is schematically represented as a dashed circle. It is contemplated that in some examples, the second securing point may comprise another structure or component of the brake handle module or the electric vehicle. Spring 2934 has an undeformed length 2936. Securing the two ends of spring 2934 between first connecting structure 2930 and the second securing point may allow for spring 2934 to be resiliently deformed (e.g. stretched) by changing the distance between first connecting structure 2930 and second securing point 2935.

In other words, length 2936 may be resiliently increased by moving brake handle 2910 to move connecting structure 2930 away from the second securing point. In this manner, spring 2934 may be used to resiliently bias brake handle 2910 against being moved from its uncocked configuration to its cocked configuration. Applying a manual force to grip 2926 to move grip 2926 in the direction of arrow 2937 may cause handle body 2922 to pivot about pivoted point 2924 in the direction indicated by arrow 2939. This pivoting motion, in turn, may move connecting structure 2930 away from second securing points 2935 to resiliently stretch spring 2934 to become longer than length 2936.

Described in yet other words, moving the brake handle from the uncocked configuration to the cocked configuration may move first connecting structure 2930 away from second securing point 2935 to stretch spring 2934 to provide the resilient biasing against brake handle 2910 being moved to the cocked configuration. Second connecting structure 2932 may be used to mechanically couple brake handle module 2900, and handle body 2910, to the actuator rod of the mechanical braking applicator. Examples of such mechanical coupling are shown in FIGS. 33-46.

Catch module 2915 comprises a catch body 2940 pivotably secured to support member 2905 at a pivot point 2946. In addition, catch module 2915 comprises a catch extension 2942 secured to catch body 2940. Catch extension 2942 may be shaped and sized to engage notch 2938 of brake handle 2910. In FIG. 29 catch extension 2942 is integrally formed with catch body 2940. It is also contemplated that in some examples, the catch extension may be a component formed separately from catch body 2940 and then secured to catch body 2940.

Catch module 2915 also comprises a spring 2944 abutting catch body 2940. Spring 2944 is compressed relative to its undeformed configuration when catch module 2915 is in the catch engaged configuration, and becomes less compressed or uncompressed when catch module 2915 moves towards the catch disengaged configuration. In this manner, spring 2944 may resiliently bias catch module 2915 towards the catch disengaged configuration. It is also contemplated that in some examples, spring 2944 may be partially compressed relative to its uncompressed configuration when catch module 2915 is in its catch disengaged configuration, and may become further compressed against its resilient biasing force when the catch module is moved into the catch engaged configuration.

In other words, the resilient biasing force of spring 2944 tends to push on catch body 2940 to cause catch body 2940 to pivot about pivot point 2946 to move catch extension 2942 away from notch 2938 to push or bias catch module 2915 towards its catch disengaged configuration.

Actuator 2920 comprises a solenoid 2950 having a push rod 2952. Push rod 2952 may have an extended configuration and a retracted configuration. FIG. 29 shows push rod 2952 in its retracted configuration. FIG. 31, in turn, shows push rod 2952 in its extended configuration. In the activated configuration of solenoid 2950 push rod 2952 is in its extended configuration to exert a force on catch extension 2942 to push against the resilient force of spring 2944, which in turn may keep catch extension 2942 engaged with notch 2938. In the deactivated configuration of solenoid 2950 the resilient force of spring 2944 may push push rod 2952 towards its retracted configuration and may disengage catch extension 2942 from notch 2938.

In other words, when solenoid 2950 is not powered to enable push rod 2952 to resist the resilient biasing force of spring 2944, this resilient biasing force of spring 2944 pushes catch extension 2942 away from notch 2938. When catch extension 2942 is disengaged from notch 2938, catch module 2915 is no longer able to resist the resilient force applied by spring 2934 on brake handle 2910. As such, when catch module 2915 is in its catch disengaged configuration, the resilient biasing force of spring 2934 may pull on extension 2928 to cause the brake module handle to move from its loaded configuration to its released configuration.

In some examples, brake handle module 2900 may also comprise a sensor 2954 to detect whether brake handle module 2900 is in its loaded configuration or the released configuration. FIG. 29 shows sensor 2954 schematically for illustrative purposes. Moreover, in some examples, sensor 2954 may comprise a mechanical sensor, a magnetic sensor, an electrical sensor, an optical sensor, and the like. In some examples where sensor 2954 comprises a mechanical sensor, sensor 2954 may comprise a limit switch, and the like. Furthermore, it is contemplated that in some examples sensor 2954 may have a shape, size, or position that is different than those of sensor 2954 shown in FIG. 29. Furthermore, it is contemplated that in some examples, the sensor may be external to the brake handle module, or that the brake handle module need not comprise such a sensor. The data generated by sensor 2954 may be sent directly or indirectly to a controller of the electric vehicle incorporating brake handle module 2900.

Figure 30B:
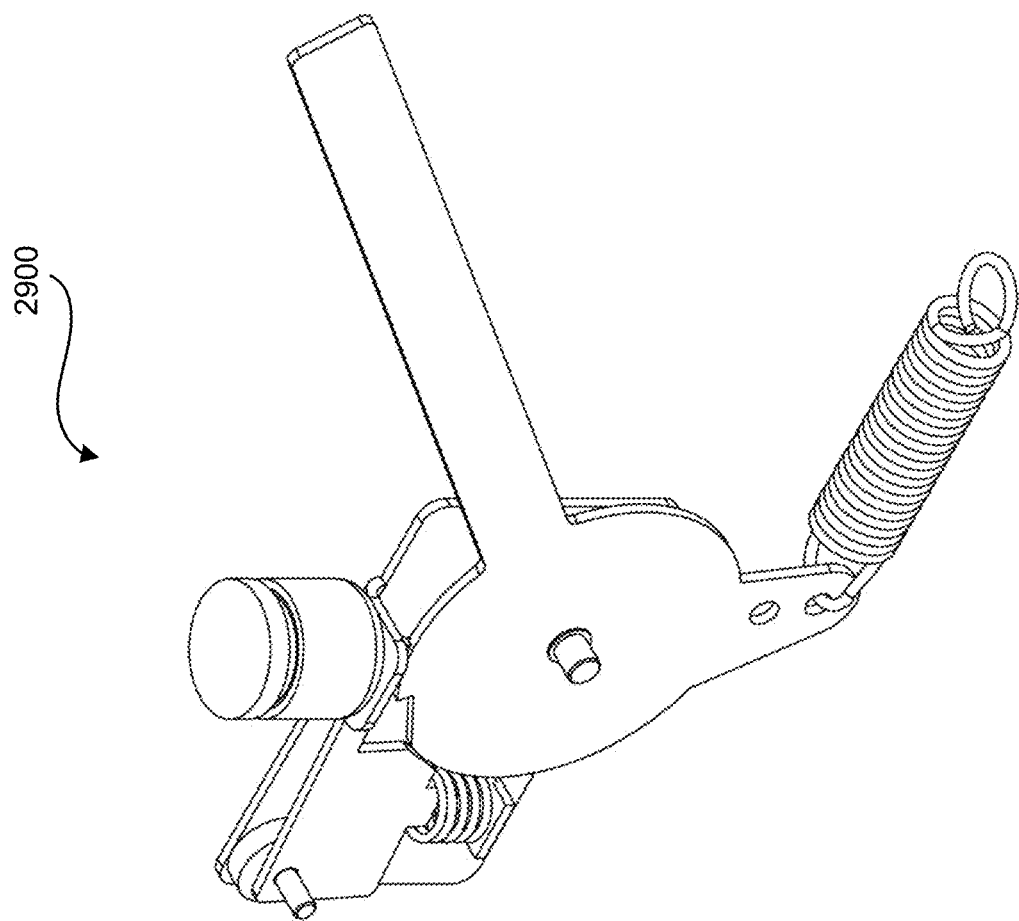
FIGS. 30A and 30B show two different perspective views of the brake handle module shown in FIG. 29.
Figure 30A:
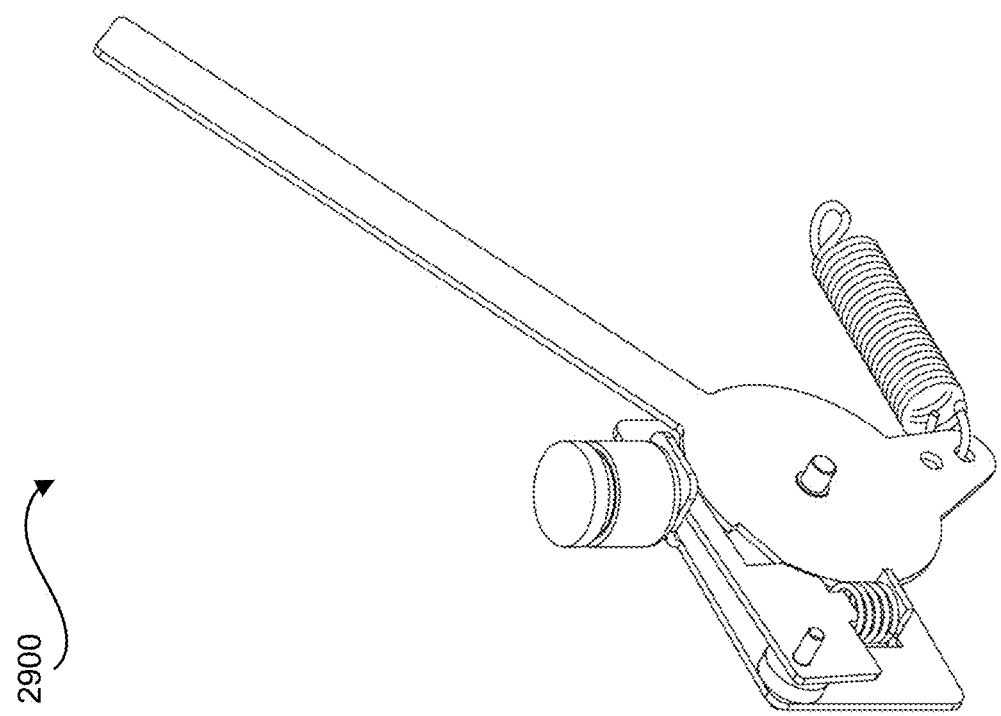

FIG. 30A shows a first perspective view of brake handle module 2900 in its released configuration. FIG. 30B shows a second perspective view of brake handle module 2900 in its released configuration. Sensor 2954 is omitted from FIGS. 30A and 30B for ease of illustration. FIG. 31 shows a side elevation view of brake handle module 2900 in its loaded configuration. To transition from the released configuration shown in FIG. 29 to the loaded configuration shown in FIG. 31 manual force may be applied to grip 2926 to move brake handle 2910 to increase the distance between first connecting structure 2932 and second securing point 2935. This increase in distance, in turn, stretches spring 2934 against its resilient force to a length 3105 that is greater than length 2936 shown in FIG. 29.

When brake handle 2910 is pushed to its cocked configuration, solenoid 2950 may be powered to move push rod 2952 into its extended configuration to force catch extension 2942 to interact with notch 2938. This interaction, in turn, may keep brake handle 2910 in its cocked configuration and brake handle module 2900 in its loaded configuration against the resilient biasing force of spring 2934. To release brake handle module 2900, power may be cut off to solenoid 2950. Once solenoid 2950 is no longer powered, the resilient biasing force of spring 2944 pushes catch extension 2942 to become disengaged from notch 2938. When catch extension 2942 is no longer engaged with notch 2938, the resilient biasing force of spring 2934 may actuate or move brake handle 2910 into its uncocked configuration, thereby moving brake handle module 2900 into its released configuration. In this manner, a controller may send an electrical signal to solenoid 2950 to trigger the transition of brake handle module 2900 from its loaded configuration to its released configuration. In some examples, this electrical signal may comprise cutting driving or operating electrical power to solenoid 2950.

FIG. 32A shows a first perspective view of brake handle module 2900 in its released configuration. FIG. 32B shows a second perspective view of brake handle module 2900 in its released configuration. Sensor 2954 is omitted from FIGS. 32A and 32B for ease of illustration. Moreover, while sensor 2954 is shown in FIGS. 29 and 31, for ease of illustration sensor 2954 is omitted from the other Figs. depicting brake handle module 2900.

Figure 33:
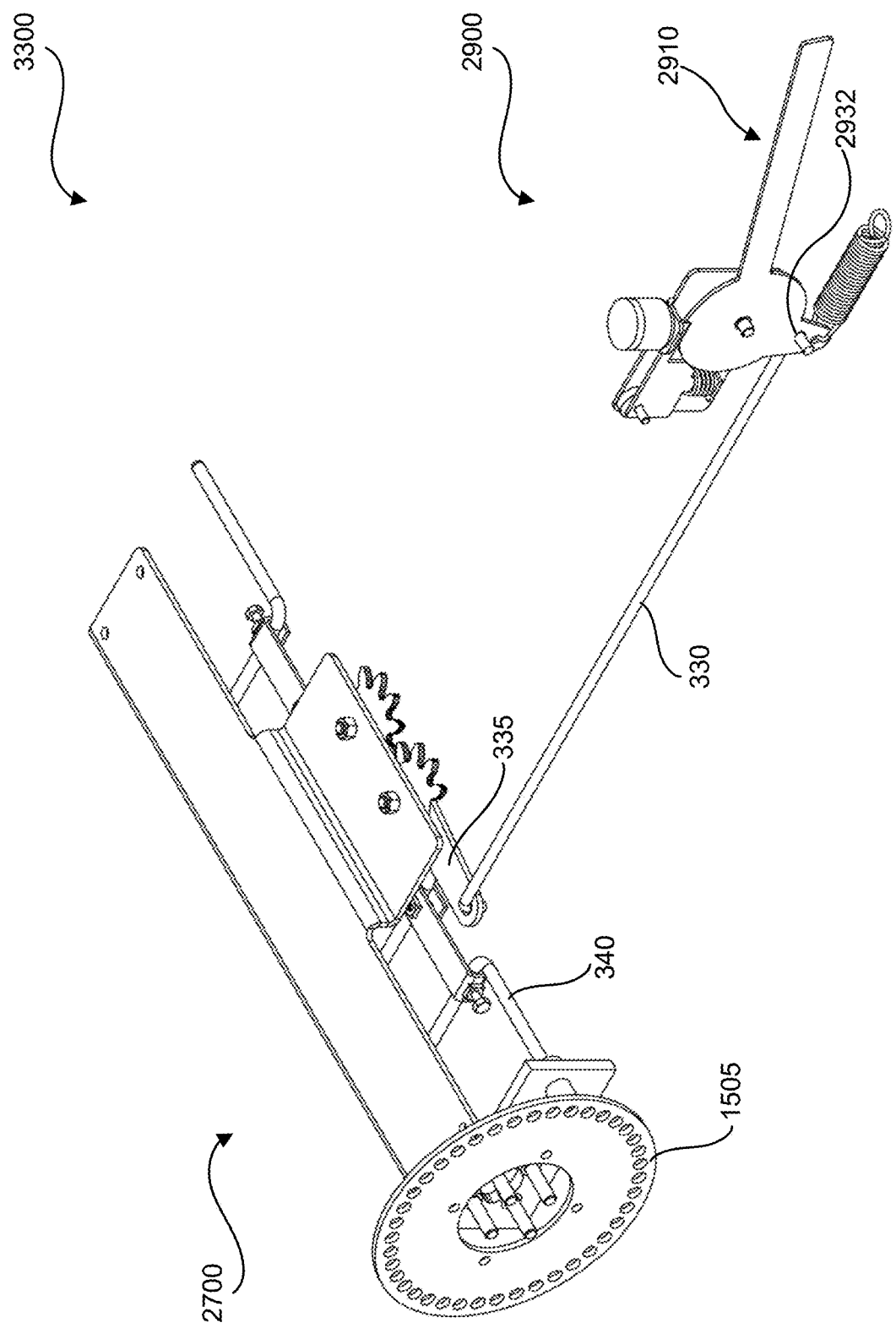
FIG. 33 shows a partial perspective view of another example mechanical braking applicator in a disengaged configuration, in accordance with a non-limiting implementation of the present specification.

FIGS. 33 to 46 show various views of an example mechanical braking applicator 3300 comprising brake handle module 2900 mechanically coupled to mechanical braking applicator 2700. FIGS. 33 to 39 show mechanical braking applicator 3300 in a disengaged configuration, while FIGS. 40 to 46 show mechanical braking applicator 3300 in an engaged configuration. FIG. 33 shows a first perspective view of the mechanical braking applicator 3300. As shown in FIG. 33, actuator rod 330 may be used to mechanically couple brake handle module 2900 to mechanical braking applicator 2700. Actuator rod 330 may mechanically couple second securing point 2932 to lever 335 to transmit mechanical pulling or pushing force generated by brake handle module 2900 to mechanical braking applicator 2700.

When brake handle module 2900 transitions or moves from its loaded configuration to its released configuration, the resilient force of spring 2934 biasing brake handle 2910 forces brake handle module 2900 towards its released configuration. Such a moving or transitioning brake handle 2910 exerts a pulling force on actuator rod 330 to move braking rod 340 from its disengaged configuration to its engaged configuration.

When brake handle module 2900 transitions or moves from its released configuration to its loaded configuration, an external force may be applied to brake handle 2910 to move the brake handle against its resilient biasing force from the uncocked configuration to the cocked configuration. This movement, in turn, moves brake handle module 2900 towards its loaded configuration. Brake handle 2910, in turn, exerts a pushing force on actuator rod 330 to move braking rod 340 from its engaged configuration to its disengaged configuration. In some examples, this external force applied to brake handle 2910 may comprise a manual force applied by a human operator of the electric vehicle incorporating mechanical braking applicator 3300.

As discussed above, brake handle module 2900 may be cocked or loaded manually, and released by a controller sending an electrical signal or cutting power to an actuator of brake handle module 2900. In other words, before the applying the mechanical braking, a manual force may be applied to the brake handle module to move the brake handle from the uncocked configuration to the cocked configuration against the corresponding resilient biasing force of spring 2934 (shown in FIGS. 29 and 31). As the transition of brake handle module 2900 from its loaded configuration to its released configuration may be triggered by the controller, the addition of brake handle module 2900 to mechanical braking applicator 2700 may allow the application of mechanical braking to be controlled or triggered by the controller.

Figure 34:
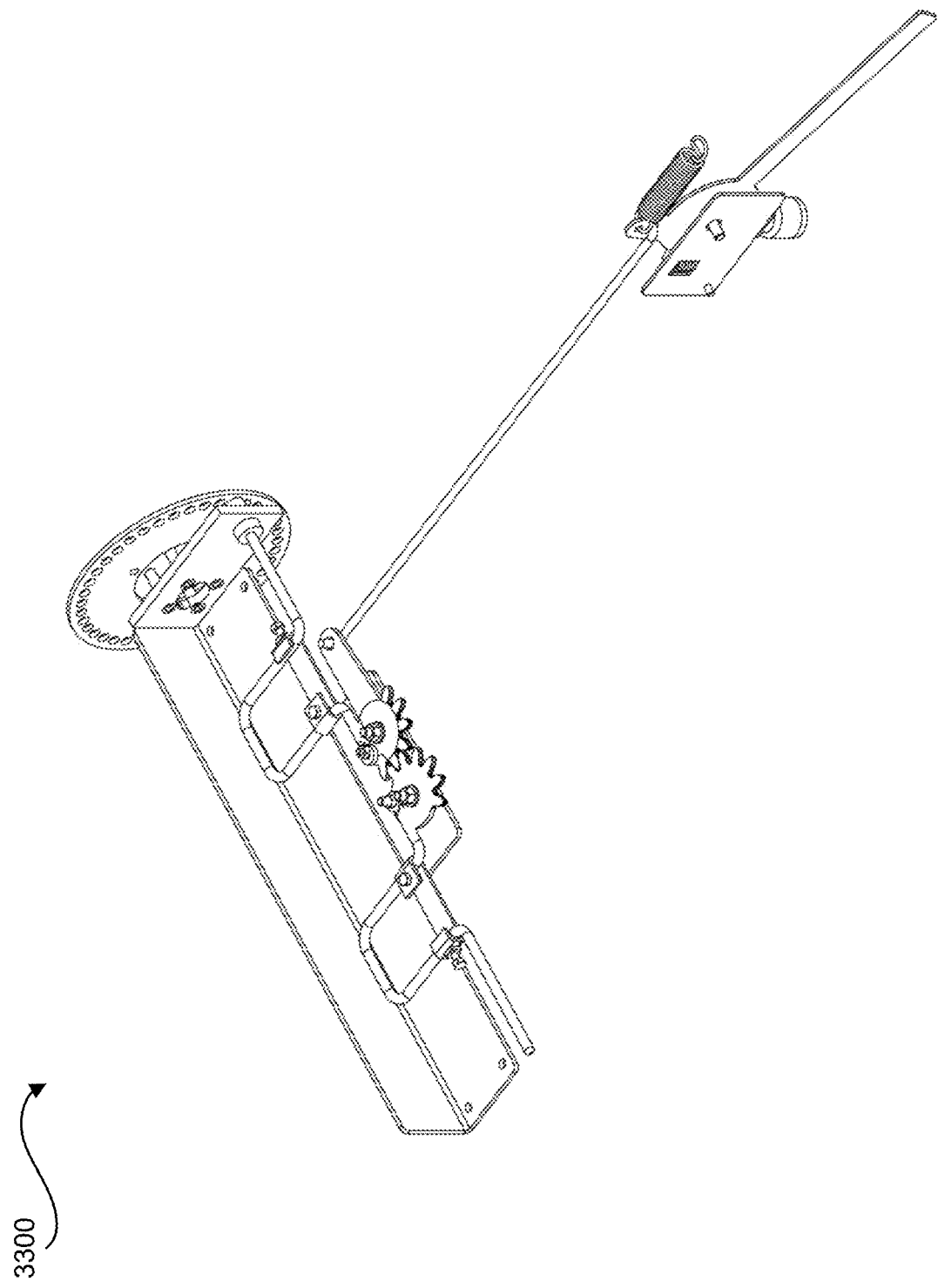
FIG. 34 shows another partial perspective of the mechanical braking applicator shown in FIG. 33.
Figure 35:
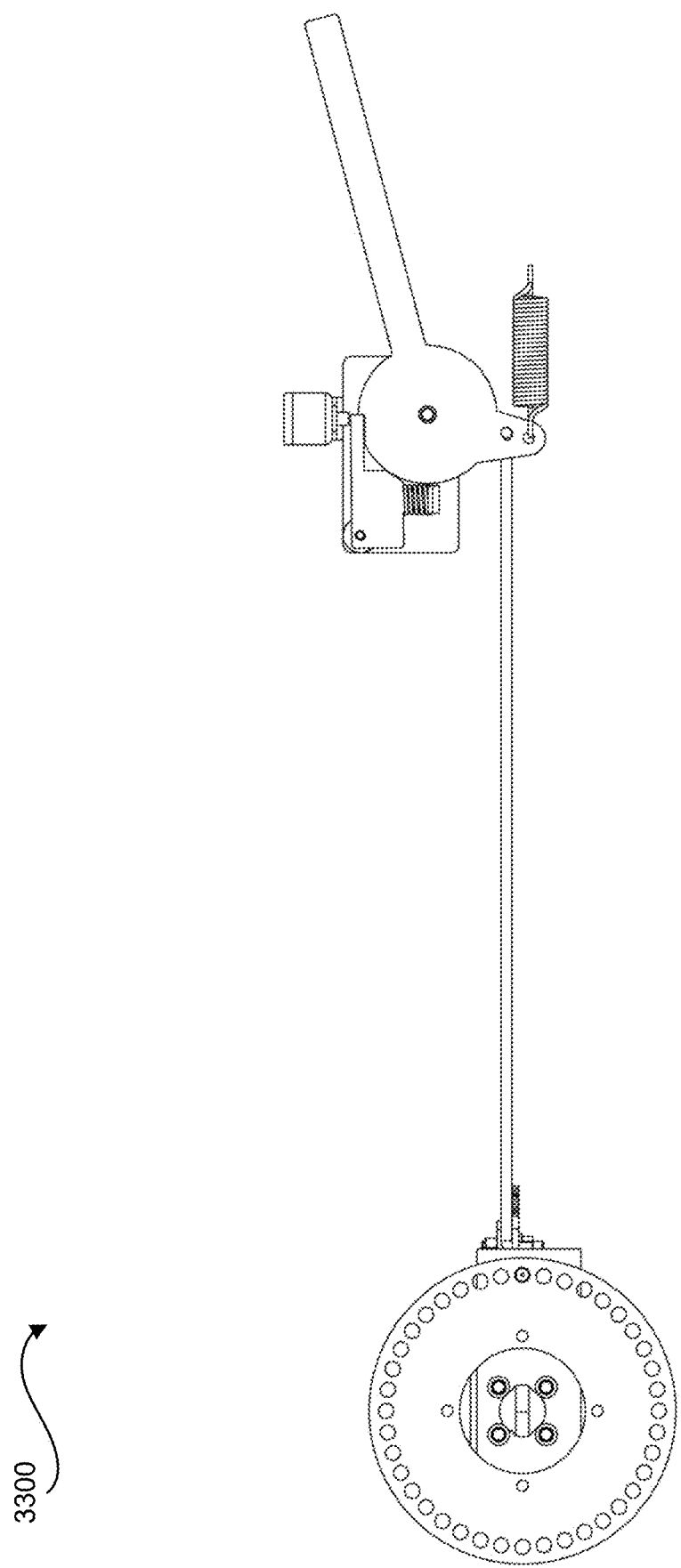
FIG. 35 shows a right side elevation view of the mechanical braking applicator shown in FIG. 33.
Figure 36:
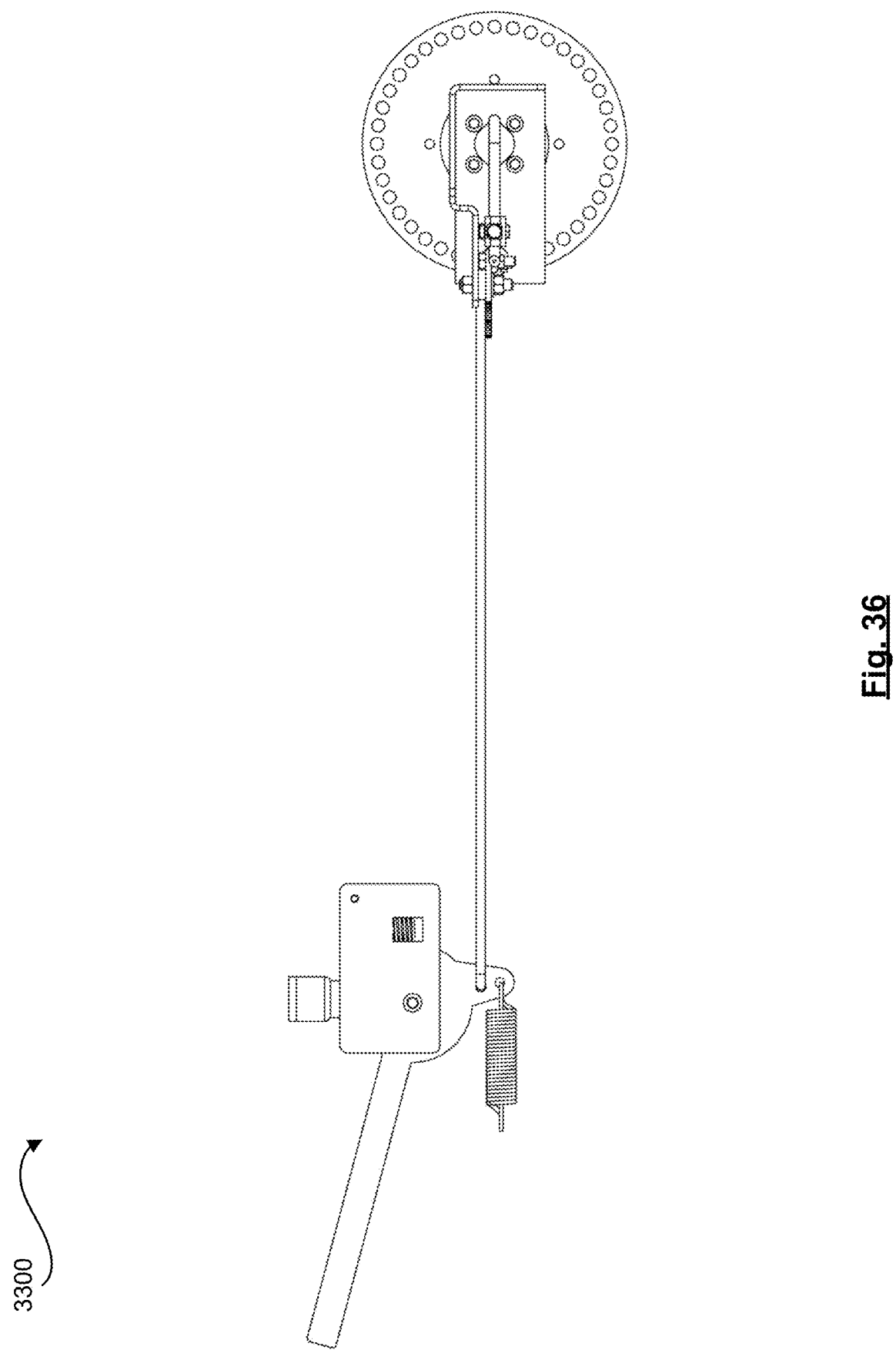
FIG. 36 shows a left side elevation view of the mechanical braking applicator shown in FIG. 33.
Figure 37:
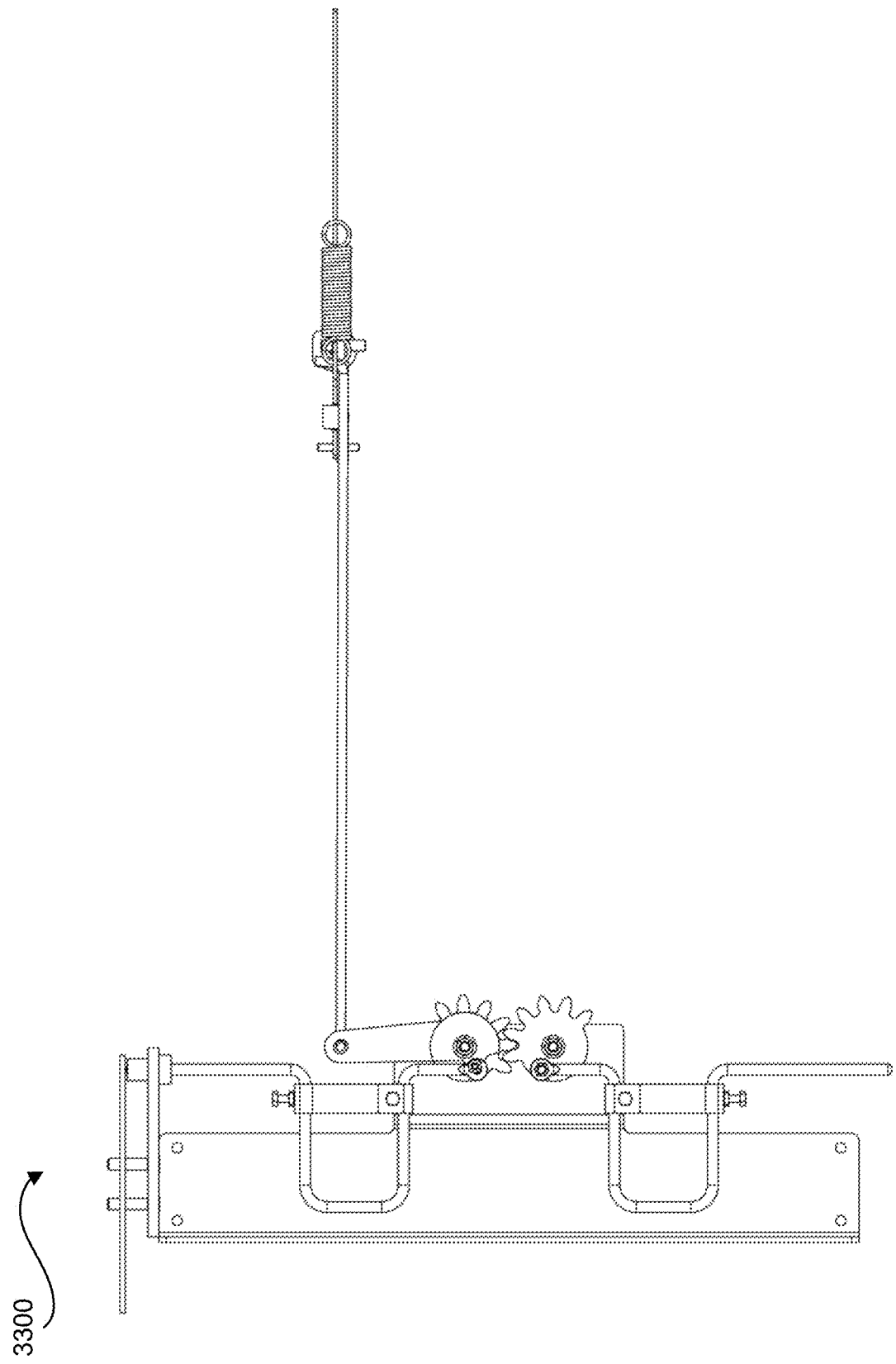
FIG. 37 shows a plan view of the mechanical braking applicator shown in FIG. 33.
Figure 38:
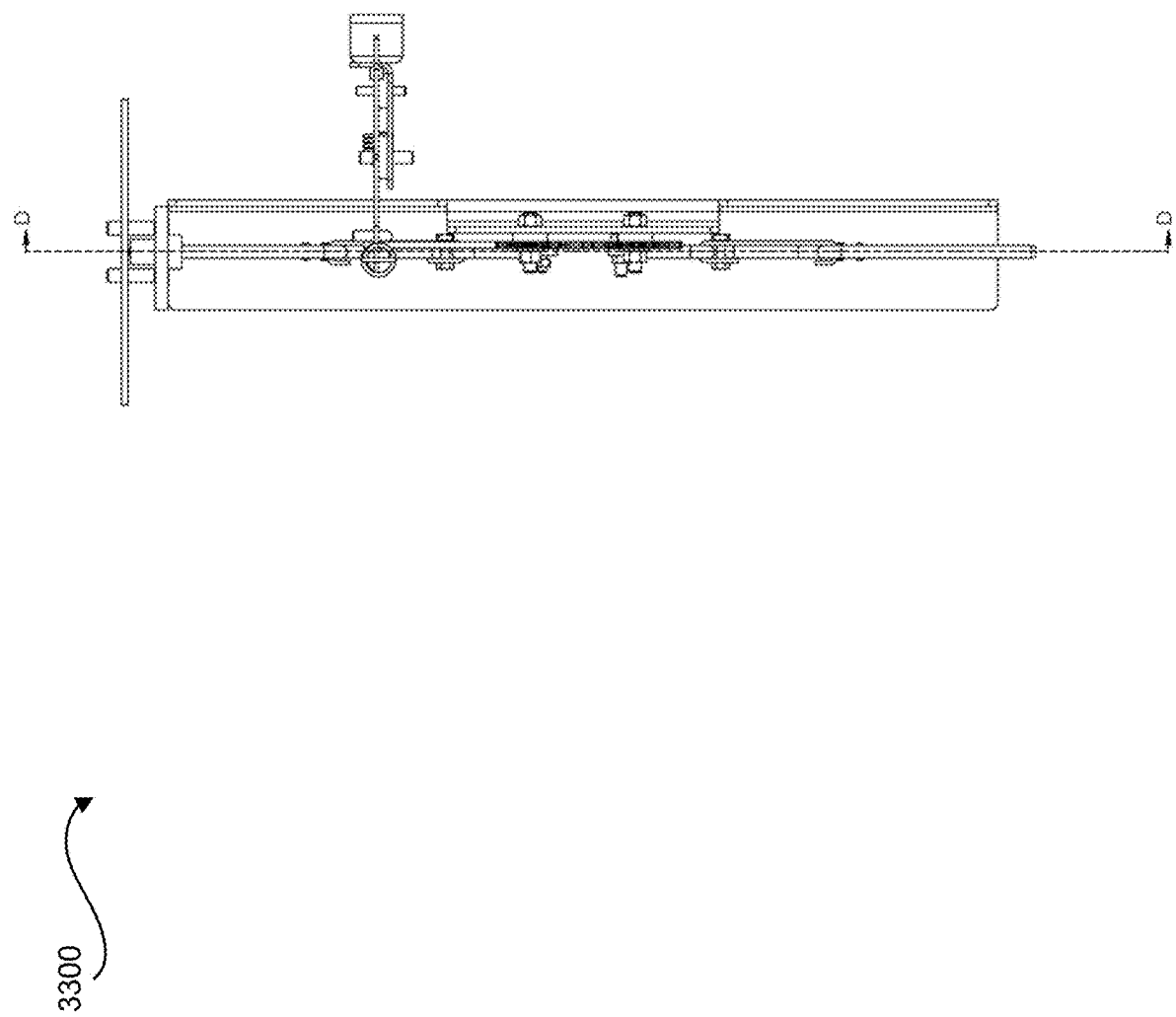
FIG. 38 shows a front side elevation view of mechanical braking applicator shown in FIG. 33.
Figure 39:
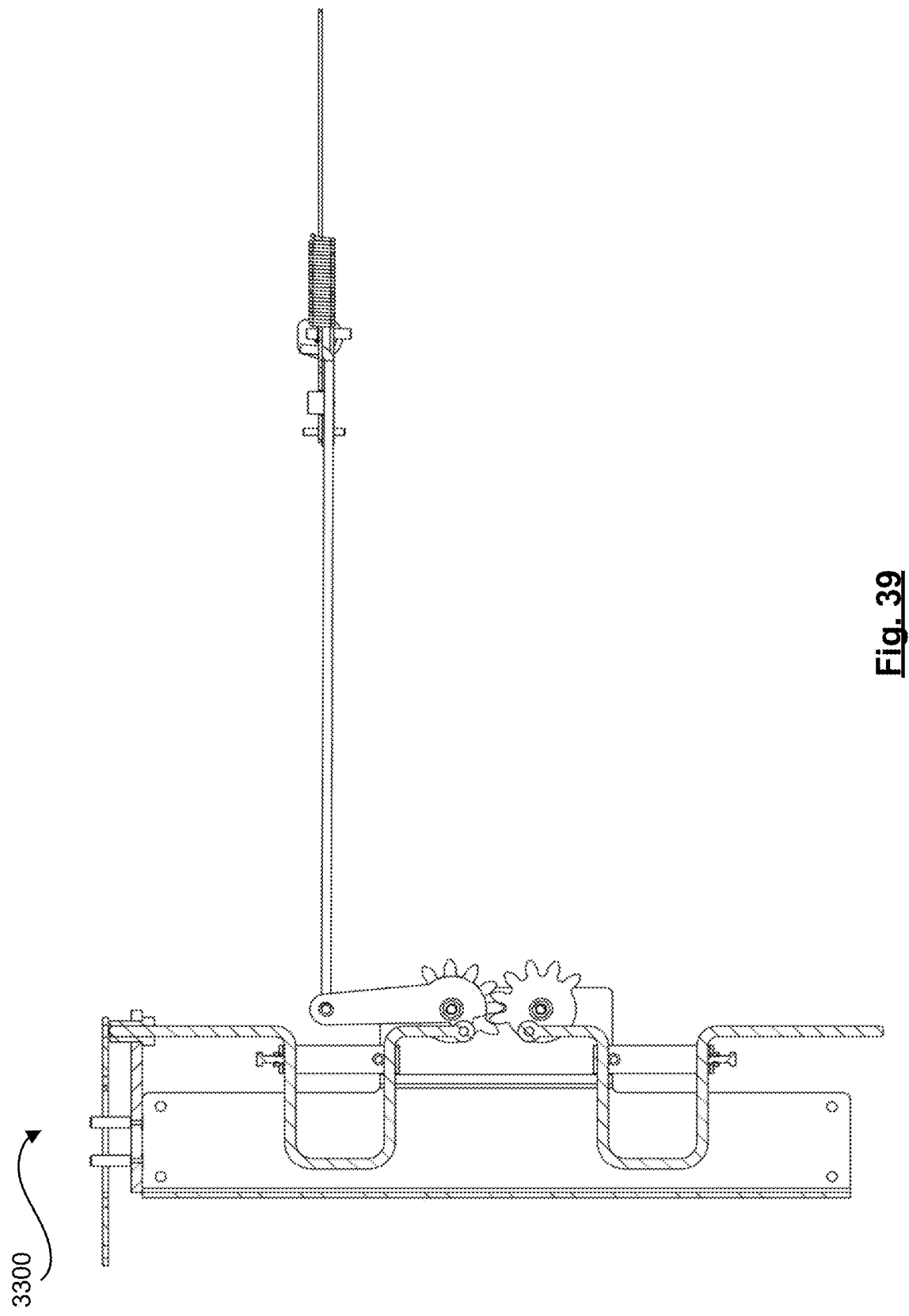
FIG. 39 shows a cross-sectional view (taken along line D-D shown in FIG. 38) of the mechanical braking applicator shown in FIG. 33.

FIG. 34 shows a second perspective view of the mechanical braking applicator shown in FIG. 33. FIG. 35 shows a right side elevation view of the mechanical braking applicator shown in FIG. 33. FIG. 36 shows a left side elevation view of the mechanical braking applicator shown in FIG. 33. FIG. 37 shows a plan view of the mechanical braking applicator shown in FIG. 33. FIG. 38 shows a front side elevation view of mechanical braking applicator shown in FIG. 33. FIG. 39 shows a cross-sectional view (taken along line D-D shown in FIG. 38) of the mechanical braking applicator shown in FIG. 33.

Figure 40:
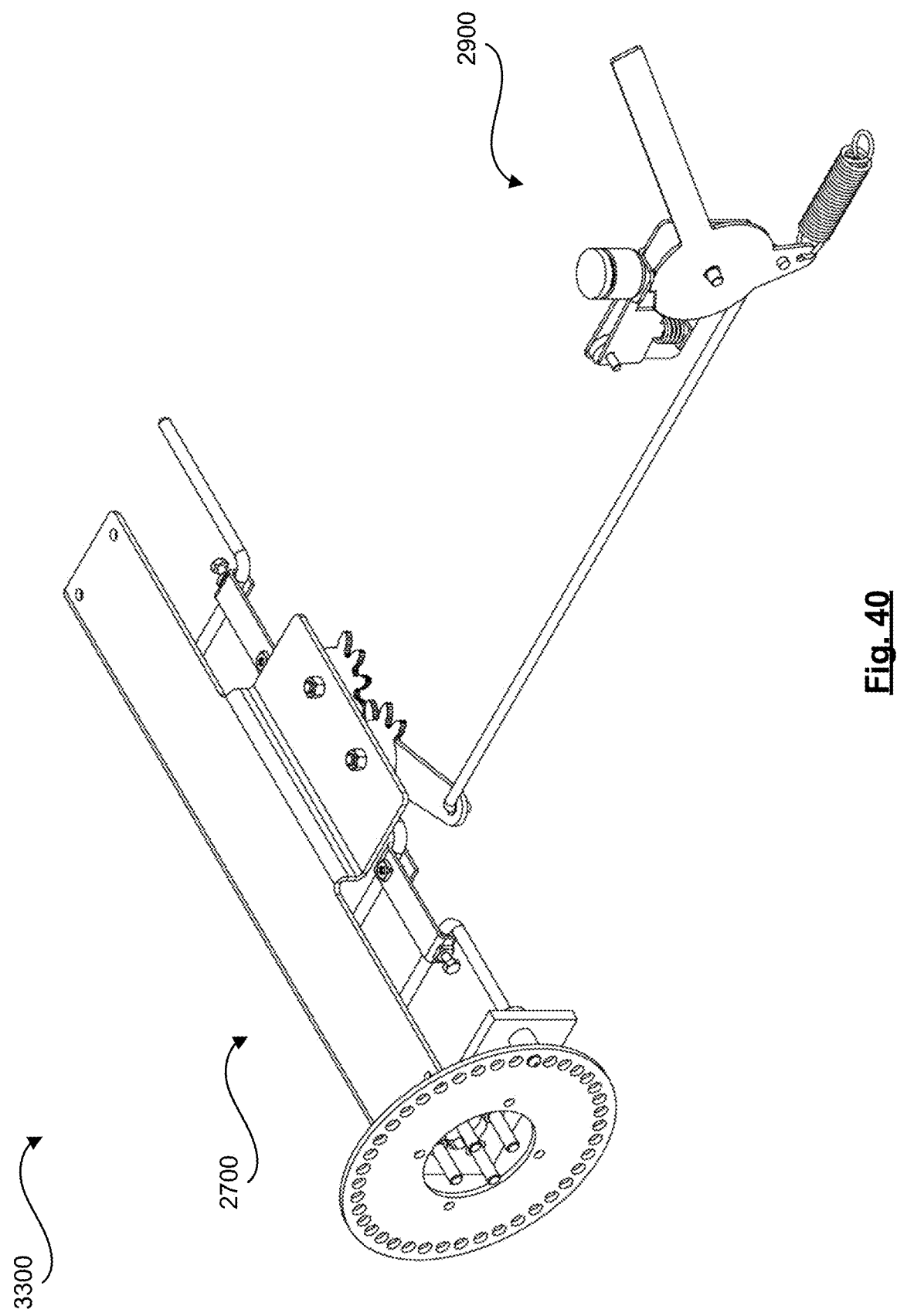
FIG. 40 shows a partial perspective view of the mechanical braking applicator shown in FIG. 33, in an engaged configuration.
Figure 41:
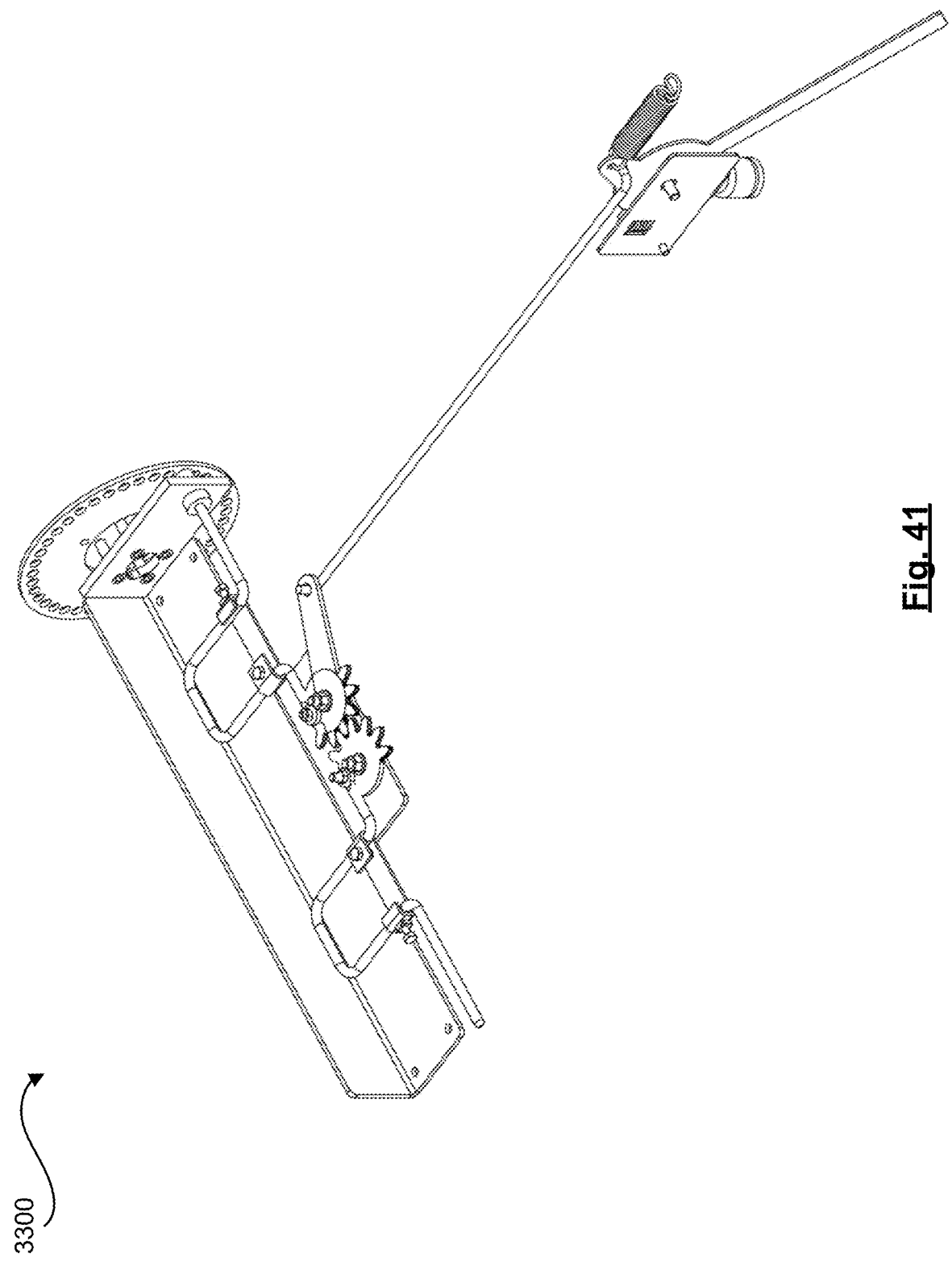
FIG. 41 shows another partial perspective of the mechanical braking applicator shown in FIG. 40.
Figure 42:
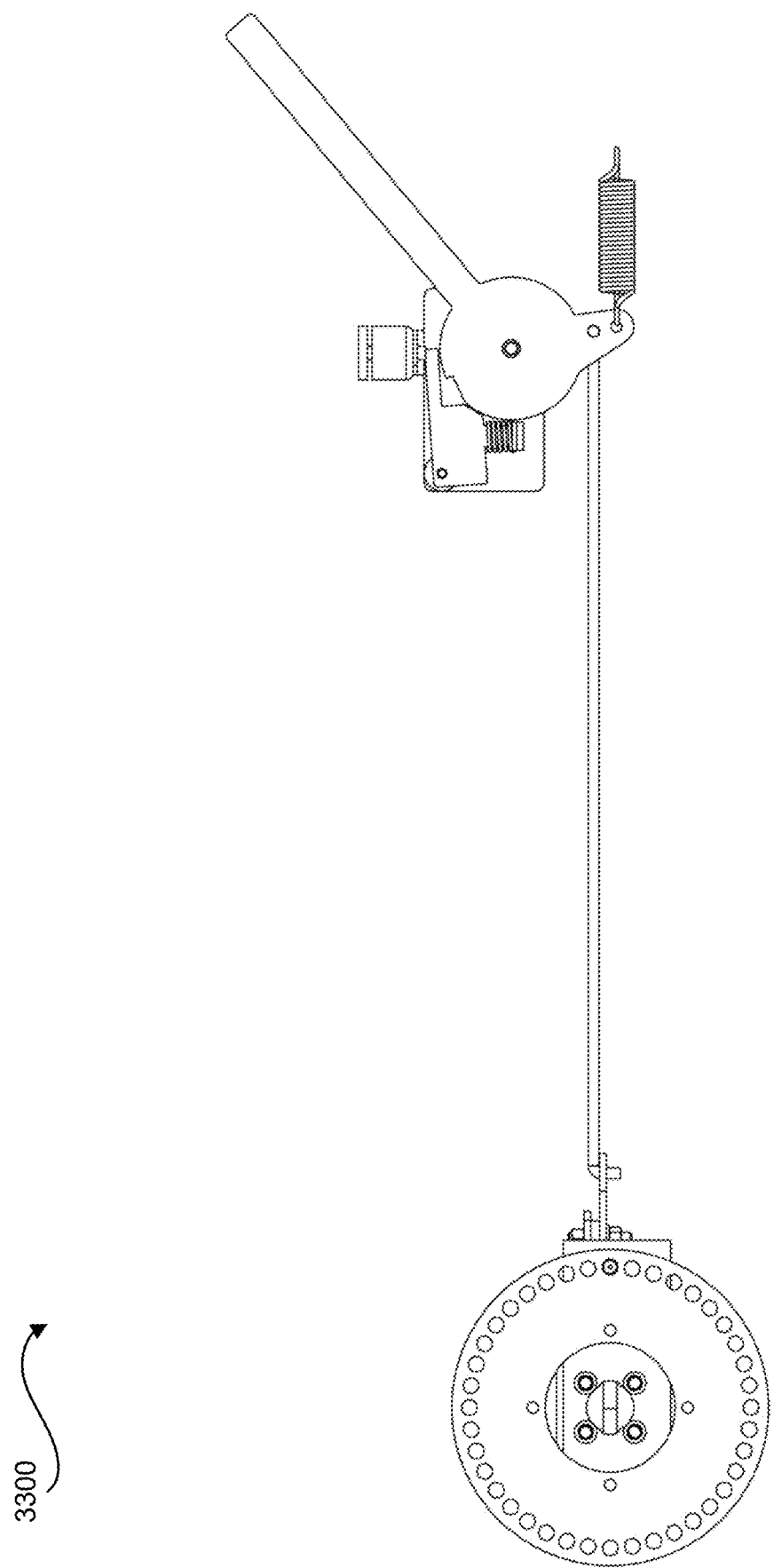
FIG. 42 shows a right side elevation view of the mechanical braking applicator shown in FIG. 40.
Figure 43:
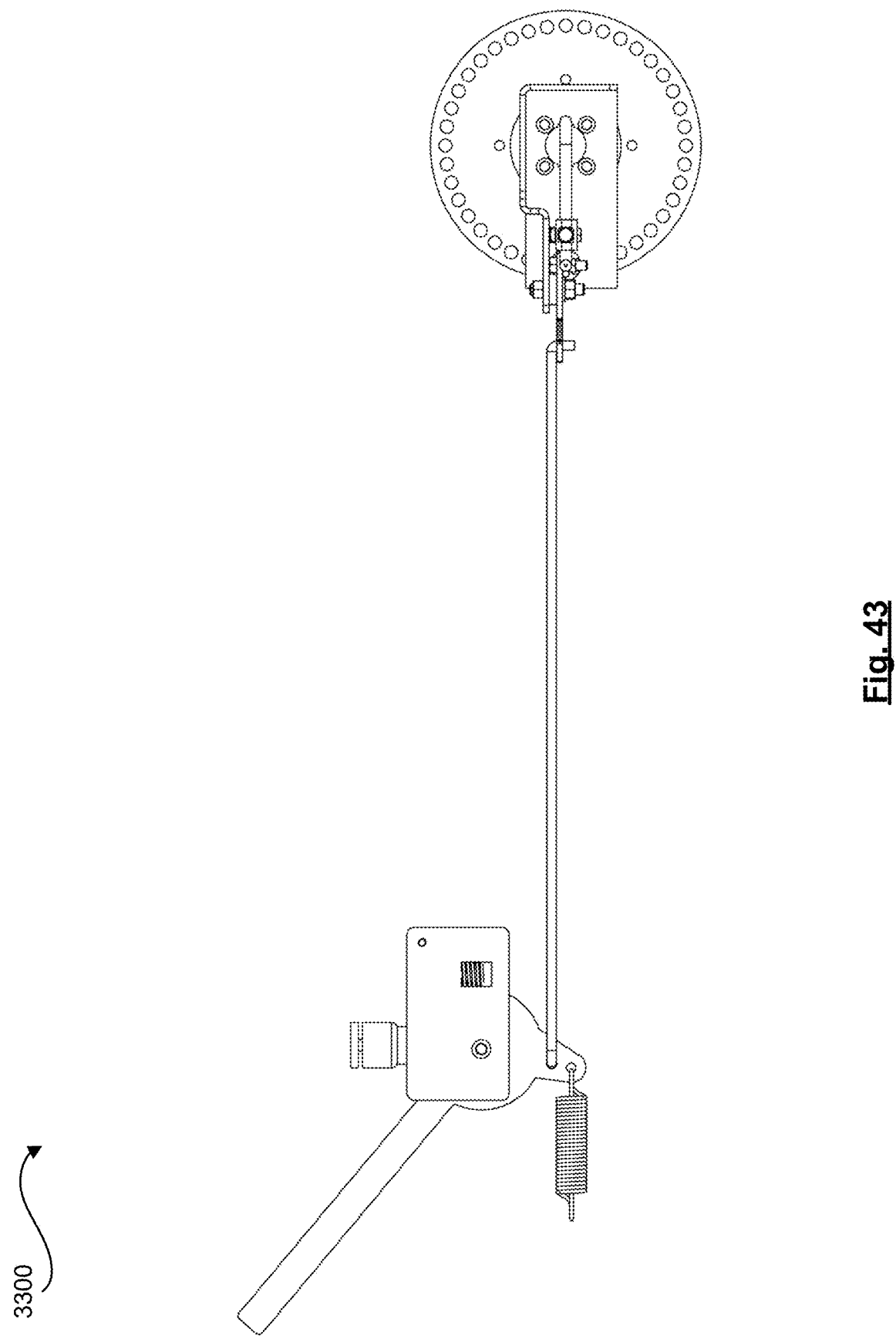
FIG. 43 shows a left side elevation view of the mechanical braking applicator shown in FIG. 40.
Figure 44:
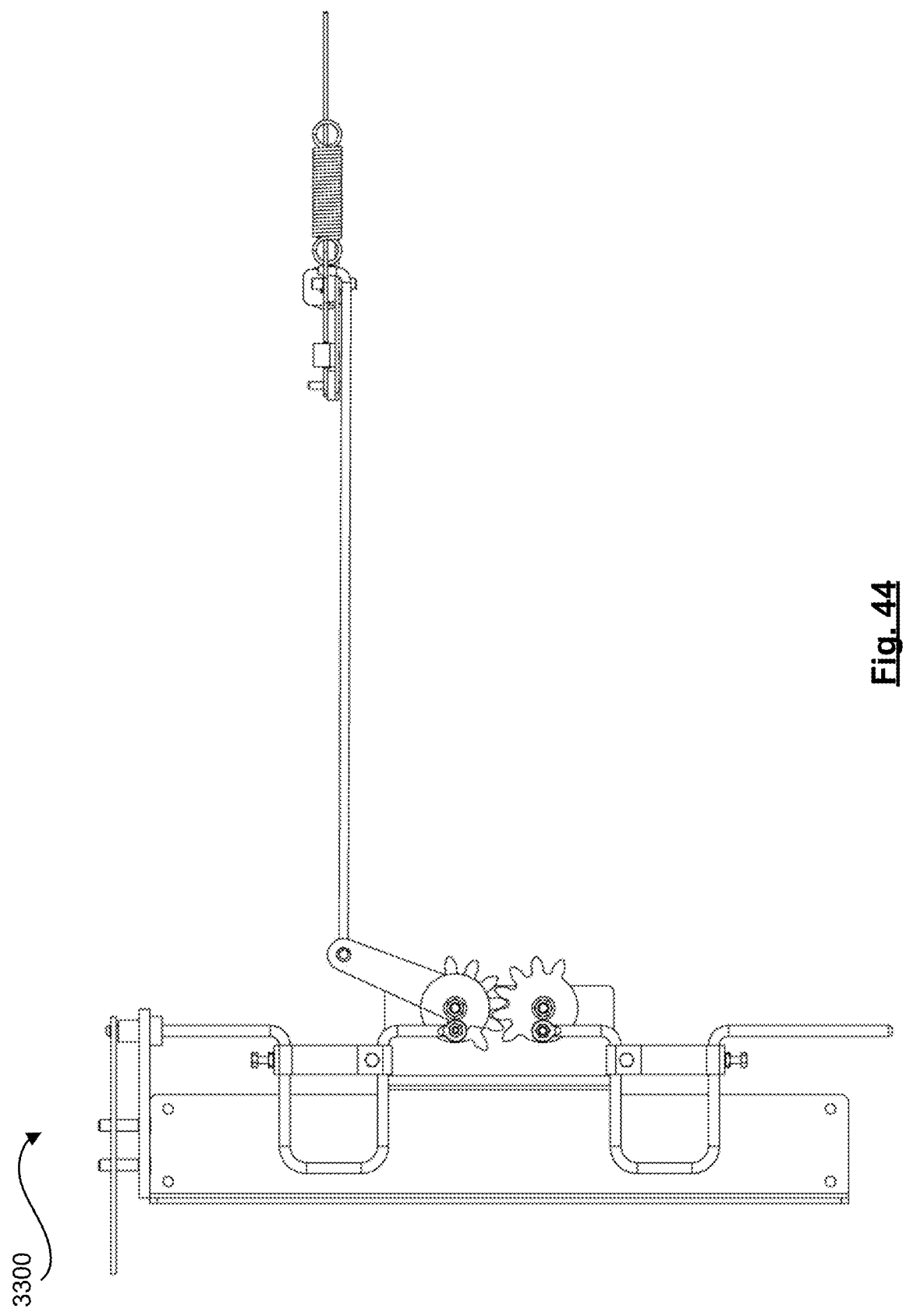
FIG. 44 shows a plan view of the mechanical braking applicator shown in FIG. 40.
Figure 45:
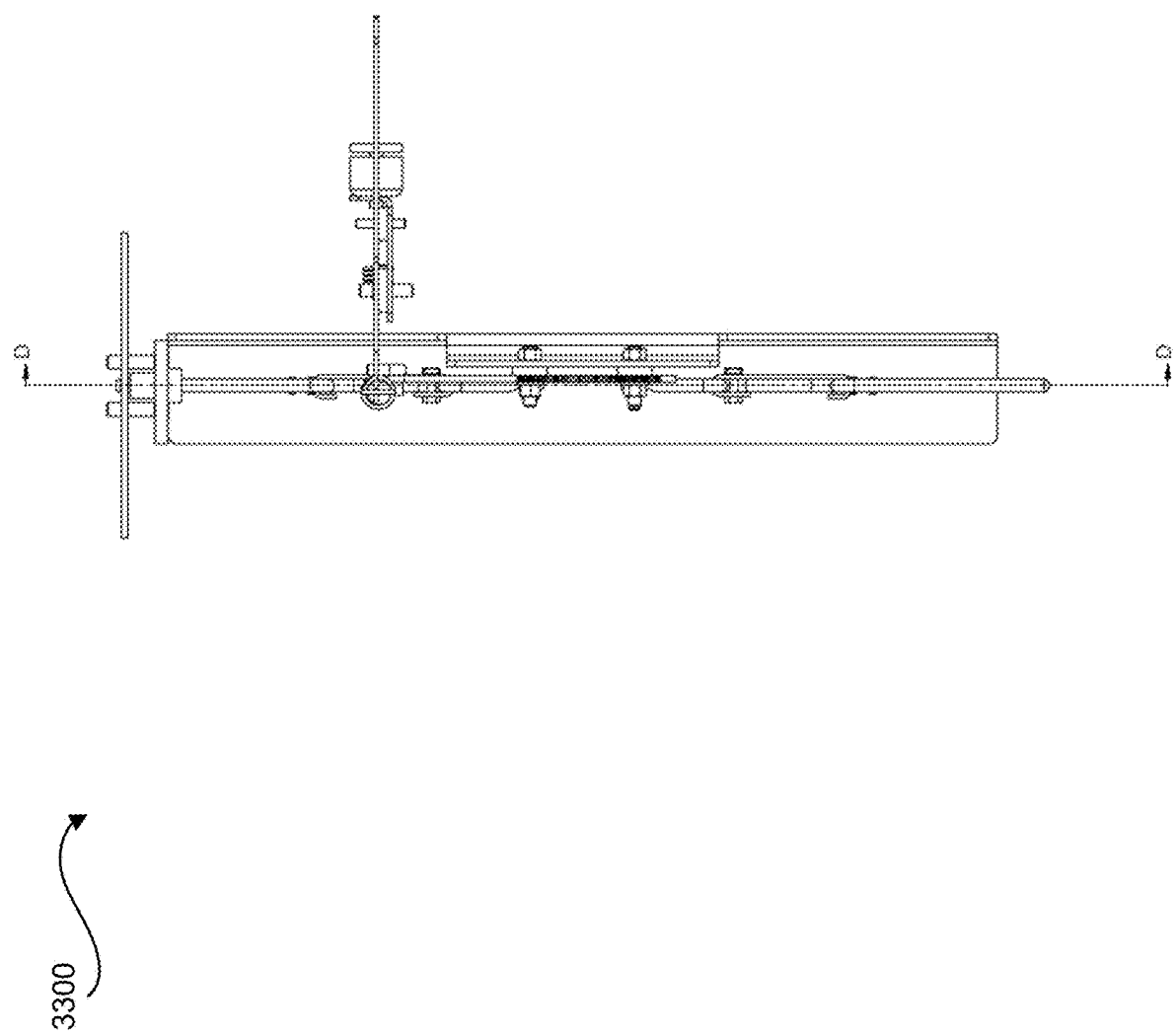
FIG. 45 shows a front side elevation view of the mechanical braking applicator shown in FIG. 40.
Figure 46:
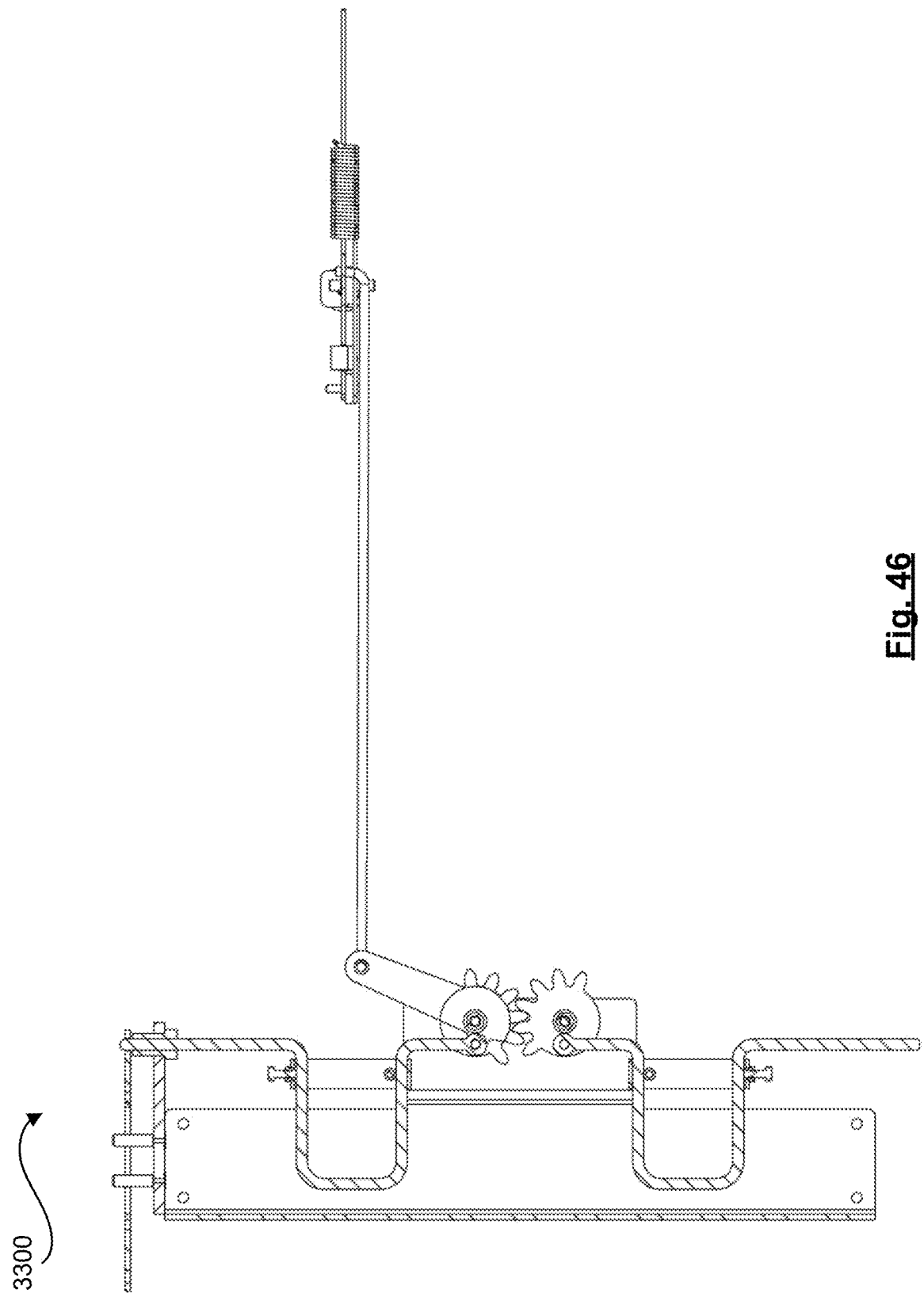
FIG. 46 shows a cross-sectional view (taken along line D-D shown in FIG. 45) of the mechanical braking applicator shown in FIG. 40.

FIG. 40 shows first perspective view of mechanical braking applicator 3300, whereby mechanical braking applicator 2700 is in its engaged configuration and brake handle module 2900 is in its released configuration. FIG. 41 shows a second perspective view of the mechanical braking applicator shown in FIG. 40. FIG. 42 shows a right side elevation view of the mechanical braking applicator shown in FIG. 40. FIG. 43 shows a left side elevation view of the mechanical braking applicator shown in FIG. 40. FIG. 44 shows a plan view of the mechanical braking applicator shown in FIG. 40. FIG. 45 shows a front side elevation view of the mechanical braking applicator shown in FIG. 40. FIG. 46 shows a cross-sectional view (taken along line D-D shown in FIG. 45) of the mechanical braking applicator shown in FIG. 40.

Figure 47:
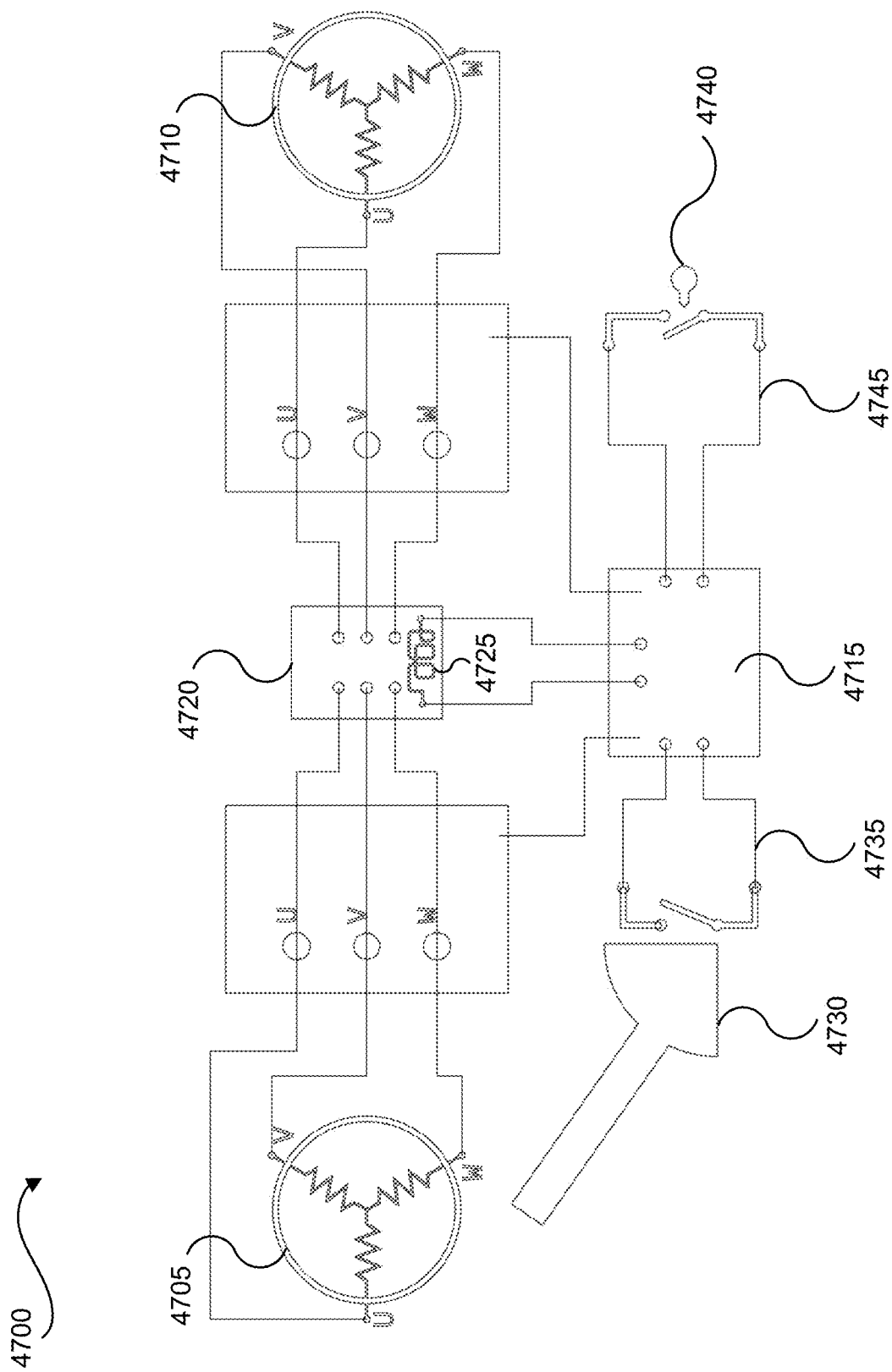
FIG. 47 shows a schematic representation of an example circuit, in accordance with a non-limiting implementation of the present specification.

Turning now to FIG. 47, a schematic representation is shown of an example circuit 4700. Circuit 4700 shows an example set of components of an example electromagnetic braking module. These components include electric motors 4705 and 4710. In some examples, electric motors 4705 and 4710 may be similar to electric motors 231 and 232 described in relation to FIG. 2B. Each of motors 4705 and 4710 may have three phases labeled U, V, and W. Circuit 4700 also includes a controller 4715 which may control or drive electric motors 4705 and 4710. In some examples, controller 4715 may be similar to controller 236, controller 270, or another one of the controllers described herein. Moreover, in some examples, controller 4715 may be, or may be a component of, a vehicle control module (VCM) of the electric vehicle.

Circuit 4700 also comprises a phase-shorting module 4720. Phase-shorting module 4720 may provide passive electromagnetic magnetic braking by shorting together one or more phases of each of electric motors 4705 and 4710, or by shorting one or more phases of electric motor 4705 two one or more phases of electric motor 4710. In some examples, phase-shorting module 4720 may comprise a contactor, a relay, a transistor, or the like. Phase-shorting module 4720 may comprise a switch or actuator 4725 controlled by controller 4715. In this manner, controller 4715 may be able to control phase-shorting module 4720 by activating or deactivating switch or actuator 4725.

In some examples, when activated phase-shorting module 4720 may short or electrically connect phase U of electric motor 4705 with base W of electric motor 4710. In addition, phase-shorting module 4720 may also short phases V and W of motor 4705 with phases V and U of electric motor 4710. In doing so, phase-shorting module 4720 may also short phases V and W of motor 4705 together, and short phases V and U electric motor 4710 together.

Other components of the electric vehicle may also provide input that may be taken into account when controlling phase-shorting module 4720. For example, FIG. 47 shows a brake handle module 4730 which may be modeled as a switch circuit 4735. In some examples brake handle module 4730 may be similar to brake handle module 2900. Depending on whether brake handle module 4730 is in its loaded configuration or released configuration, circuit 4735 may be open or closed. The opening or closing of circuit 4735 may provide electrical input or a status indicator to controller 4715, based on which input controller 4715 may determine whether or not to activate phase-shorting module 4720 to short the phases of electric motors 4705 and 4710.

FIG. 47 also shows the key switch 4740 which may be modeled as a switch circuit 4745. Depending on whether key switch 4740 is in its on or off position, circuit 4745 may be open or closed. The opening or closing of circuit 4745 may provide electrical input or a status indicator to controller 4715, based on which input controller 4715 may determine whether or not to activate phase-shorting module 4720 to short the phases of electric motors 4705 and 4710.

As described above, in some examples, applying the electromagnetic braking may comprise applying a passive electromagnetic braking, which may comprise shorting together one or more phases of one or more of electric motors 4705 and 4710, or shorting one or more phases of electric motor 4705 with one or more phases of electric motor 4710. Moreover, while FIG. 47 shows passive electromagnetic braking applied to two electric motors, it is contemplated that in some examples the electric vehicle may comprise one or more than two electric motors. In such examples, passive electromagnetic braking may also be provided by shorting the phases of one motor, or shorting the phases between two or more of the electric motors.

Figure 48:
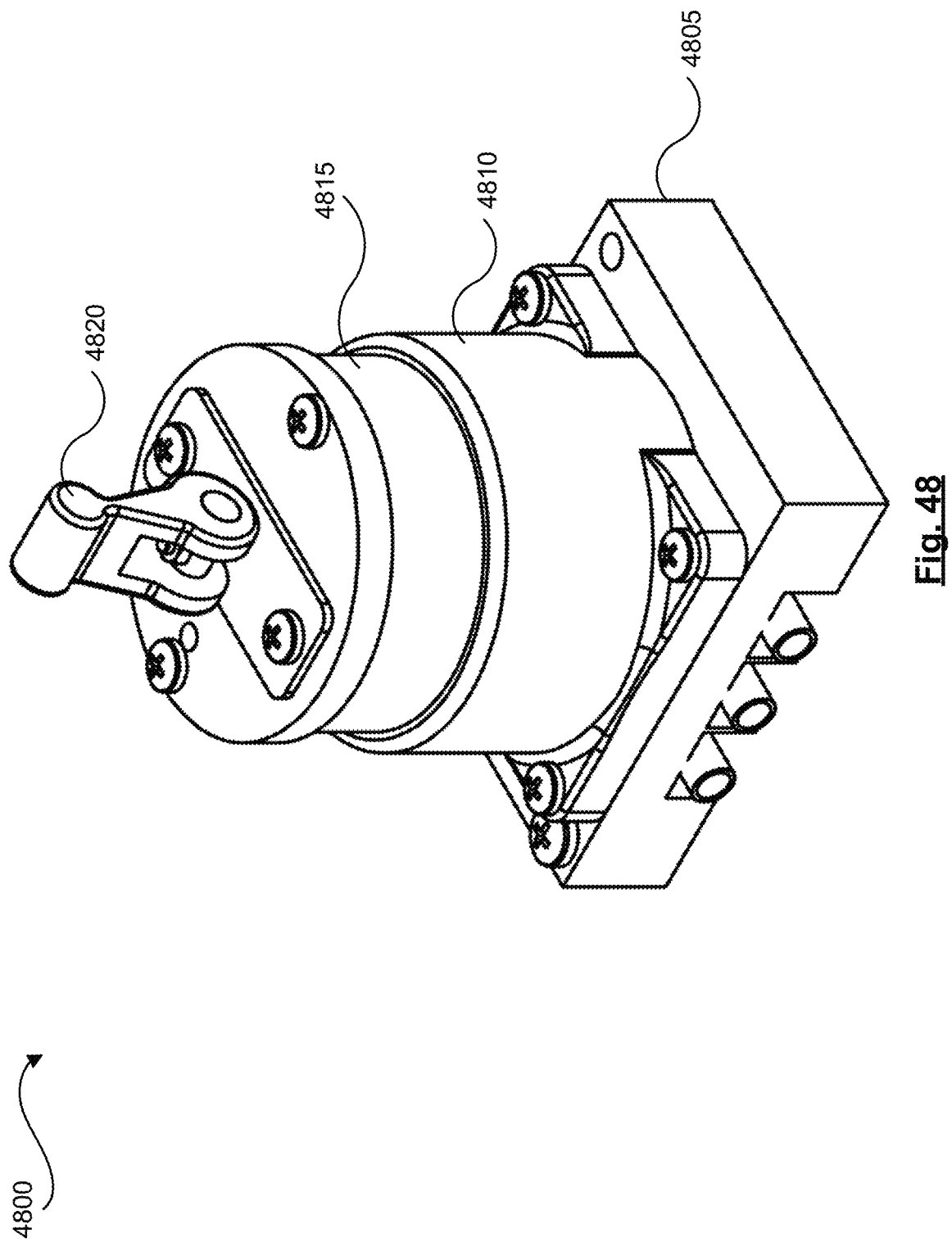
FIG. 48 shows a perspective view of an example contactor, in accordance with a non-limiting implementation of the present specification.

In addition, as described above, in some examples the phase-shorting module may comprise a contactor. FIG. 48 shows a perspective view of an example of such a contactor 4800. Contactor 4800 may comprise a base 4805 to electrically connect with the phases of the electric motors. Contactor 4800 may also comprise an electrical contact movable between an open position and a closed position, whereby contactor 4800 provides passive electromagnetic braking in the closed position. The electrical contact is not visible in FIG. 48 because it is covered by a partial housing 4810 of contactor 4800. The electrical contact is shown in FIG. 49.

Contactor 4800 also comprises a contactor actuator 4815 to move the electrical contact between the open and closed positions. Contactor actuator 4815 may also be described as actuator 4815 in short. In some examples, actuator 4815 may comprise a solenoid, and the like. Contactor 4800 also comprises an override module which may be used to manually override the state or position of the contactor. FIG. 48 shows an override handle 4820 of the override module. The override module is described in greater detail in relation to FIG. 53. It is also contemplated that in some examples, contactor 4800 need not comprise an override module.

Figure 49:
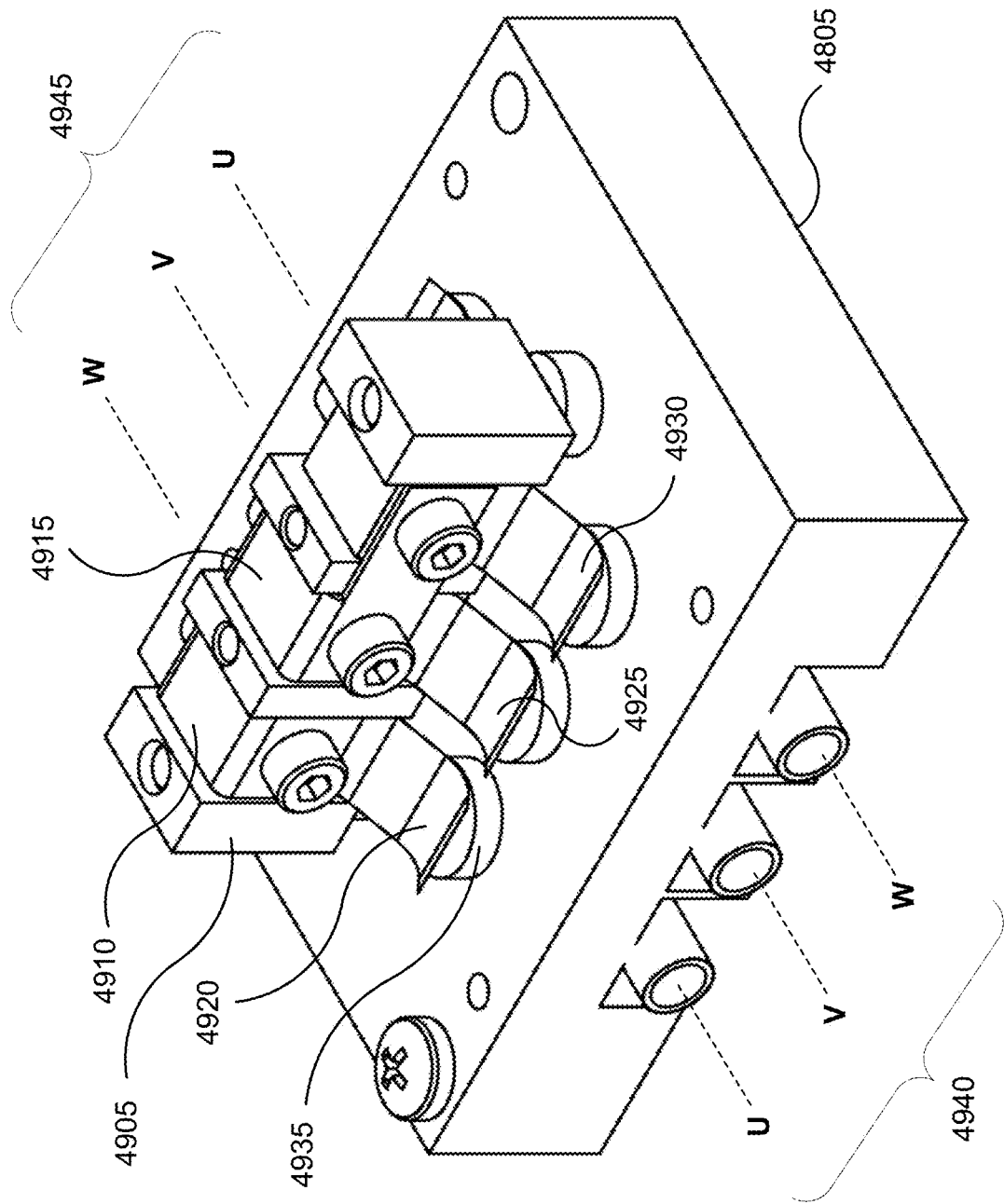
FIG. 49 shows a perspective view of a component of the contactor shown in FIG. 48.

Turning now to FIG. 49, a partial perspective view is shown of contactor 4800, showing base 4805 and a movable electrical contact 4905. Electrical contact 4905 comprises electrically conductive strips which terminate in one or more contact ends. For example, electrical contact 4905 comprises conductive strips 4910 and 4915. Conductive strip 4910 terminates in two contact ends, one of which ends is contact end 4920. The other contact end of conductive strip 4910 is not visible in FIG. 49. Conductive strip 4915 terminates in four contact ends, two of which ends are contact ends 4925 and 4930. The other two contact ends of conductive strip 4915 are not visible in FIG. 49.

Base 4805 comprises a contact pad corresponding to each of the contact ends of the conductive strips of electrical contact 4905. An example of such a contact pad is contact pad 4935 shown in FIG. 49. The other contact pads of base 4805 are not labeled in FIG. 49, for ease and clarity of illustration. Each of the contact pads may be electrically connected to a phase of an electric motor. For example, a set of electrical connectors 4940 may connect contact pad 4935 and its two neighboring contact pads visible in FIG. 49 to phases U, V, and W of a first electric motor. Similarly, base 4805 may comprise a second set of electrical connectors 4945 to connect the other three contact pads of base 4805 (not visible in FIG. 49) to phases W, V, and U of a second electric motor. Electrical connectors 4945 are disposed on the side of base 4805 opposite electrical connectors 4940; as such, electrical connectors 4945 are not visible in FIG. 49.

In the closed position, electrical contact 4905 is moved towards base 4805 to allow contact ends (such as contact ends 4920) to come into electrical contact with their corresponding contact pads (such as contact pad 4935) of base 4805. In the closed position, conductive strip 4910 electrically connects and shorts phase U of the first electric motor to phase W of the second electric motor. Moreover, in the closed position, conductive strip 4915 electrically connects and shorts together phases V and W of the first electric motor, and connects and shorts together phases V and U of the second electric motor. Furthermore, in the closed position, conductive strip 4915 also connects and shorts phases V and W of the first electric motor to phases V and U of the second electric motor.

While FIG. 49 shows a given scheme for shorting the phases of each motor and for shorting the phases of one motor to the phases of the other motor, it is contemplated that in some examples different numbers or types of phases of each motor may be shorted together, or that different numbers or types of phases of one motor may be shorted to different numbers or types of phases of the other motor. Moreover, while FIG. 49 shows electrical contact 4905 and base 4805 being used to short the phases of two electric motors, it is contemplated that in some examples the contactor may be used to short the phases of one motor or more than two motors.

Figure 50:
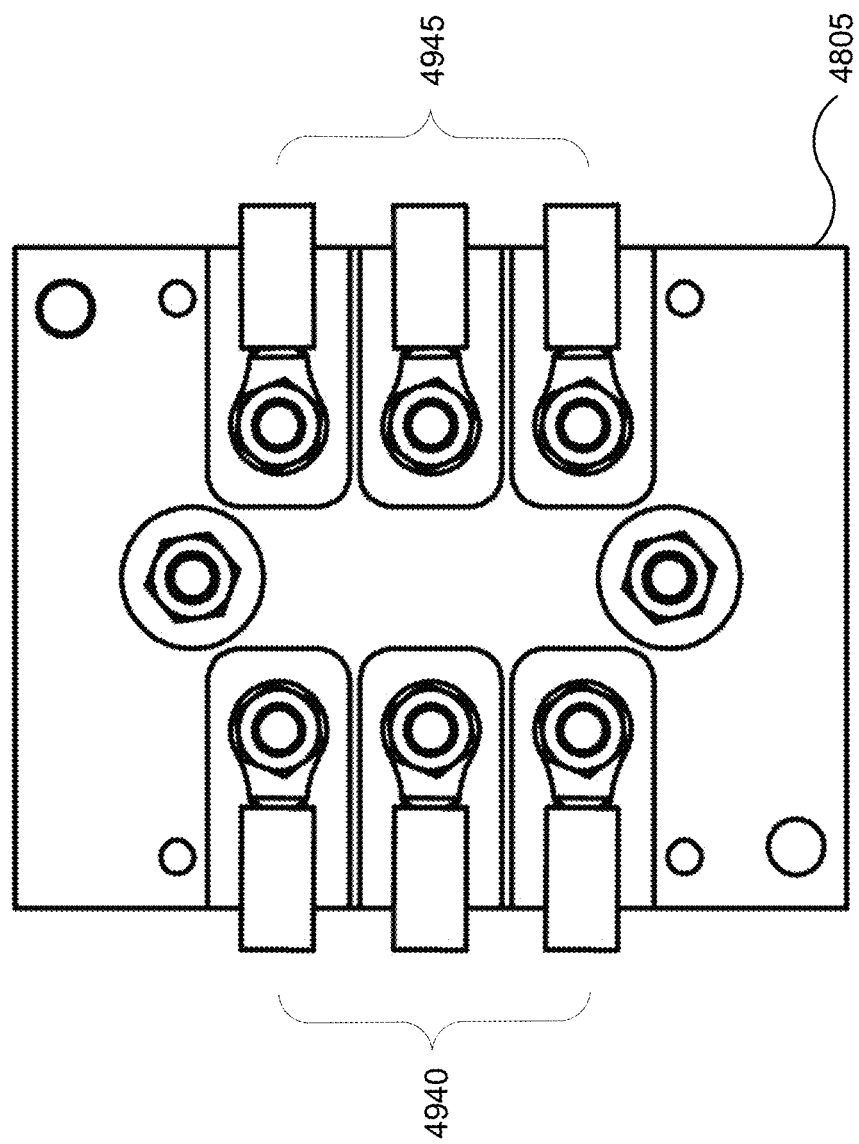
FIG. 50 shows a bottom plan view of the component shown in FIG. 49.
Figure 51:
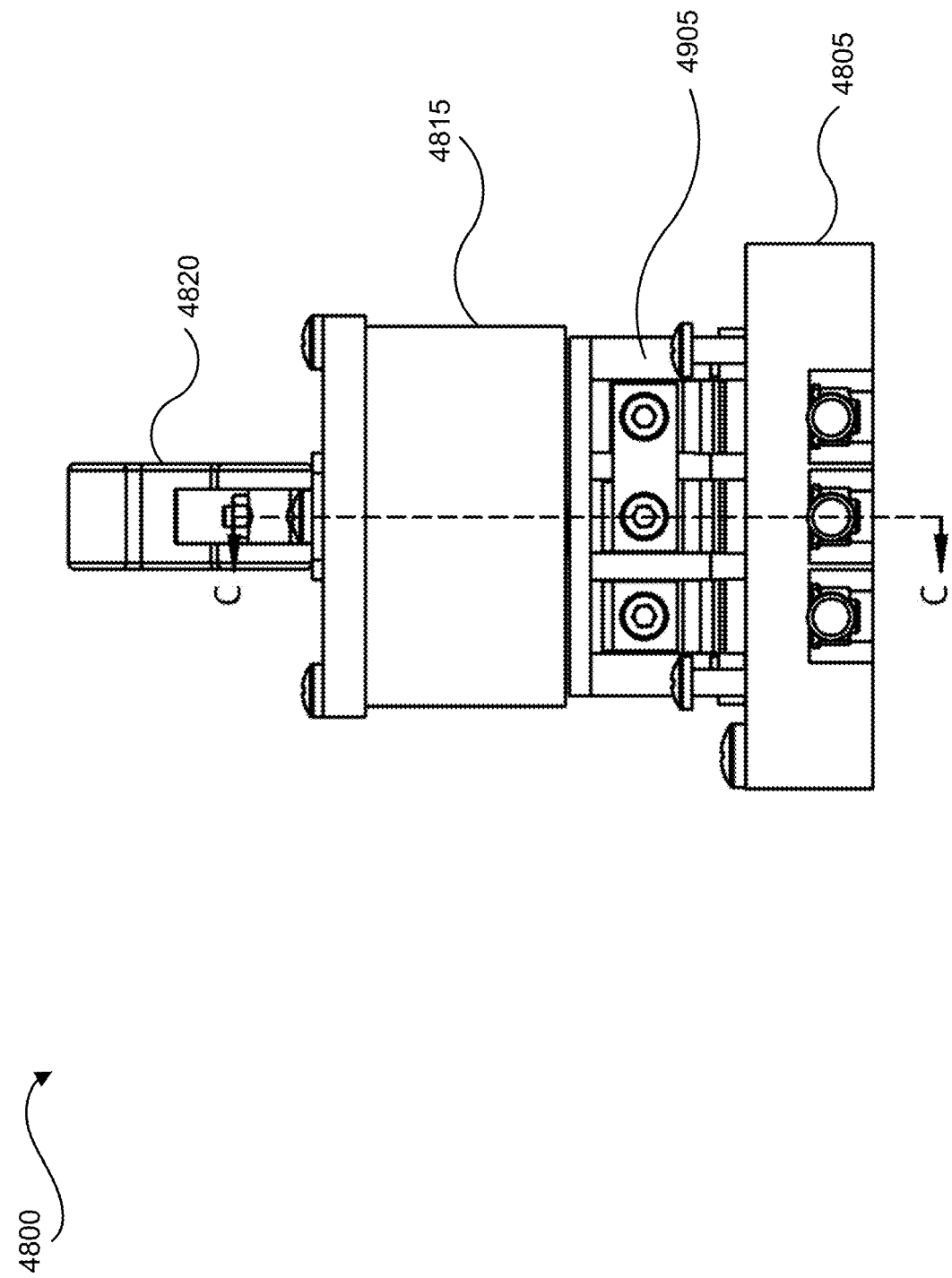
FIG. 51 shows a side elevation view of the contactor of FIG. 48, with a housing of the contactor removed.
Figure 52:
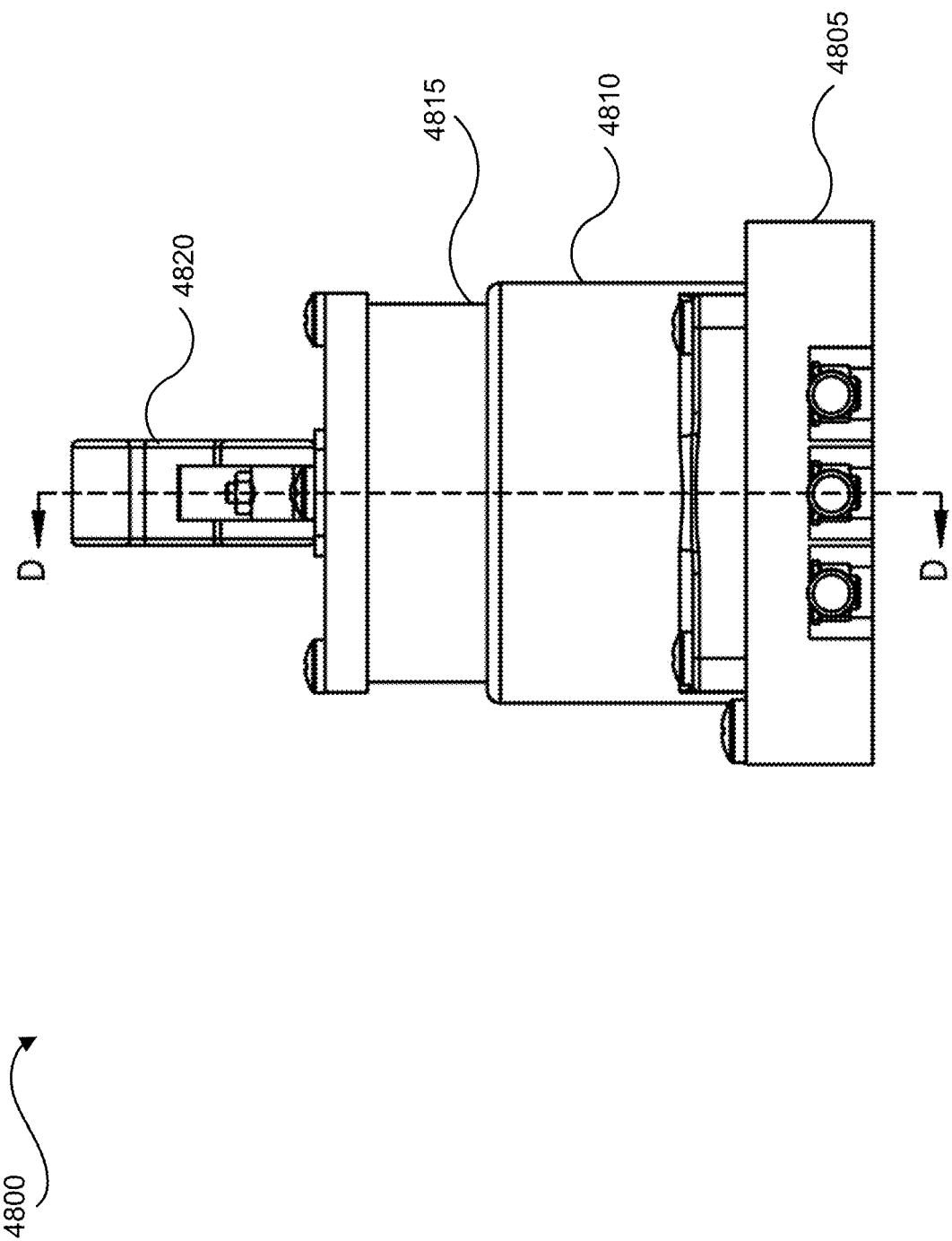
FIG. 52 shows another side elevation view of the contactor of FIG. 48, with the housing of the contactor in place.

Turning now to FIG. 50, a bottom plan view is shown of base 4805. FIG. 50 shows the full complement of electrical connectors 4940 and 4945 of base 4805. FIG. 51, in turn, shows a side elevation view of contactor 4800 with housing 4810 removed to reveal electrical contact 4905. FIG. 52, in turn, shows another side elevation view of contactor 4800 with housing 4810 in place.

Figure 53:
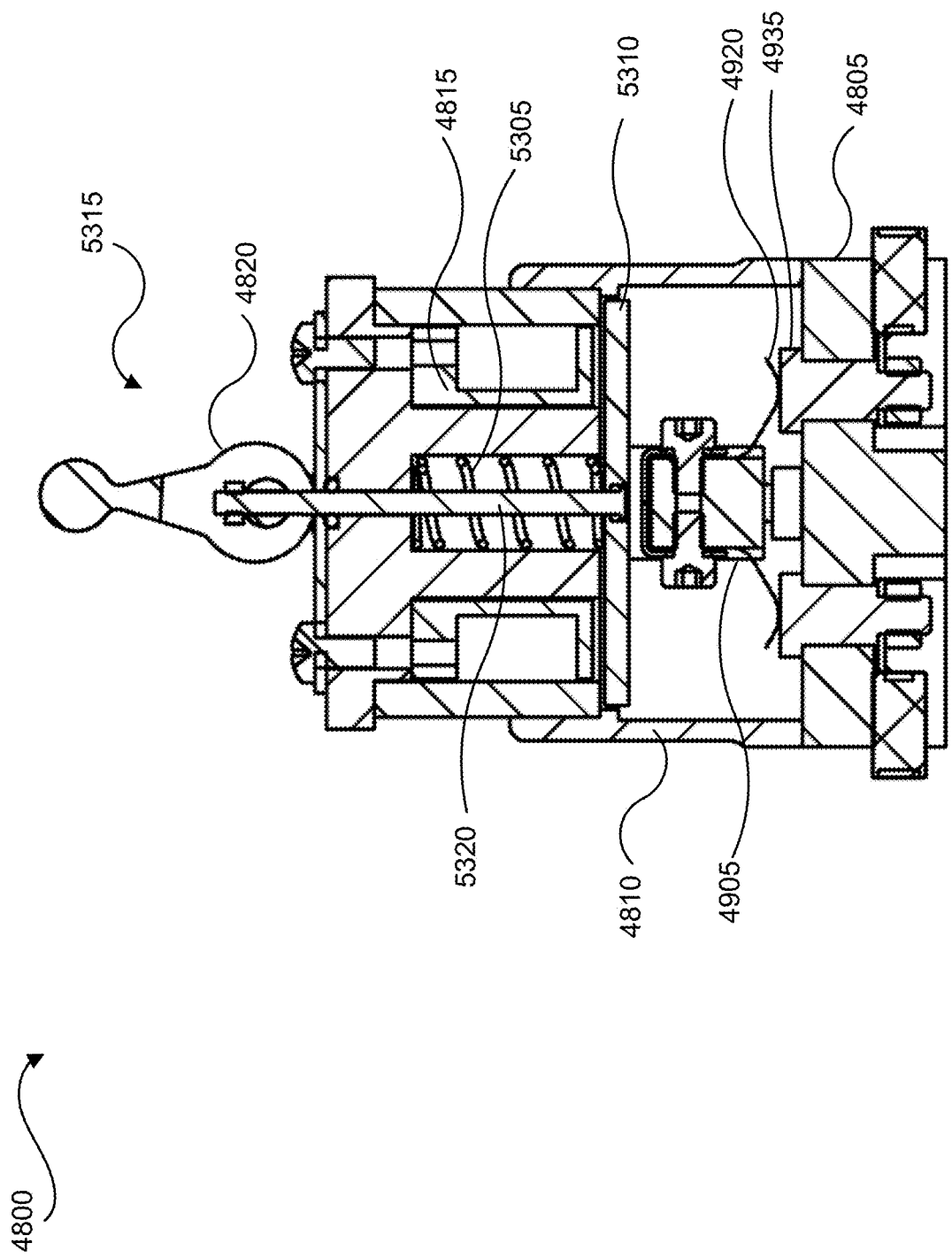
FIG. 53 shows a cross-sectional view of the contactor of FIG. 48 taken along line D-D shown in FIG. 52.

FIG. 53, in turn, shows a cross-sectional view of contactor 4800 taken along line D-D shown in FIG. 52. As shown in FIG. 53, contactor 4800 also comprises a contactor spring 5305 to resiliently bias electrical contact 4905 towards the closed position whereby the contact ends of electrical contact 4905 come into contact with the contact pads of base 4805. As discussed above, contactor 4800 also comprises an actuator 4815 to pull against the resilient biasing force of spring 5305 to move electrical contact 4905 towards the open position, whereby the contact ends of electrical contact 4905 do not come into contact with the contact pads of base 4805.

As shown in FIG. 53, actuator 4815 comprises a solenoid having a movable member 5310. Electrical windings of the solenoid are omitted from FIG. 53 for ease and clarity of illustration. Electrical contact 4905 is secured to movable member 5310. When the solenoid is powered, it retracts movable member 5310 to resiliently compress spring 5305 against the resilient biasing force of spring 5305. In other words, movable member 5310 may pull against the resilient biasing force of spring 5305 when the solenoid is powered. Moreover, as movable member 5310 retracts, it moves electrical contact 4905 away from base 4805 to cause contact ends of electrical contact 4905 to lose contact with contact pads of base 4805. In other words, when the solenoid is powered the solenoid moves electrical contact 4905 from its closed position to its open position.

When electrical power to the solenoid is cut, the solenoid may have reduced ability or no ability to resist the resilient biasing force of spring 5305, which resilient biasing force may then push movable member 5310, and electrical contact 4905 attached thereto, towards base 4805. In this manner, when power is reduced or cut to the solenoid, the resilient biasing force of spring 5305 may move electrical contact 4905 from its open position to its closed position. This arrangement may allow a controller to control contactor 4800 (and move it between its open and closed positions) by powering the contactor solenoid or cutting power to the solenoid.

As discussed above, contactor 4800 may also comprise an override module 5315. This override module may pull against the resilient biasing force of spring 5305 to move electrical contact 4905 towards its open position. As shown in FIG. 53, override module 5315 may comprise override handle 4820 mechanically and movably coupled to an override pull rod 5320. Override handle 4820 may be movable between different configurations.

Override module 5315 may have an active configuration whereby override handle 4820 is in a first configuration and retracts override pull rod 5320 against the resilient biasing force of spring 5305 to move electrical contact 4905 away from base 4805 towards its open position. Override module 5315 may also have an override inactive configuration whereby override handle 4820 is in a second configuration which does not retract override pull rod 5320 against the resilient biasing force of spring 5305. FIG. 53 shows override module 5315 in its override inactive configuration, whereby pull rod 5320 does not pull against the resilient pushing force of spring 5305. The override active configuration of the override module is described in greater detail in relation to FIGS. 56A and 56B.

Figure 54:
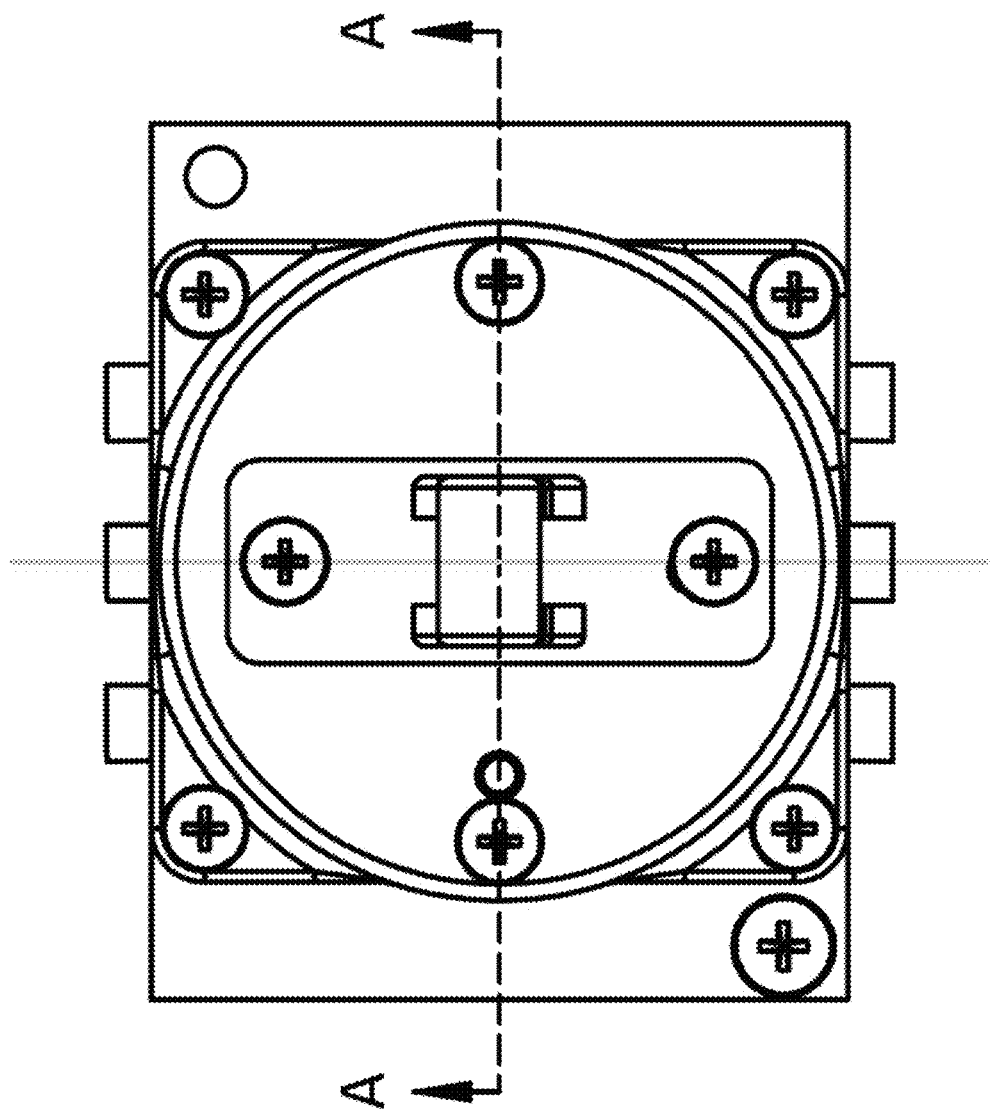
FIG. 54 shows a top plan view of the contactor of FIG. 48.
Figure 55:
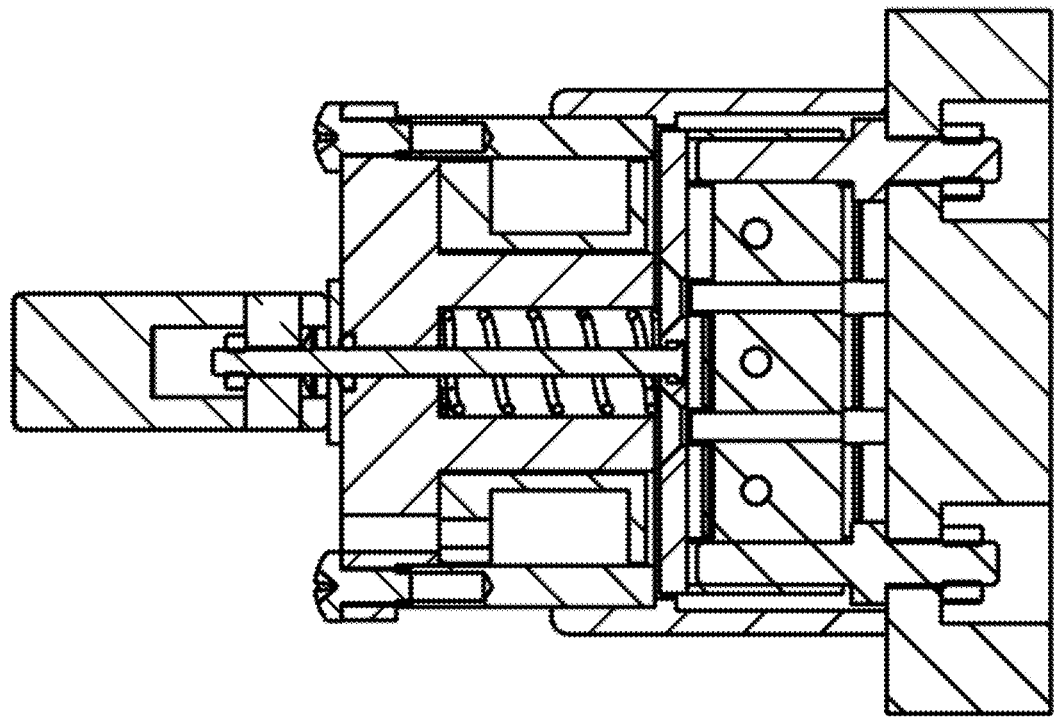
FIG. 55 shows a cross-sectional view of the contactor FIG. 48 taken along line A-A shown in FIG. 54.

FIG. 54 shows a top plan view of contactor 4800. FIG. 55, in turn, shows a cross-sectional view of contactor 4800 taken along line A-A shown in FIG. 54. FIG. 56A shows a cross-sectional view of contactor 4800 similar to the view shown in FIG. 53. The difference between FIGS. 56A and 53 is that in FIG. 56A override module 5315 is in its override active configuration, whereas in FIG. 53 override module 5315 is in its override inactive configuration.

As shown in FIG. 56A, manually moving override handle 4820 away from its "twelve o'clock" position exerts a pulling force on pull rod 5320 to pull against and resiliently compress spring 5305 against the resilient biasing force of spring 5305. As pull rod 5320 is mechanically coupled to movable member 5310, pulling on pull rod 5320 also moves movable member 5310 away from base 4805 against the resilient biasing force of spring 5305. Moving movable member 5310 away from base 4805, in turn, moves electrical contact 4905 away from base 4805 to transition electrical contact 4905 into its open position. In some examples, pull rod 5320 may be coupled eccentrically to override handle 4820, such that moving the override handle away from its "twelve o'clock" position exerts a pulling force on pull rod 5320 to pull pull rod 5320 away from base 4805.

Figure 56B:
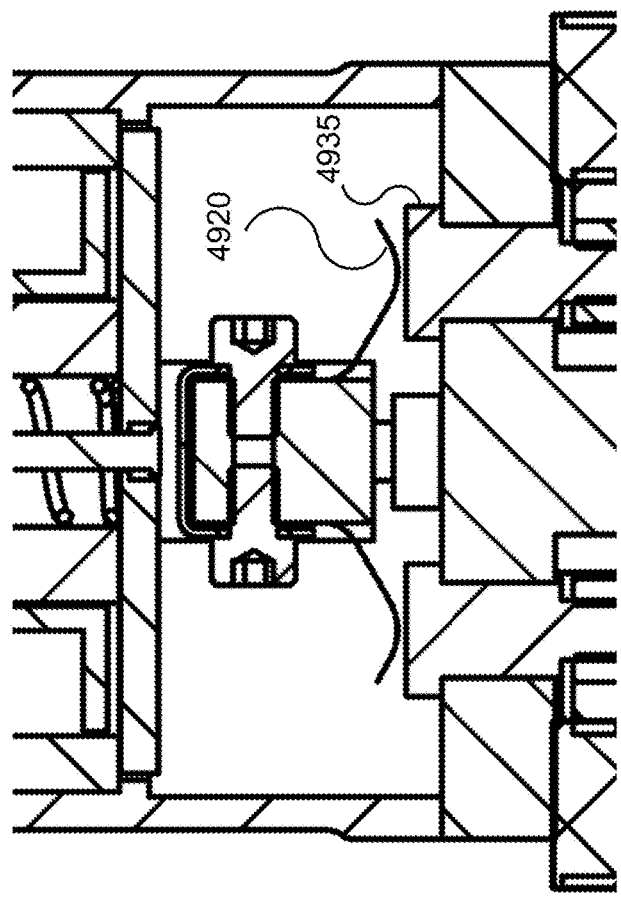
FIG. 56B shows a magnified portion of FIG. 56A.
Figure 56A:
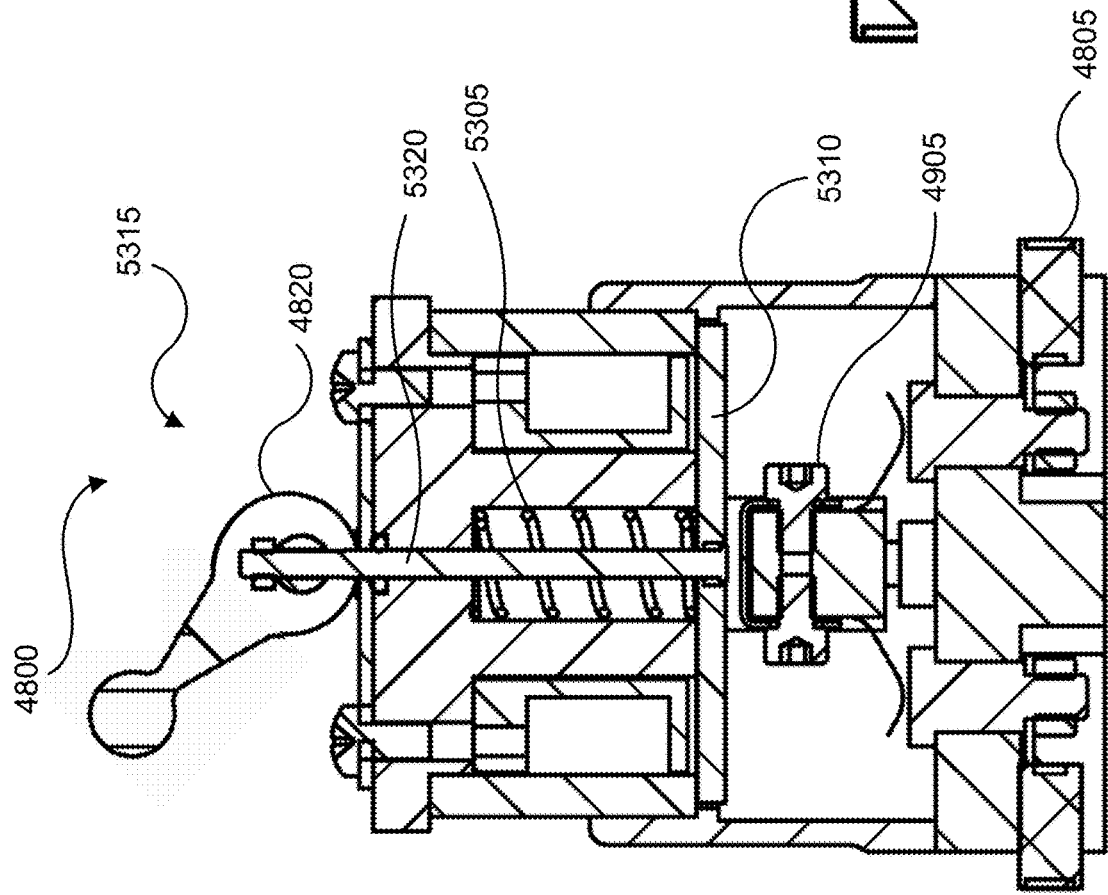
FIG. 56A shows a cross-sectional view of the contactor of FIG. 48, with a manual override in its override active configuration.

FIG. 56B, in turn, shows a magnified portion of FIG. 56A. As shown in FIG. 56B, contact ends of electrical contact 4905 are pulled away and spaced from contact pads of base 4805 to electrically disconnect electrical contact 4905 from contact pads of base 4805.

As discussed above, in some examples when the state of the electric vehicle transitions to a faulted state, or when the vehicle is in the start up state, the shutdown state, or the off state, power to the solenoid of contactor 4800 may be cut. Cutting the power to the solenoid in turn causes the electrical contact of the contactor to transition from the open position to the closed position under the resilient biasing force of the contactor spring. In the closed position, the contactor shorts the phases of the electric motors of the electric vehicle. Such sorting provides passive electromagnetic braking by slowing down or resisting the rotation of the electric motors.

In some examples, the electric vehicle may need to be moved when the vehicle in a faulted state. Example of such a situation may include situations where a faulted or disabled electric vehicle is to be pushed or towed. To facilitate the moving of the electric vehicle in the faulted state, the override module may be used to manually move the electrical contact of the contactor to the open position, this opening of the contactor may, in turn, allow the motors (and the wheels coupled to the motors) to rotate more freely to facilitate the electric vehicle being moved or towed.

Furthermore, in some examples, the override module may not be capable of being actuated by the controller of the electric vehicle, and a manual force may be needed to move the override module between its override active and override inactive configurations. As such, once the override module is put in its override active configuration, a further manual force may be used to reset the override module back to its override inactive configuration.

In some examples, the controller may check the configuration of the override module in the start up state, before allowing the transition to the standby or operational states. Such a check may be performed by making an electrical measurement across the contact pads of the contactor. Such an electrical measurement may comprise measuring the voltage, the current, and the like. An electrical measurement across the contact pads indicating an open circuit may indicate that the override module in its override active configuration. In such a situation, the controller may prevent the electric vehicle from transitioning into the standby or operational states until the override module is manually reset to its override inactive configuration.

If, on the other hand, the electrical measurement across the contact pads of the contactor indicates an electrical contact or an electrical short, the controller may determine that the override module is in the override inactive configuration. In such a situation, a manual resetting of the override module back to its override inactive configuration may not be needed before the controller allows the vehicle to progress from the start up state to the standby or operational states.

In other words, in some examples, the contactor may comprise an override module having an override active configuration whereby the override module pulls against the resilient biasing force to move the electrical contact towards the open position, and an override inactive configuration whereby the override module does not pull against the resilient biasing force. In such examples, before restoring power to the contactor actuator, the controller may make a determination of whether the override module is in the override active configuration by determining whether the electrical contact is in the open position by checking the voltage or other electrical measurement across the contactor.

As discussed above, in some examples transition of the electric vehicle from a non-faulted state to a faulted state may trigger the application of hybrid braking. In some examples, this hybrid braking may comprise electromagnetic braking and mechanical braking. Moreover, in some examples, the electromagnetic braking may comprise passive electromagnetic braking, such as the electromagnetic braking provided by shorting the phases of an electric motor to one another or by shorting the phases of one electric motor to the phases of another electric motor.

In some examples, applying the passive electromagnetic braking comprises controlling a phase-shorting module to apply the passive electromagnetic braking. The phase-shorting module may comprise a contactor comprising an electrical contact movable between an open position and a closed position. The electrical contact may be resiliently biased towards the closed position by a resilient biasing force. Contactor 2900 may be an example of such a contactor. In such examples, controlling the phase-shorting module may comprise cutting electrical power to a contactor actuator of the contactor resisting the resilient biasing force to cause the electrical contact to move from the open position to the closed position under the resilient biasing force.

Moreover, in some examples, the contactor may comprise an override module having an override active configuration whereby the override module pulls against the resilient biasing force to move the electrical contact towards the open position and an override inactive configuration whereby the override module does not pull against the resilient biasing force. In such examples, the passive electromagnetic braking may be overridden by applying a manual force to the override module to move the override module from the override inactive configuration to the override active configuration.

Furthermore, in some examples, applying the electromagnetic braking may further comprise applying an active electromagnetic braking. The active electromagnetic braking may comprise one or more of: controlling one or more electric motors of the electric vehicle to ramp down their rotational speed, and controlling the electric motors to hold them at a zero speed.

Referring back to FIG. 2C, in some examples, once the electric vehicle enters faulted 262 state further changes in the status of the vehicle may prompt or trigger a transition out of faulted 262 state into one of the non-faulted states. In other words, the controller may receive a status indicator associated with the resolution of the fault or other conditions that had initially prompted the transition into the faulted state. Upon receiving this status indicator, the controller may update the state of the electric vehicle to a non-faulted state. As part of this updating, the hybrid emergency braking may be partially or fully disabled in order to allow the vehicle to return back to a standby or operational state.

In some examples, such disabling of the hybrid braking may comprise discontinuing the passive electromagnetic braking. Moreover, in order to return to the operational state, after discontinuing the electromagnetic braking and the mechanical braking, driving power may be restored to electric motors of the electric vehicle.

As discussed above, in some examples, applying the passive electromagnetic braking may comprise controlling the contactor. The contractor may comprise an electrical contact movable between an open position and a closed position. The electrical contact may be resiliently biased towards the closed position by a resilient biasing force. Controlling the contactor may comprise cutting electrical power to the contactor actuator of the contactor resisting the resilient biasing force to cause the electrical contact to move from the open position to the closed position under the resilient biasing force. In such examples, the application of the passive electromagnetic braking may be discontinued by restoring power to the contactor actuator to move the electrical contact from the closed position to the open position against the resilient biasing force.

In some examples, the mechanical braking may be discontinued by an operator of the electric vehicle applying a manual force to a brake handle module to actuate the mechanical braking applicator from the engaged configuration to the disengaged configuration. It is also contemplated that in some examples, the transition of the mechanical braking applicator from the engaged configuration to the disengaged configuration may be powered by an electrical actuator controlled by a controller of the electric vehicle.

Moreover, in some examples, after restoring power to the contactor actuator, the controller may delay by a predetermined delay before restoring driving power to the electric motors of the electric vehicle. This delay may allow time for the electrical contact of the contactor to physically move from its closed position to its open position before driving power is restored to the electric motors. If driving power is sent to electric motors before the contactor moves to its open position, the controller may detect the phases of the electric motors as being sorted by the contactor, which in turn may trigger the vehicle to move back into faulted state.

Furthermore, in some examples, before restoring power to the driving motors, the controller may check that a throttle input being received at the electric vehicle is at zero. In some examples, this check may be done in the start up state. If the check is successful, the vehicle may be allowed to transition from the start up state to the standby state. In other words, for safety reasons the controller may check that throttle input is at zero before the controller moves the vehicle into a state where driving power could be sent to the electric motors. If throttle input is not initially at zero, excessive power may be suddenly sent to the electric motors upon transition out of the start up state, which sudden surge of driving power may cause the vehicle or the operator to lose control.

In addition, in some examples, a fault or a faulted state may be a latching state. A system or vehicle restart may be necessary to transition out of such a latching faulted state back into a non-faulted state. In other words, in some examples, the electric vehicle may need to be restarted before updating the state of the electric vehicle from the faulted state to the non-faulted state. Examples of faults that may potentially trigger a latching faulted state may include some software faults, some controller faults, and the like.

The methods of controlling an electric vehicle described herein may be performed by the controllers, mechanical braking applicators, and the electromagnet braking modules described herein. In addition, it is contemplated that the methods of applying hybrid braking described herein may be performed by the controllers, mechanical braking applicators, and electromagnetic braking modules described herein. It is also contemplated that the methods of controlling an electric vehicle described herein, including the methods of hybrid braking, may be performed using systems or devices other than those described herein. In other words, the methods described herein may be performed using controllers, mechanical braking applicators, and electromagnetic braking modules other than those described herein.

Furthermore, the systems and devices described herein may perform the methods of controlling an electric vehicle described herein, including the methods of hybrid braking described herein. In other words, the controllers, mechanical braking applicators, and electromagnetic braking modules described herein may perform the methods of controlling an electric vehicle described herein, including the methods of hybrid braking described herein. It is also contemplated that the systems and devices described herein may perform methods of controlling an electric vehicle, including methods of hybrid braking, other than the corresponding methods described herein.

It should be recognized that features and aspects of the various examples provided herein may be combined into further examples that also fall within the scope of the present disclosure.

The invention claimed is:

1. A method of controlling an electric vehicle, the method comprising:
   obtaining by a controller of the electric vehicle a first state indicator of a state of the electric vehicle;
   receiving at the controller a status indicator of an operating status of the electric vehicle;
   updating by the controller the state of the electric vehicle based on the status indicator to an updated state, the updated state associated with a second state indicator;
   determining by the controller a given braking type of a braking to be applied to the electric vehicle, the determining based on one or more of the second state indicator and the status indicator; and
   applying to the electric vehicle the braking of the given braking type;
   wherein:
   the updating the state of the electric vehicle comprises updating the state to the update state comprising a faulted state;
   the determining the braking type comprises determining the braking type to comprise a hybrid braking; and
   the applying the braking comprises applying the hybrid braking, the hybrid braking comprising:
     applying on electromagnetic braking to one or more electric motors of the electric vehicle using an electromagnetic braking module to reduce a rotational speed of the one or more electric motors; and
     when the rotational speed is equal to or less than a threshold speed, applying a mechanical braking to the electric vehicle using a mechanical braking applicator; and
   wherein:
   the receiving the status indicator comprises receiving an input fault indicator indicating a fault associated with an input received at the controller, the input associated with controlling the one or more electric motors;
   the updating the state of the electric vehicle comprises updating the state to the updated state comprising an input-faulted state;
   the applying the electromagnetic braking comprises one or more of:
     applying an active electromagnetic braking comprising one or more of:
       controlling the one or more electric motors to ramp down their rotational speed; and
       controlling the one or more electric motors to hold them at a zero speed; and
     applying a passive electromagnetic braking comprising one or more of:
       shorting together one or more phases of a first electric motor of the one or more electric motors; and
       shorting one or more phases of the first electric motor to one or more corresponding phases of a second electric motor of the one or more electric motors; and
   the applying the mechanical braking comprises:
     moving a braking rod of the mechanical braking applicator from a disengaged configuration to an engaged configuration.

2. A method of controlling an electric vehicle, the method comprising:
   obtaining by a controller of the electric vehicle a first state indicator of a state of the electric vehicle;
   receiving at the controller a status indicator of an operating status of the electric vehicle;
   updating by the controller the state of the electric vehicle based on the status indicator to an updated state, the update state associated with a second state indicator;
   determining by the controller a given braking type of a braking to be applied to the electric vehicle, the determining based on one or more of the second state indicator and the status indicator; and
   applying to the electric vehicle the braking of the given braking type;
   wherein:
   the updating the state of the electric vehicle comprises updating the state to the updated state comprising a faulted state;
   the determining the braking type comprises determining the braking type to comprise a hybrid braking; and
   the applying the braking comprises applying the hybrid braking, the hybrid braking comprising:
     applying an electromagnetic braking to one or more electric motors of the electric vehicle using an electromagnetic braking module to reduce a rotational speed of the one or more electric motors; and
     when the rotation speed is equal to less than a threshold speed, applying a mechanical braking to the electric vehicle using a mechanical braking applicator; and
   wherein:
   the receiving the status indicator comprises receiving an operational fault indicator indicating a corresponding fault associated with operation of the electric vehicle;
   the updating the state of the electric vehicle comprises updating the state to the updated state comprising an operational-faulted state;
   the applying the electromagnetic braking comprises:
     applying a passive electromagnetic braking comprising:
       shorting together one or more phases of a first electric motor of the one or more electric motors; and
       shorting one or more phases of the first electric motor to one or more corresponding phases of a second electric motor of the one or more electric motors; and
   the applying the mechanical braking comprises:
     moving a braking rod of the mechanical braking applicator from a disengaged configuration to an engaged configuration; and
   the method further comprising cutting driving power to the one or more electric motors.

3. The method of claim 2, wherein one or more of:
   the receiving the operational fault indicator comprises receiving a traction fault indicator associated with a corresponding fault in controlling the one or more electric motors, and the updating the state of the electric vehicle comprises updating the state to the updated state comprising a traction-faulted state;
   the receiving the operational fault indicator comprises receiving a system fault indicator associated with a corresponding fault in the electric vehicle, and the updating the state of the electric vehicle comprises updating the state to the updated state comprising a system-faulted state; and the receiving the operational fault indicator comprises receiving an operator seated fault indicator associated with a seat sensor ceasing to detect an operator of the electric vehicle as being seated in an operator seat of the electric vehicle, and the updating the state of the electric vehicle comprises updating the state to the updated state comprising the system-faulted state.

4. The method of claim 2, further comprising:
receiving a third status indicator associated with a resolution of the corresponding fault associated with the operation of the electric vehicle;
updating by the controller the state of the electric vehicle based on the third status indicator to a non-faulted state;
discontinuing the passive electromagnetic braking; and
after the discontinuing the electromagnetic braking and the mechanical braking, restoring the driving power to the one or more electric motors.

5. The method of claim 4, further comprising restarting the electric vehicle before the updating the state of the electric vehicle to the non-faulted state.

6. The method of claim 4, wherein:
the applying the passive electromagnetic braking comprises controlling a contactor comprising an electrical contact movable between an open position and a closed position, the electrical contact resiliently biased towards the closed position by a resilient biasing force, the controlling comprising cutting electrical power to a contactor actuator of the contactor resisting the resilient biasing force to cause the electrical contact to move from the open position to the closed position under the resilient biasing force; and
the discontinuing the passive electromagnetic braking comprises restoring the power to the contactor actuator to move the electrical contact from the closed position to the open position against the resilient biasing force.

7. The method of claim 6, wherein:
the contactor further comprises an override module having an override active configuration whereby the override module pulls against the resilient biasing force to move the electrical contact towards the open position and an override inactive configuration whereby the override module does not pull against the resilient biasing force;
the method further comprising:
before the restoring the power to the contactor actuator, determining whether the override module is in the override active configuration by determining whether the electrical contact is in the open position by checking a voltage across the contactor.

8. The method of claim 6, further comprising: after the restoring the power to the contactor actuator, delaying by a predetermined delay before the restoring the driving power to the one or more electric motors.

9. The method of claim 8, further comprising: checking that a throttle input received at the electric vehicle is at zero before the restoring the driving power to the one or more electric motors.

10. The method of claim 2, wherein the moving the braking rod towards the engaged configuration comprises moving the braking rod towards a braking rotor of the mechanical braking applicator such that a tip of the braking rod contacts the braking rotor.

11. The method of claim 10, wherein:
the mechanical braking applicator further comprises a brake handle module having a brake handle coupled to the braking rod to move the braking rod between the engaged configuration and the disengaged configuration, the brake handle having a cocked configuration and an uncocked configuration, the brake handle resiliently biased against the cocked configuration by a corresponding resilient biasing force; and
the moving the braking rod from the disengaged configuration to the engaged configuration comprises cutting power to an actuator of the brake handle module resisting the corresponding resilient biasing force to allow the corresponding resilient biasing force to move the brake handle from the cocked configuration to the uncocked configuration to move the braking rod from the disengaged configuration to the engaged configuration.

12. The method of claim 11, further comprising one or more of:
determining, using a first sensor, whether the braking rod is in the engaged configuration or the disengaged configuration; and
determining, using a second sensor, whether the brake handle is in the cocked configuration or the uncocked configuration.

13. The method of claim 11, further comprising:
before the applying the mechanical braking, applying a manual force to the brake handle module to move the brake handle from the uncocked configuration to the cocked configuration against the corresponding resilient biasing force.

14. The method of claim 2, wherein the receiving the status indicator comprises:
receiving at the controller a measured parameter associated with a movable component of the electric vehicle; and
determining by the controller the status indicator based on the measured parameter.

15. A method of controlling an electric vehicle, the method comprising:
obtaining by a controller of the electric vehicle a first state indicator of a state of the electric vehicle;
receiving at the controller a status indicator of an operating status of the electric vehicle;
updating by the controller the state of the electric vehicle based on the status indicator to an updated state, the updated state associated with a second stole indicator;
determining by the controller a given braking type of a braking to be applied to the electric vehicle, the determining based on one or more of the second state indicator and the status indicator; and
applying to the electric vehicle the braking of the given braking type;
wherein:
the updating the state of the electric vehicle comprises updating the state to the updated state comprising a faulted state;
the determining the braking type comprise determining the braking type to comprise a hybrid braking; and
the applying the braking comprises applying the hybrid braking, the hybrid braking comprising:
applying an electromagnetic braking to one or more electric motors of the electric vehicle using an electromagnetic braking module to reduce a rotational speed of the one or more electric motors; and when the rotational speed is equal to or less than a threshold speed, applying a mechanical braking to the electric vehicle using a mechanical braking applicator; and wherein:
the applying the electromagnetic braking comprises applying a passive electromagnetic braking, the passive electromagnetic braking comprising one or more of:
shorting together one or more phases of a first electric motor of the one or more electric motors; and
shorting one or more phases of the first electric motor to one or more corresponding phases of a second electric motor of the one or more electric motors.

16. The method of claim 15, wherein:
the applying the passive electromagnetic braking comprises controlling a phase-shorting module to apply the passive electromagnetic braking, the phase-shorting module comprising a contactor comprising an electrical contact movable between an open position and a closed position, the electrical contact resiliently biased towards the closed position by a resilient biasing force; and
the controlling the phase-shorting module comprises cutting electrical power to a contactor actuator of the contactor resisting the resilient biasing force to cause the electrical contact to move from the open position to the closed position under the resilient biasing force.

17. The method of claim 16, wherein:
the contactor further comprises an override module having an override active configuration whereby the override module pulls against the resilient biasing force to move the electrical contact towards the open position and an override inactive configuration whereby the override module does not pull against the resilient biasing force;
the method further comprising overriding the passive electromagnetic braking by applying a manual force to the override module to move the override module from the override inactive configuration to the override active configuration.

18. The method of claim 15, wherein the applying the electromagnetic braking further comprises applying an active electromagnetic braking, the active electromagnetic braking comprising one or more of:
controlling the one or more electric motors to ramp down their rotational speed; and
controlling the one or more electric motors to hold them at a zero speed.

* * * * *